(12) United States Patent
Alghathbar et al.

(10) Patent No.: US 7,340,469 B1
(45) Date of Patent: Mar. 4, 2008

(54) IMPLEMENTING SECURITY POLICIES IN SOFTWARE DEVELOPMENT TOOLS

(75) Inventors: Khaled S. Alghathbar, Riyadh (SA); Duminda Wijesekera, McLean, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 317 days.

(21) Appl. No.: 11/106,460

(22) Filed: Apr. 15, 2005

Related U.S. Application Data

(60) Provisional application No. 60/562,695, filed on Apr. 16, 2004.

(51) Int. Cl.
*G06F 7/00* (2006.01)
(52) U.S. Cl. .................................................. 707/10
(58) Field of Classification Search ............... 707/1–10
See application file for complete search history.

(56) References Cited

U.S. PATENT DOCUMENTS

| | | | | |
|---|---|---|---|---|
| 6,640,249 B1 * | 10/2003 | Bowman-Amuah | ......... | 709/228 |
| 6,996,800 B2 * | 2/2006 | Lucassen et al. | ........... | 717/106 |
| 7,010,607 B1 * | 3/2006 | Bunton | ....................... | 709/228 |

* cited by examiner

*Primary Examiner*—Wilson Lee
(74) *Attorney, Agent, or Firm*—David Grossman; David Yee

(57) ABSTRACT

Disclosed is an access and information flow control framework. The framework includes: creating consistent and conflict-free authorization requirement(s) from the raw authorization requirement(s); creating consistent case authorization(s); creating information flow and propagated information flow requirement(s) that are consistent with an information flow policy; creating operation authorization(s); resolving inconsistencies in operation authorization(s); and ensuring that the operation authorization(s) are conflict-free.

4 Claims, 22 Drawing Sheets

Use Case Name: Sign a check

Actor: Manager

Precondition: The check must be issued before and not by the same user.

Normal Scenario: Manager searches for checks to be signed, makes sure that the check's amount is available at the Bank, and verifies the check's amount with the invoice total amount. If all conditions are correct then the Manager signs the check.

Abnormal Scenario: If the check's amount is not available at the company's bank account, then the manager postpones the signature of that check. If the check's amount is different from the invoice's total amount, then Manager sends it to the Clerk for correction.

Postcondition: Check is signed, and amount is detected from the company's bank account.

FIG. 1a

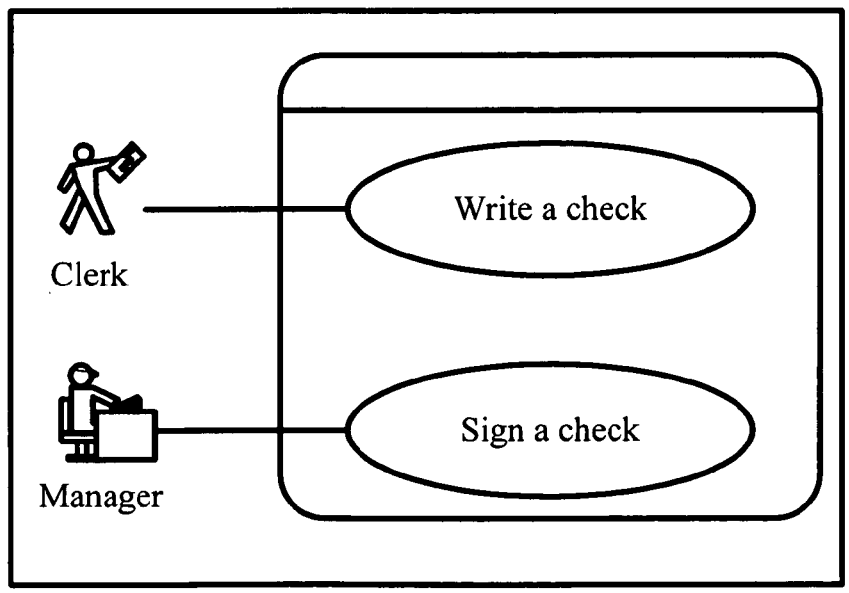

FIG. 1b

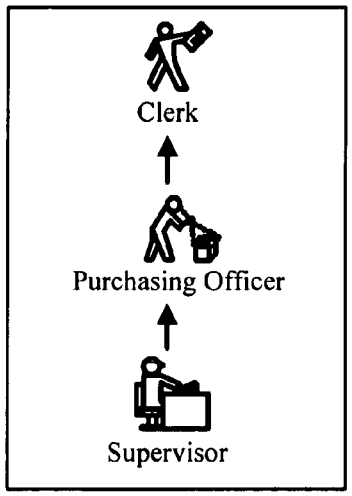

FIG. 15

Use Case: the use case name.

Object: the object of the use case.

Description: short textual description of the action.

Declares: constants, variables, objects and data types used in the pre and post conditions.

Authorized (user, group, and role): a list of users, groups or roles that are authorized to access this operation on this object.

Denied (user, group, and role): a list of users, groups or roles that are denied to access to this operation on this object.

Integrity Constraints (Pre): specify all integrity constraints that must be satisfied before executing the operation written in OCL.

Integrity Constraints (Post): specify all integrity constraints that must be satisfied after the operation is executed. It is written in OCL.

FIG. 16

Use Case: Authorize Payment
Object: Invoice
Description: Actor authorizes the payment after it has been verified. If the amount exceeds one million dollars, then the authorization is partial until a different supervisor completes it.
Declares:
    UserWhoDidPreviousOperations: Set(History_Log)::=History_Log
    Select (User=CurrentUser AND
        (Operation="Record_Invoice_Arrival" OR
            Operation="Verify_Invoice_Validity")AND Object=CurrentObject);
    - it will return a record or more if the current user has done one of the previous use case.
Authorized (User, Group, Role): SupervisorRole
Denied(User, Group, Role): none
Integrity Constraints (Pre):
    Invoice.verified="true";
        Invoice.TotalAmount<=1000000 implies Invoice.authroized=
            "false";
        Invoice.TotalAmount>1000000 implies
            "Invoice.partialAuthorized="false" OR Invoice.authorized=
            "false")
    UserWhoDidPreviousOperations → isEmpty; -- The current user did not do other operation on the current invoice (Dynamic Separation of Duty)
Integrity Constraints (Post):
    If (Invoice.TotalAmount>1000000 AND
        Invoice.partialAuthorized@pre="false") then the invoice has not been partially authorized by different Supervisor before.
        Invoice.partialAuthorized="true";
    else
        Invoice.authorized="true";
    Endif;

FIG. 17

```
Int n    // Total number of entities that the policy is enforced on.
Int m    // Minimum number of entities that must not be invoked by the same object.
Int z    // Total number of other use cases not in the current tree.
Int q    // A use case, q=|m-z|.
Int i    // The level of q. Level : it comprises a set of use cases that have the same order in the
         // dependent tree.
         // Entity can be use case or operation.

If n=m then
      if there are no dependent entities trees then
            for each independent entity do
                  Write the integrity constraint on the entity.
      else // there are dependent entities trees.
            if there is only one dependent entities tree then
                  write the integrity constraint on the last entity of this tree.
            else  //   there are more than one dependent entity tree.
                  for each independent entity do
                        Write the integrity constraint on that entity.
                  for each dependent entities tree do
                        write the integrity constraint on the last entity of each tree.
            End if
      End if
else // m<n
      if there are no dependent entities trees then
            for each independent entity do
                  Write the integrity constraint on the entity.
      else // there are dependent entities trees
            for each independent entity do
                  Write the integrity constraint on it.
            for each dependent entities tree do
                  if m • z then
                        k=1
                  else
                        k=i
                  End if
                  write integrity constraints on use cases from the kth level to the highest level
                  of the dependent tree.
            End loop
      End if
End if
```

FIG. 19

| FlowUML Predicate |
|---|
| FlowSup predicates<br>ConstSup predicates |
| Flow$_{att}$ |
| mayFlow$_{att}$ |
| mayFlow$_{interUC\ att}$ |
| finalFlow$_{att}$<br>finalFlow$_{interUC\ att}$ |
| unsafeFlow$_{att}$<br>unsafeFlows$_{att}$ |
| safeFlow$_{att}$ |

| AuthUML and Flow UML collaboration | |
|---|---|
| Stratum | Predicate |
| 0 | rel-predicates<br>hie-predicates<br>con-predicates |
| 1 | opInConUC<br>conOpInUC<br>flowConInUC |
| 2 | cando$_{UC}$ |
| 3 | alert$_{Req}$ |
| 4 | over$_{UC}$ |
| 5 | dercando$_{UC}$ |
| 6 | do$_{UC}$(X$_s$, +X$_{UC}$) |
| 7 | do$_{UC}$(X$_s$, -X$_{UC}$) |
| 8 | alert$_{UC}$ |
| 9 | FlowSup predicates<br>ConstSup predicates |
| 10 | Flow$_{att}$ |
| 11 | mayFlow$_{att}$ |
| 12 | mayFlow$_{interUC\ att}$ |
| 13 | finalFlow$_{att}$<br>finalFlow$_{interUC\ att}$ |
| 14 | unsafeFlow$_{att}$<br>unsafeFlows$_{att}$ |
| 15 | safeFlow$_{att}$ |
| 16 | dercando$_{OP}$ |
| 17 | do$_{OP}$(X$_s$, +X$_{OP}$) |
| 18 | do$_{OP}$(X$_s$, -X$_{OP}$) |
| 19 | cannotResolve |
| 20 | alert$_{OP}$ |

| | |
|---|---|
| rel-predicates<br>hie-predicates<br>con-predicates | Phase 1 |
| opInConUC<br>conOpInUC<br>flowConInUC | |
| cando$_{UC}$ | |
| alert$_{Req}$ | |
| over$_{UC}$ | Phase 2 |
| dercando$_{UC}$ | |
| do$_{UC}$(X$_s$, +X$_{UC}$) | |
| do$_{UC}$(X$_s$, -X$_{UC}$) | |
| alert$_{UC}$ | |
| dercando$_{OP}$ | Phase 3 |
| do$_{OP}$(X$_s$, +X$_{OP}$) | |
| do$_{OP}$(X$_s$, -X$_{OP}$) | |
| cannotResolve | |
| alert$_{OP}$ | |

FIG. 31

IMPLEMENTING SECURITY POLICIES IN SOFTWARE DEVELOPMENT TOOLS

CROSS-REFERENCE TO RELATED APPLICATIONS

The present application claims the benefit of provisional patent applications: Ser. No. 60/562,695 to Alghathbar et al., entitled "Method and System for Implementing Security Policies in Software Development Tools," filed on Apr. 16, 2004, which are hereby incorporated by reference in its entirety.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 1 shows an example of a use case description.

FIG. 1b shows an example of a use case diagram.

FIG. 15 shows a role hierarchy.

FIG. 16 shows the format of access control schemas.

FIG. 17 shows access control schema for an authorize payment use case.

FIG. 19 shows an algorithm for enforcing integrity constraint of DSOD policies.

FIG. 31 shows AuthUML and FlowUML collaboration predicates.

DETAILED DESCRIPTION OF THE INVENTION

Figure 2:
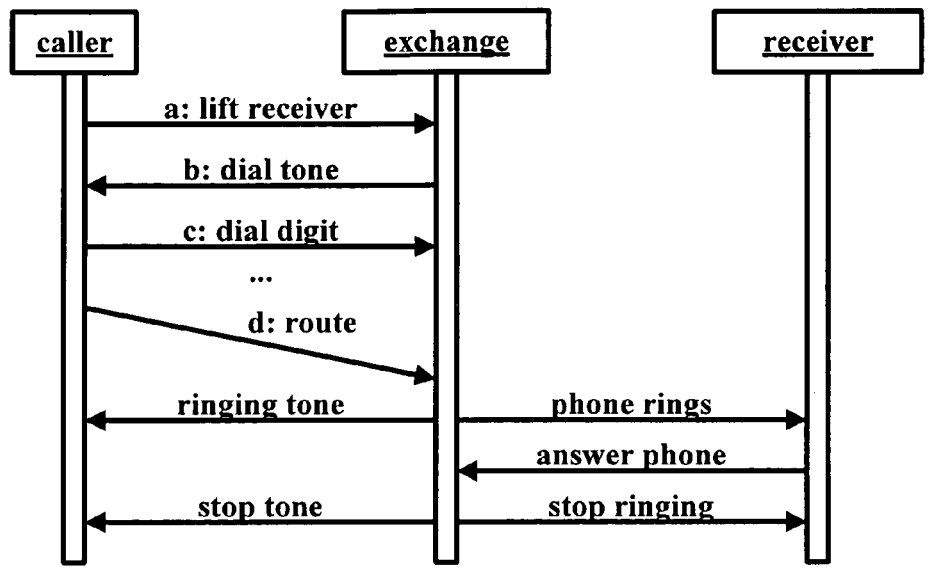
FIG. 2 shows an example of sequence diagram.

Access and flow control policies have not been well integrated into functional specifications throughout the software development life cycle. Access and flow control policies, and security in general, are generally considered to be non-functional requirements that are difficult to express, analyze, and test. Accordingly, most security requirements are considered after the analysis of the functional requirements. Ignoring non-functional requirements or paying less attention to them during the early development process results in low-quality, inconsistent software, dissatisfied stakeholders, and extra time and cost to re-engineer. Therefore, integrating security with other functional requirements as early as possible during the software life cycle improves the security of the software and reduces the cost of maintenance.

The present invention incorporates both access and flow control policies with other functional requirements during the requirements specification and analysis phases of the software development life cycle. A preferred embodiment of the present invention involves a unified representation language and formal verification frameworks for both access and flow control policies.

The present invention extends the Unified Modeling Language (UML) with the necessary elements to represent access and flow control policies. This extension allows software developers to model access and flow control policies in a unified way. The advantage of extending UML to incorporate access and flow control policies is easing its adoption by software developers. This extension addresses what others have not addressed, such as the representation and modeling of dynamic access and flow control policies, negative authorizations, and inherited authorizations.

In large software systems, there are a large number of access and flow control policies to enforce; thus, inconsistent, incomplete, and conflicting sets of policies may be specified. Therefore, there is need for a formal and automated language and tools to detect problems due to improper policies. One aspect of the present invention, AuthUML, was developed as a framework for the analysis of access control policies, based on logic programming, that analyzes access control requirements in the requirements phase to ensure that they are consistent, complete, and conflict-free. The framework is a customized version of Flexible Access Framework (FAF) of Jajodia et al. and it is suitable for UML-based requirements engineering. It analyzes access control policies at two different levels: Use Cases and conceptual operations.

Another aspect of the present invention, FlowUML, provides for the analysis of information flow control policies, is a logic-based system that verifies the proper enforcement of information flow control policies at the requirements specification phase of UML-based designs. FlowUML uses logic programming to verify the compliance of information flow control requirements with information flow polices. FlowUML policies can be written at a coarse-grain level or in a finer-grain level; these two levels provide a comprehensive and wide application of policies.

Finally, because of the overlap of access and flow control policies, yet another aspect of the present invention integrates the analysis of both policies into one framework that reduces redundant process, provides more useful analysis information, and improves overall analysis in general. Today, most security requirements, such as access and flow control policies, are considered only after the completion of functional requirements because security requirements are considered non-functional requirements, which are difficult to express, to analyze, and to test, and because languages used to specify access and flow control policies are separate from the languages used to model functional requirements (such as UML) during the software development life cycle. Consequently, security considerations may not be properly engineered during the software development life cycle, and less secure systems may result.

The present invention: incorporates access and flow control policies with other functional requirements during the early phases of the software development life cycle by extending the Unified Modeling Language (UML) to include security features as first class citizens; and provides for tools that help software analysts and designers to verify the compliance of the access and flow control requirements with policy before proceeding to other phases of the software development process. Specifically, the present invention: extends the metamodel of UML to incorporate access and flow control policies in the design; enhances and extends the Use Case model by providing a unified specification of access and flow control policies using object constraint language (OCL); provides a formal framework to detect inconsistency, incompleteness, and application-definable conflict among access control policies; provides a formal framework that verifies the compliance of information flow requirements with information flow control policies; and integrates both frameworks to analyze both access and flow control policies at the same time.

Access and flow control policies in software security have not been well integrated with functional specifications during the requirements engineering and modeling phases of the software development life cycle. Security is considered to be a non-functional requirement (NFR). Such requirements are difficult to express, analyze, and test; therefore, they are usually evaluated subjectively. Because NFRs tend to be properties of a system as a whole, most security requirements are considered after the analysis of the functional requirements. The consequences of ignoring NFR are low-quality and inconsistent software, unsatisfied stakeholders, and more time and cost in re-engineering. Therefore, integrating security into the software life cycle throughout all its phases adds value to the outcome of the process.

It may be important to specify access control policies precisely and in sufficient detail, because ambiguities in requirements specifications can result in erroneous software. In addition, careful consideration of requirements—including NFRs—may result in reducing project cost and time, because errors that are not detected early can propagate into the other phases of the software development life cycle, where the cost of detection and removal is high. The cost of removing errors in general made during the various phases of the development life cycle is high.

In UML-based software design methodologies, requirements are specified using Use Cases at the beginning of the life cycle. Use Cases specify actors and their intended usage of the envisioned system. Nevertheless, a Use Case is written in natural language, which lacks the precision and specification of security. Therefore, there is a need to provide a unified language for representing security features, such as access and flow control policies, in the early phases of the software development life cycle. This language must allow software developers to model access control policies in a unified way and it must be compatible with other requirements modeling languages.

In addition, there is a need to verify the compliances of security requirements with the security policies before proceeding to other phases of the software development life cycle. Logic may be used as an underlying language because it is potentially amenable to automated reasoning.

The present invention provides several ways to assist software developers to specify and analyze access and flow control policies during the first three phases of the software development process, requirement specification, analysis, and design phases. First, the present invention extends the UML Metamodel in a way that allows systems designers to model dynamic and static access control policies as well as flow control policies in a unified way. The extension provides a way to integrate and impose authorization policies on commercial off-the-shelf (COTS) and mobile code. This extension allows non-security experts to represent access control models, such as Role-Based Access Control (RBAC) and workflow policies, in an uncomplicated manner. Second, the Use Case model is extended to specify access control policies precisely and unambiguously with sufficient details in the UML's Use Case. The invention adds to Use Cases by using something analogous to operation schemas, which are hereafter called access control policy schemas. The extension employs the Object Constraint Language (OCL), which is more formal than the existing Use Case language (natural language) for specifying access and flow control policies. Third, the present invention provides a framework hereafter called AuthUML that formally verifies the compliance of access control requirements with the access control policies during the requirement specification and analysis phases using Prolog style stratified logic programming. Fourth, the present invention provides a framework hereafter called FlowUML to verify the proper enforcement of information flow control policies on the requirements. Fifth, the present invention incorporates the analysis of both access and flow control requirements by integrating both AuthUML and FlowUML. The incorporation of both frameworks improves the analysis and detection of improper access and flow control requirement.

Unified Modeling Language.

Modeling is the blueprint of software applications. It is used to guarantee that all business requirements are considered before starting coding. Also, modeling is used to analyze system's requirements and their consequences. In the 1980s and 1990s, several object-oriented analysis and design methods introduced with different notations. Therefore, there was a need for standardizing modeling notations. The outcome was the Unified Modeling Language (UML).

The following subsection will draw a brief background of the UML and some of its components related to the present invention.

The UML was defined according to Booch et al. [see G. Booch, J. Rumbaugh, and I. Jacobson. *The Unified Modeling Language User Guide*. Addison-Wesley, Reading, Mass., 1999) as follow: "The UML is a language for visualizing, specifying, constructing and documenting the artifacts of a software-intensive system." An important fact is that the UML is not a method, but a modeling language. Most methods consist of a modeling language and a process. The process consists of steps while the modeling language is a collection of notions that the method uses to convey the requirement to a design.

The UML has several advantages: First, the UML is an expressive language with a rich set of notations that lets designer model any type of application that runs on any kind of hardware, programming languages or operating systems. The UML has multiple views to represent requirements and specifications. Second, the UML is beneficial for communication. It is a unified language that allows one to communicate conceptual modeling with others clearly. It is between natural language, which is too imprecise, and code that is too detailed. Third, the UML is extensible. The well-defined extension mechanisms that the UML has presented provide the possibility of extending the UML to facilitate new domains such as security and performance. The extension constructs are stereotypes, tagged values and constraints. Stereotypes are used to define new types of model elements or building blocks. Tagged values extend the metamodel types by adding new attributes. Constraints extend the semantics of the model element by adding or modifying rules.

There are twelve kinds of diagrams in the UML that are categorized as follow: Structural Diagrams, Behavioral Diagrams; and Model Management Diagrams. Structural Diagrams represent the static part of the model that is conceptual or physical. The structural diagrams include the Class Diagram, Object Diagram, Components Diagram and Deployment Diagram. Behavioral Diagrams represent the dynamic part of the model over time and space. The behavioral diagrams contain: the Use Case Diagram, Sequence Diagram, Activity Diagram, Collaboration Diagram and Statechart Diagram. Model Management Diagrams are the organizational parts of the UML. They include Packages, Subsystems and Models.

Use case is a behavioral diagram used to model requirements at the beginning of the software development life cycle. According to Booch et al. "A use case is a description of a set of sequence of actions, including variants that a system performs to yield an observable result of value to an actor" Use cases specify actors and their intended usage of the envisioned system. Such usage—usually, but not always—is specified in terms of the interactions between the actors and the system, thereby specifying the behavioral requirements of the proposed software. The scenario contains a normal scenario, and alternatives. The actor represents a coherent set of roles that the users of a use case exercise during the interaction. An actor may be a human, a hardware device or an external system that needs to interact with the system under design.

Use cases are written in an informal natural language that is easy for modelers and stakeholders to use and to understand. There is no standard on how to develop the use case or to what degree a modeler should go. Thus, different people may write varying degrees of details for the same use case. A use case may carry a high level goal such as the whole system goal, or a low level operation. The modeler is free on which degree of decomposing. A use case is a textual description that may include—but is not limited to: actors, preconditions, post conditions, normal scenarios and abnormal or exceptional scenarios. FIG. 1a shows an example of a use case description:

In contrast, a use case diagram visualizes actors and their relationships with use cases. A use case diagram is essential for visualizing, specifying, and documenting the behavior of an element. It provides a perspective view of the system interaction. FIG. 1b shows an example of a use case diagram.

The structure of the use case can vary. There are three relationships that can be used: an include relationship can be used to reduce the duplications of similar behavior across more than one use case. An extend relationship can be used when describing a variation on normal behavior in another use case, i.e., splitting the normal scenario from the variation scenarios. A generalization relationship can be used when two use cases do the same work, but one of them does more (i.e. inheritance); it is just like the generalization among classes.

Figure 3:
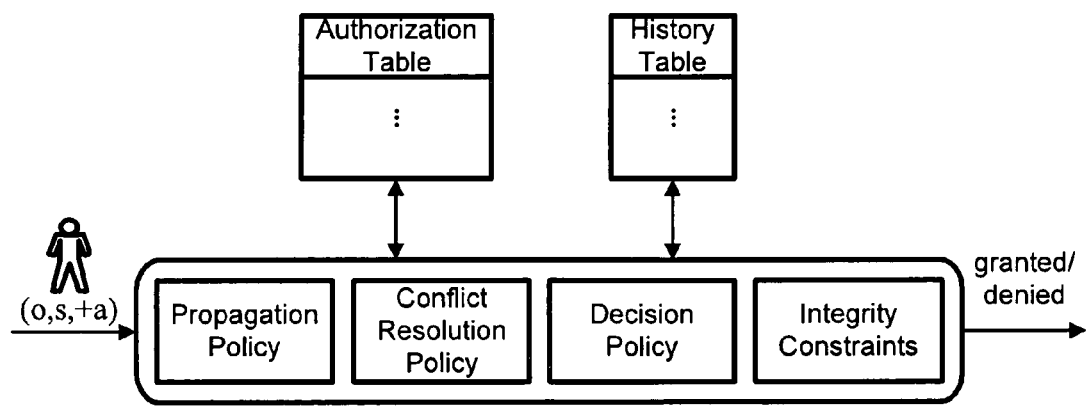
FIG. 3 shows a FAF system architecture.

A sequence diagram is a behavioral UML diagram. The interaction diagrams describe how groups of objects collaborate in a particular behavior. For each use case, modelers need to specify how objects that participate in the use case interact with each other to achieve the goal of the use case. Sequence diagram shows the sequence of messages—ordered with regard to time—between objects. FIG. 3 shows an example of a sequence diagram.

Object Constraint Language. A writing constraint is necessary because not all constraints can be drawn in the UML. The constraint must be relatively easy for a software developer to write and read. Also, it must be precise enough to prevent ambiguities and imprecision. A natural language is easy to read and write but it is imprecise. On the other hand, formal languages are precise, but they require a strong mathematical background. OCL is based on basic set theory and logic and it is intended to be used by the software developers. OCL can be used to specify invariants, preconditions, postconditions and other kinds of constraints in the UML.

OCL employs the design by contract principle, where modelers can use OCL expressions to specify the pre- and postconditions of operations on all classes, interfaces, and types. OCL is an expression language where it has no side effect where it returns a value, but cannot change any values. OCL is a typed language. To be well formed, OCL expressions must obey the type conformance rules of the language. OCL provides elementary types, e.g., Boolean, Integer, Set, Bag, and Sequence, etc. According to the OMG's OCL specification of OCL, OCL can be used to: Specify invariants on classes and types in the class model; Specify type invariant for Stereotypes; Describe pre- and postconditions on Operations and Methods; Specify constraints on operations; Describe Guards; and Function as a navigation language.

Figure 4:
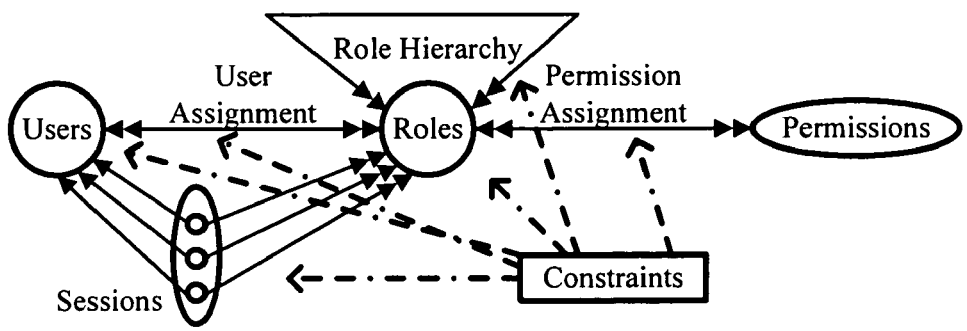
FIG. 4 shows a role-based access control mode.

Flexible Authorization Framework. The Flexible Authorization Framework (FAF) is a logic-based framework to specify authorizations in the form of logical programming rules. It uses a Prolog style rule base to specify access control policies that are used to derive permissions. It is based on four stages that are applied in a sequence, as shown in FIG. 4. In the first stage of the sequence, some basic facts, such as authorization subject and object hierarchies (for example, directory structures) and a set of authorizations along with rules to derive additional authorizations, are given. The intent of this stage is to use structural properties to derive permissions. Hence, they are called propagation policies. Although propagation policies are flexible and expressive, they may result in over specification (i.e., rules could be used to derive both negative and positive authorizations that may be contradictory). To avoid conflicting authorizations, the framework uses conflict resolution policies to resolve conflicts, which comprises the second stage. At the third stage, decision policies are applied to ensure the completeness of authorizations, where a decision will be made to either grant or deny every access request. This is necessary, as the framework makes no assumptions with respect to underivable authorizations, such as the closed policy. The last stage consists of checking for integrity constraints, where all authorizations that violate integrity constraints will be denied. In addition, FAF ensures that every access request is either honored or rejected, thereby providing a built-in completeness property.

Access control policies. Organizations have a set of policies to maintain their goals. One important policy is the access control policies. Access control policies bind the actions or activities that a legitimate user of a computer system can execute. They protect information from unauthorized access.

Discretionary Access Control. Discretionary access control (DAC) restricts the access of subject to object based on the subject's identity and authorization. The object's owner at his/her discretion allows or disallows other subject to access the object. It is a flexible model that has been adapted widely by commercial and industrial systems. However, DACs do not control the usage of information after it has been legitimately accessed. That may lead to low assurance of flow of information. For example, a subject that is authorized to read the data of an object can write that object's data to another object that allows subjects who are not authorized to read the first object to read the second object's data.

Mandatory Access Control. Mandatory Access Control (MAC) restricts the access of subject to object on the basis of classification of subjects and objects in the system. All objects are labeled with levels of sensitivity and all users have clearances that allow them to access objects according to the level of the objects. Flow of information is controlled in MAC-based systems by preventing information read from a high-level object to flow to a low-level object. MAC is widely used in military and government systems.

Role-based Access Control. In RBAC, the central issue is roles, which are absent in other two access control models. Role-based access control (RBAC) governs the access of subject to object based on the role that the subject assumes during execution. FIG. 4 depicts the RBAC model. A user can be a human being, a process or a device. A role is a job function or title within the organization that describes the authority and responsibility conferred on a user assigned to the role. Permission is an approval of a particular action on an object. Roles are structured in a partial order relationship or hierarchy. A senior role inherits all permissions of its junior role. Each role has a set of permissions that allow the role to complete its job or function. A user must assume a role by invoking a session to perform the role's job. A user can be a member of more than one role and a role can include more than one user. RBAC has several benefits: Authorization management: RBAC breaks the authorization into users, roles and permissions. This division eases the management of authorization, i.e., invoking and revoking a user from a job is a straightforward step of modifying the user assignment relationship. Hierarchal roles: another simplification of authorization management is the hierarchal relationship among roles. It is a relation of generalization/specifications where a senior role inherits all the permissions of its junior role. Least privilege: only the permissions required for the task performed by the user in the role are assigned to the role. Least privilege principle reduces the danger of damage that may be result from errors or intruders masquerading as legitimate users. Separation of duties: completing a critical task needs the invocation of mutually exclusive roles. It prevents errors and frauds. An example of mutual exclusive roles is the account payable manager and the purchasing manager; a user must not assume both roles. There are two major types of separation of duties: static and dynamic.

Extending The UML Metamodel. As the UML becomes the de-facto language for software design, it is important to have a sufficiently rich linguistic structure to model security specifications accurately. This section discloses such an extension (as per the present invention) to the UML to specify dynamic access control policies in the design phase by extending the UML metamodel with a security policy specification and enforcement module, a log of method call histories and business tasks. This section shows that it is possible to specify access and flow control policies using the elements of the UML.

The extension of the metamodel is a set of related elements necessary to model existing access control models in the UML. Such elements can be incorporated differently for each access control model. An advantage of this invention is the ability to enforce dynamic access control and flow control policies with the UML. These aspects of security cannot be expressed in static UML diagrams. Thus, the present invention provides for modeling them as constraints over interaction diagrams. In addition, the present invention also focus on flow constraints using the industry standard, OCL.

Most initiatives proposed by researchers toward integrating security into the design of systems lack the representation of the dynamic access control and workflow policies. Their approaches are focused on static access control policies that can be modeled using static diagram. Dynamic access control policies rely on system states and other histories to authorize systems' users. For example, Dynamic Separation of Duty principles rely not on user's privileges, but also on execution history of operations.

The reminder of this section is organized as follows. First, an example is presented to be used during the section to show the features of the new Metamodel. Then, a new Metamodel is disclosed. Next, there is a discussion of how to apply the new metamodel extension to the running example. Finally, three case studies of existed access control model are presented with a description of how to represent those models using the new Metamodel.

Figure 5:
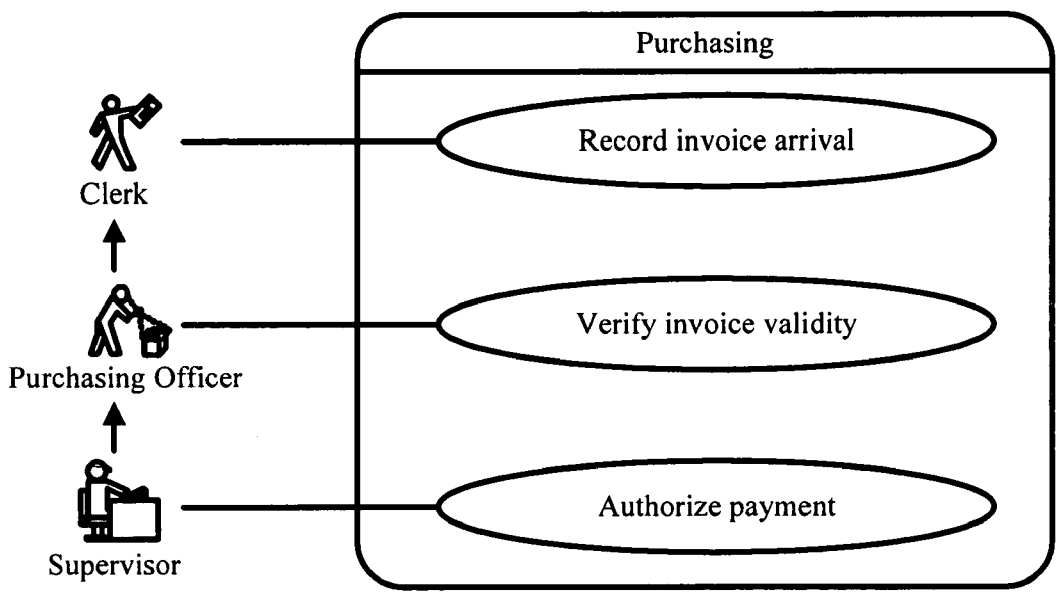
FIG. 5 shows use cases for a purchasing process.
Figure 6:
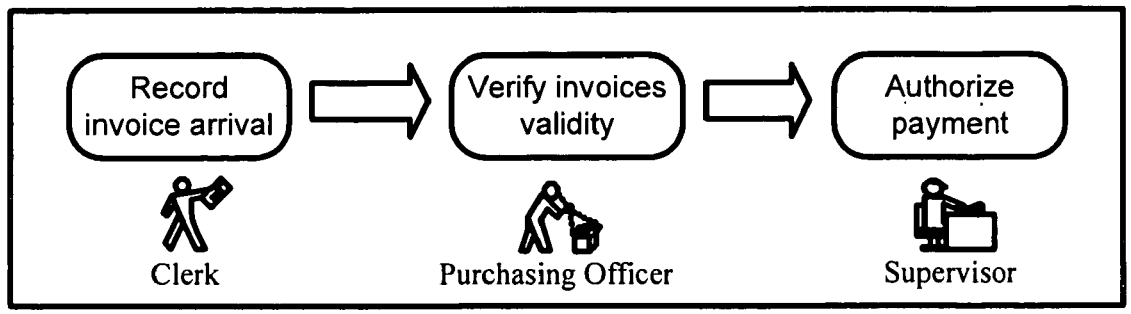
FIG. 6 shows sequencing of purchasing process workflow.

Running Example. This example demonstrates the application of the extension. It is based on RBAC, and it is about a typical purchasing process. As shown in FIG. 1, it consists of three use cases: Record invoice arrival, verify invoice validity and authorize payment that is ordered as shown in FIG. 5. The example requires different types of authorization policies:

First, Required Sequence of operations where each use case (except the first) has a prerequisite action, as shown in FIG. 6. For example, Authorize payment cannot start until verify invoice validity is complete. Second, Role Restrictions where each operation can only be executed by a particular role. For example, the Verify invoice validity can be invoked only by the Purchasing Officer role. However, the Purchasing Officer role is a part of a role hierarchy where lower roles inherit higher role permissions. Therefore, the Supervisor role is allowed to execute the Verify invoice validity, because (s)he inherits the permission of the Purchasing Officer role. Nevertheless, this is not always preferred in real world scenarios. Therefore, there should be a way to explicitly restrict certain roles. Third, Dynamic Separation of Duty policy states that no user is allowed to perform all—or a specified subset—of the three operations on the same invoice, in order to avoid fraud. For example, any actor that is allowed to record the arrival of invoices must not be allowed to verify the validity of the same invoice. In my model, it is possible to enforce finer dynamic access control policies by restricting not just the roles, but the users as well. Fourth, Conflict avoidance and/or resolution policy can be enforced to avoid any conflict, either between simultaneously active roles or operations permitted for such roles.

Extension to the Metamodel of UML. This section presents an extension of the UML metamodel that allows system developers to design dynamic authorization and workflow policies in the design phase using the UML. This metamodel extends the UML's core package that defines basic types required to model objects such as classes, attributes, operation and associations. It does so by using stereotypes for new types and tagged values for new attributes on existing types. Explicitly, three new metamodel types are added: 1) security policy constraints (SPC) that hold and impose constraints necessary to model security, it plays the role of monitor, 2) a history log that records all actions executed by the system and 3) business tasks that act as a reference architecture for encapsulating related tasks within a single entity. The new metamodel extensions are sufficiently flexible to accommodate not only RBAC, but also other access control models and workflow policies. Following subsections explain the metamodel in detail.

Figure 7:
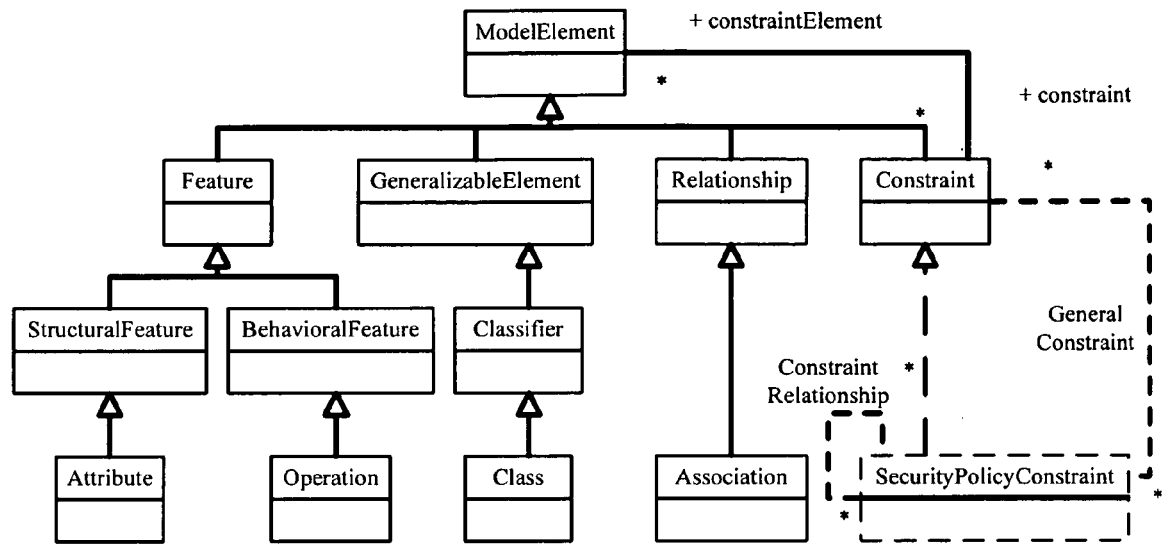
FIG. 7 shows security policy constraints' relationship in a core package.

Security Policy Constraints. SPC is a specialized type of constraint element in the Core package of the UML's metamodel. It is shown with a broken line in FIG. 7 with the UML core metamodel. Therefore, SPC can be related to any specialized elements from ModelElement. For instance, SPC can be related to Class, Operation, Attribute or Association. SPC has two associations, one with itself and the other with the Constraint element. These associations are used to refer to other constraints. Therefore, SPC is a set of explicit or implicit constraints that are imposed in association with other SPCs or constraint elements.

Table 1 shows an example of an SPC from the authorize payment operation in the running example; the SPC consists of three constraints written in OCL. The first constraint limits role access to operations. The second constraint makes sure that the current user is not the same one that performed the prerequisite task. The third constraint specifies operation prerequisites. These constraints are just an example of the types of constraints in the SPC. They are written in a generic way that can be applied to other SPC's of other objects. However, constraints can also be written in a specific way (e.g., by explicitly naming the object, role, user and operation in the constraint), but that will limit their re-use.

TABLE 1

An Example of the SPC of the Authorize Payment Operation
Security Policy Constraint (SPC)

| Operation | Policy | Constraint(s) |
|---|---|---|
| Authorize_ Payment | Role Restriction | (User→select(user = CurrentUser)).role→intersection(CurrentOperation.allowedroles)→size > 0 AND (User→select(user = CurrentUser)).role→Intersection(CurrentOperation.Deniedroles)→size = 0 |
| Authorize_ Payment | Avoiding of Conflicting User | ((ConflictingUsers→select(UserName = CurrentUser))→collect(users)→asSet( ))→intersection((History_Log→select (Action = BusinessTask→select (Task = "Purchasing").Operation→Prior (Operation = CurrentOperation)) AND Object = CurrentObject))→collect (ActionUser))→isEmpty |
| Authorize_ Payment | Operation Sequence (Workflow) | History_Log→select (Action = BusinessTask→select(Task = "Purchasing").Operation→Prior (Operation = CurrentOperation)) AND Object = CurrentObject)→notEmpty |

One of the main issues to be addressed by security constraints is their placement in the UML models and the metamodel. If all constraints are imposed on one object, then that object encompasses all access control specifications. While centralizing the design at the Meta level, this option has the advantage of having a clean separation of security policy from the rest of the design. This facilitates applying different security policies to the same design.

Conversely, each object or combination of objects can be decorated with corresponding security policy constraints. While not giving rise to difficulties in binding objects to their constraints and encapsulating policies within objects, this approach presents a security nightmare. That is, it scatters the security policies governing a piece of software throughout its design diagrams. There is also the danger of confusing the difference between security constraints from other types of constraints such as performance and design integrity. However, separating each object with its security policy constraints in different objects, such as SPCs, can solve the latter problem of mixing security policies with other types of policies, but it does not solve the problem of scattering security policies all over the design.

History Logs. In order to enforce history based and dynamic access control policies, the history log is now introduced. It maintains method and task execution histories. The history log may also facilitates auditing—an important aspect in enforcing security specifications. The history log can also be maintained centrally or distributed. Maintaining centralized history logs can detect inter-object conflicts, although it may become a performance bottleneck for larger designs.

Business Tasks. In the business world task may consist of more than one operation. For example, the purchasing task in FIG. 6 consists of three operations: record invoice arrival, verify invoice validity and authorize payment. Because many duties, in the sense of separation of duty principles, are formulated in terms of business tasks, I model business tasks as first class objects. Specifying operations as a part of a business task means that no user can perform all the operations of a single business task on a single object that leads to fraud and errors.

Conflicts. Some operations may conflict with others. For example, a single user should not perform the writing a check operation and the signing a check operation. In addition, conflicts may occur between roles, e.g., the purchasing officer role and the accounts payable manager role. Conflict may also take place between users, e.g., relatives should not execute complementary critical tasks. For that reason, I introduce three conflict associations: conflicting user, conflicting roles and conflicting operations.

Interactions Between SPCs, History Logs and Business Tasks

Figure 8:
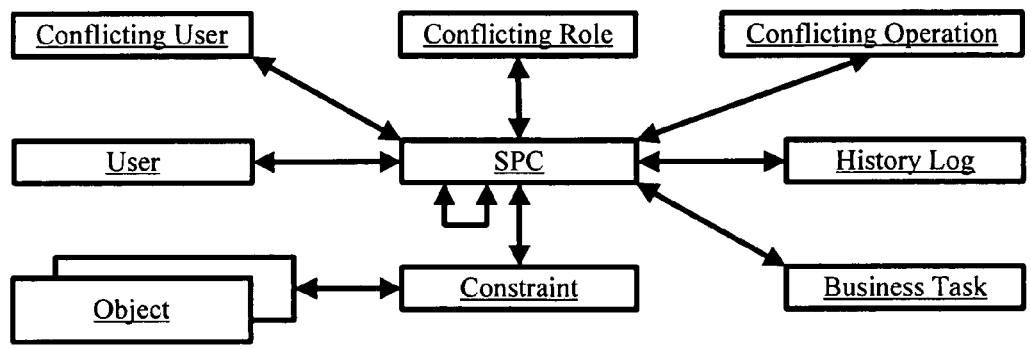
FIG. 8 shows SPC interactions with other elements.

FIG. 8 demonstrates how the SPC may interact with other elements of the metamodel in order to validate access control policies. The SPC is the aspect of the model that intercepts each method's call and validates the permission of the caller. The SPC decides according to the set of all authorization constraints related to the called operation. These constraints rely on some data contained in other objects. Objects can be one of the following: First, History_Log contains a log of all users' actions. Second, Business Task contains all required operations for a particular task. This information can be used to prevent a user from executing all operations of a single task that may lead to fraud and errors. Third, conflicting sets of (roles, users, and operations) are used as a knowledge base by the SPC to prevent conflicts. Fourth, users and objects can be consulted to provide identity and other attribute values that are helpful to validate constraints.

Enforcing Access Control Constraints. In order to enforce security constraints, it is assumed that every system designed with this metamodel has a reference monitor. The reference monitor ensures that its execution does not violate security related constraints, and filters every method call. In order for this to be effective, it may be assumed that all attributes are encapsulated inside their classes and cannot be accessed other than by calling those operations. A reference monitor may not necessarily have to be implemented as a centralized entity as such a design may introduce vulnerabilities. However, it can be modeled and implemented in a decentralized manner to suit new decentralized computing paradigms.

Applying the New Extension to the Running Example. This section shows how the new metamodel can be applied to the running example described earlier. Here, it is demonstrated that Use Cases result in flow constraints. The following are some sample security related requirements and their translations as OCL constraints: First, Required sequence of operations (Workflow policies): Enforcing this policy requires writing constraints in the SPC and consulting the History_Log and the Business_Task for previous actions. The business task is consulted to get the sequence of operations in a single task, and the History_Log is used to validate the occurrence of previous operations. For example, this policy is enforced on the Authorize Payment use case by the following preconditions written in OCL:

Context Invoice:: Authorize_Payment( ):Void

Pre: History_Logτ select(Action=(Business_Taskτ select(Task="Purchasing").Operationτ

Prior (Operation=CurrentOperation)) AND
    Object=CurrentObject)τ notEmpty (1)

Second, Role constraints: Allow only permissible roles and restrict unauthorized roles. Suppose that the supervisor role is prohibited from executing the verify invoice validity operation. This constraint can be directly specified in OCL as follows:

verify_invoice_validity.AllowedRoles={PurchasingOfficer} verify_invoice_validity.DeniedRoles={Supervisor} (2)

However, to express it as a precondition in the SPC, it can be written as follows:

Context Invoice::verify_invoice_validity ( . . . ):Void

Pre:(Userτselect(user=CurrentUser)).roleτ intersection(CurrentOperation.Allowedroles)τsize>0

AND(Userτselect(user=CurrentUser)).roleτ intersection(CuurentOperation.Deniedroles)τsize=0 (3)

These are written as general constraints that can enforce the Role Restriction policies. They consist of two expressions. The first expression intersects two sets: the current user' roles and the current operation's allowed roles (i.e., the Verify invoice validity operation). If the result set is not empty then the user is allowed to perform the operation and otherwise disallowed. The second expression ensures that none of the user's roles are in the current operation's denied roles. For example, a user playing the Supervisor role cannot perform the verify invoice validity operation, because it is in the operation's denied roles.

Third, Dynamic separation of duty: According to the original specification, recording the arrival of the invoice and the authorization of the payment has to be performed by two different subjects. This DSOD requirement can be satisfied by enforcing the following precondition on the authorize payment method.

Context Invoice:: Authorize_Payment( ):Void

Pre: History_Logτ select(ActionUser=CurrentUser
    AND action="record_invoice_arrival" AND
    Object=CurrentObject)τisEmpty (4)

This constraint ensures that there should not be any record in the History_Log that shows that the current user has executed the Record invoice arrival operation on the current invoice. Note that there is no similar constraint on the Authorize payment operation because the Supervisor role is not allowed to perform the Verify invoice validity operation. Also, note that users and not roles are being used to specify this constraint, because users allow me to impose finer constraints than roles in this context where a role consists of a set of users.

Fourth, Conflict avoiding policies. The conflict association in each User, Operation, or Role is used to enforce this kind of policy. For example, the following constraints ensure that the current user is not in conflict with the user who performed the previous operation of the task:

Context Invoice:: Authorize_Payment( ):Void

Pre:((ConflictingUsersτselect
    (UserName=CurrentUser))τ collect(users)τasSet( ))τintersection((History_Logτ
    select (

Action= (Business_Taskτ select(Task="Purchasing")
    .Operationτ

Prior(Operation=CurrentOperation))AND

Object=CurrentObject))τ collect(ActionUser)τ is
    Empty (5)

Figure 9:
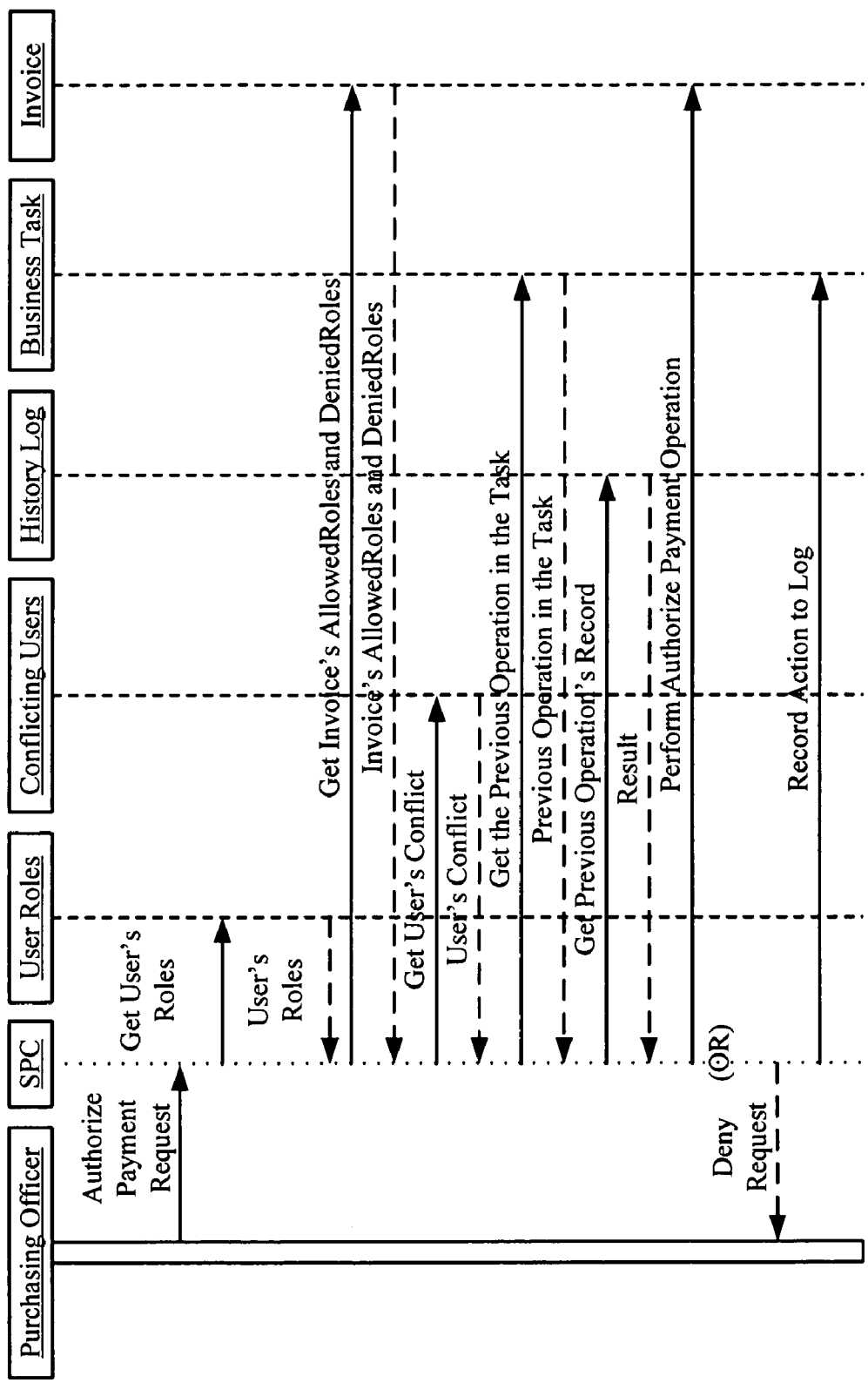
FIG. 9 shows a sequence diagram for an authorize payment use case.

FIG. 9 shows the sequence diagram of the authorize payment use case. It is an example of how the SPC interacts with other objects to validate the call to Authorize Payment operation. As stated, every method call in FIG. 9 is redirected to the reference monitor—the SPC. That shows that all security requirements are enforced and are based on the fact that we can translate all security requirements to constraints on method calls and, therefore, they can be enforced by filtering method calls at the SPC. This argument assumes that SPC can be designed to enforce all requirements so translated.

Case Study of Existing Security Models. In this section, it is shown how to enforce three examples of security policies taken from the security literature. The first is RBAC the second is flow control polices by Ferrari et al. (See E. Ferrari, P. Samarati, E. Bertino, S. Jajodia. Providing Flexibility in Information Flow Control for Object-Oriented Systems. *Proc. IEEE Symp. on Research in Security and Privacy*, Oakland, Calif., May 1997, pp. 130-140); and the third is the distributed authorization processor by Kraft (see R. Kraft. Designing a Distributed Authorization Processor for Network Services on the Web. *Proc. ACM Workshop on XML Security*, Fairfax, Va. 2002).

Figure 10:
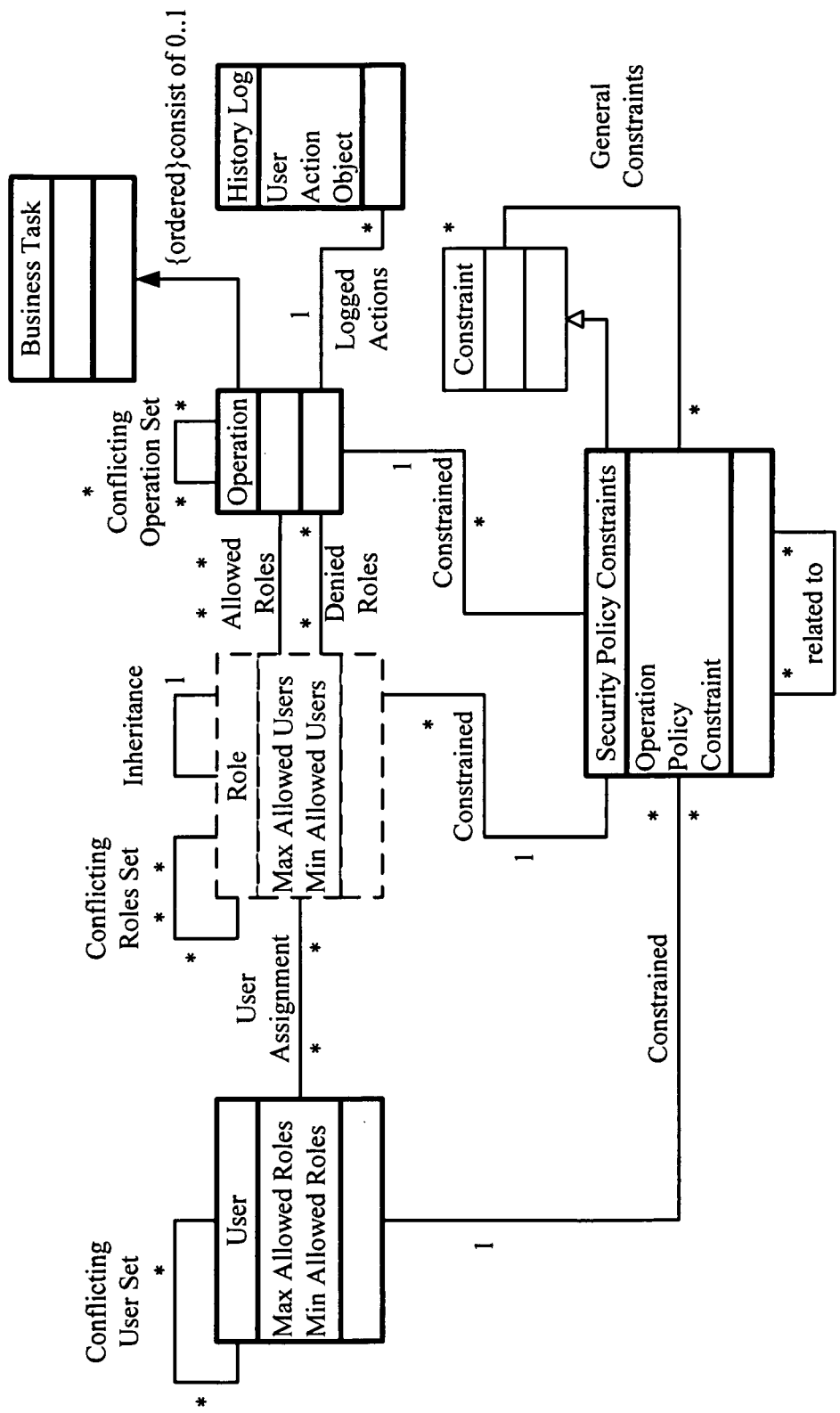
FIG. 10 an RBAC metamodel.

Role-based Access Control Metamodel. This section shows how to enforce RBAC in a real, secure, application design. In order to enforce RBAC models, the core of RBAC was extended as suggested in the new metamodel and shown in FIG. 10. The dotted lines represent the extension of the new metamodel to model RBAC polices in the UML, while the rest of the diagram represents my extension of the UML. The following section shows RBAC policies and how to model them using the new metamodel:

Dynamic separation of duty (DSOD): The business task element holds all related operations of a single business task and the history log records all previous actions of all users on all objects. Those two types of information suffice to enforce DSOD.

Static separation of duty (SSOD): The constraint associations between the SPC and other elements such as User, Role and Operation are the required information for this policy.

Flow control and workflow: The SPC gets the sequence of operations in a Business Task and query the history log to check whether the previous operation to the current one is already completed.

Conflicts in User, Role and Operation: To avoid such conflicts I specify three distinct associations that are related to Role, User, and Operation.

Cardinality in Roles and User elements: I have extended Role element by adding tagged values: MaxAllowedUsers and MinAllowedUsers, that are used to limit the number of users in each role. For example, only one user should play the CEO role and, hence, the MaxAllowedUsers is 1. Note that the same is true with Users.

The extension for RBAC introduces two associations: AllowedRoles and DeniedRoles where the former represents all roles that are allowed to execute an operation and the later represents all denied roles. Moreover, an operation with no AllowedRoles association is considered open or closed to all roles according to the access control meta-policies such as open-policy or closed-policy respectively, unless some roles are denied in the DeniedRoles association.

Workflow Policies. The extension can be used to specify and enforce workflow and information flow control policies in object-oriented systems such as the flexible flow control model of Ferrari et al. This strict policy of allows writing an object O' that depends upon the reading of object O only if all readers of O' are a subset or equal to the readers of O. But the approach they presented adds flexibility to this strict policy by introducing two types of exceptions to methods: First, exceptions on releasing information based on return parameters of a method called reply-waivers; and Second, exceptions for passing information by parameters of a method that are called invoke-waivers.

The model uses three components when deciding to permit an information flow. They are: first, Access Control Lists (ACL) for each object; second, reply waivers for each operation where each waiver contains the objects and a set of users who are waived to receive the operation's returned value; and third, invoke waivers for each operation where each waiver contains the objects and a set of users who are waived to invoke the operation.

Figure 11:
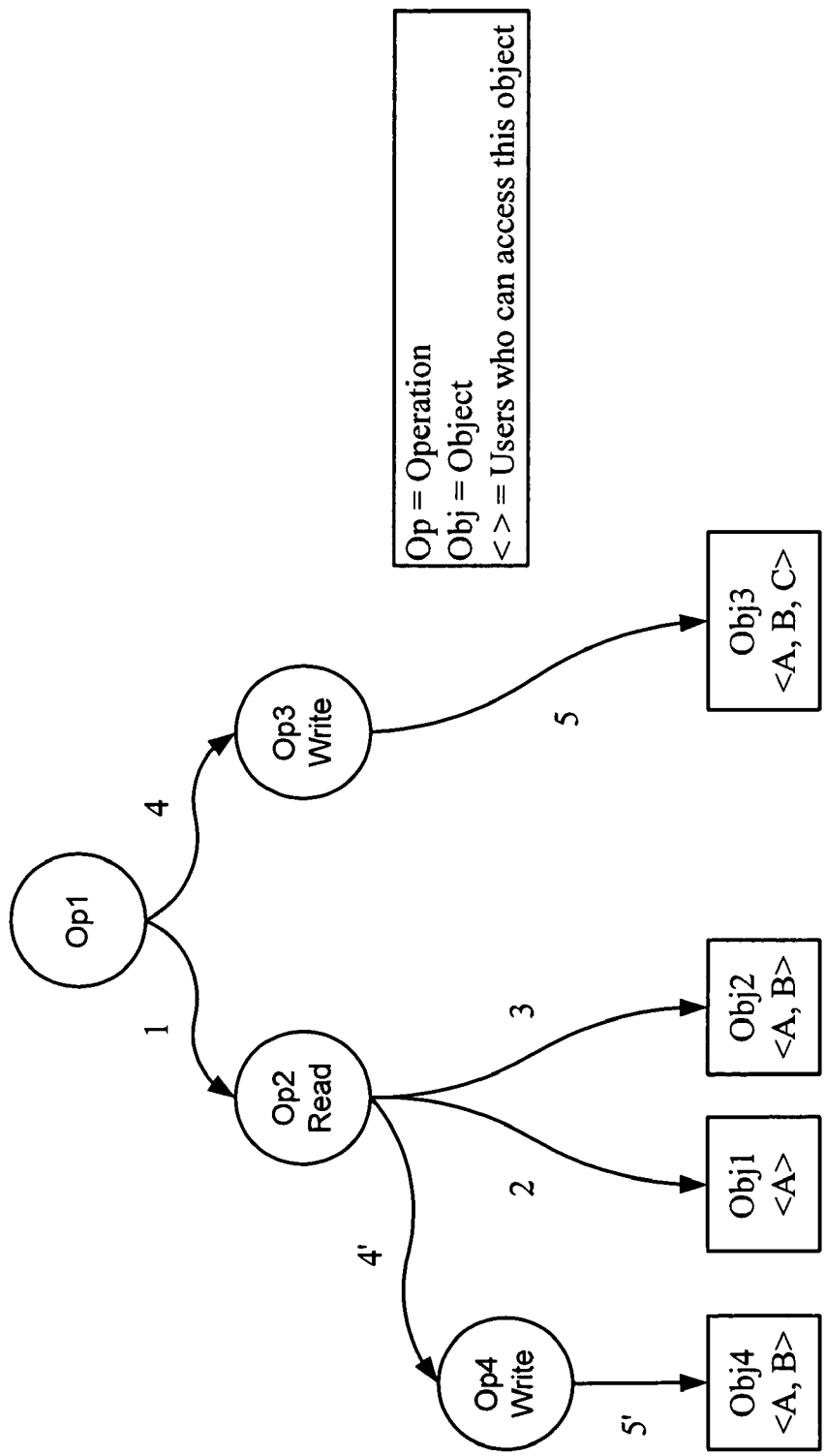
FIG. 11 shows a transaction execution tree.

The example in FIG. 11 shows a transaction execution tree of method Op1. Each operation either reads from object or writes to object. Each object have a set of users who are allowed to access the object. Op1 calls Op2 which reads Obj1 and Obj2, and after the completion of Op2, Op1 calls Op3 which writes the information read from Op2 to Obj3. According to strict policy, Op3 cannot write to Obj3 because the information that is needed to be written in Obj3 came from more restrictive Objects than Obj3. For example, the Obj3's users set is not a subset or equal to the users of Obj1 and Obj2. Likewise, Op4 will not execute, because it intends to write information that is read from more protective object (i.e., Obj1). However, Ferrari provides more flexibility than the strict policy. If a reply waiver is attached: {({Obj1},{B, C}), ({Obj2},{C})} to Op2 then Op3 can write the information because this is a safe flow according to the safe flow theorem. Also, if a revoke waiver is attached: ({{Obj1}, {B}}) to Op4 then Op4 can write to Obj4 freely because now the users who can access Obj4 is a subset or equal to the ACL of Obj1 and Obj2, plus the invoke-waivers of Op4, e.g., the safe flow theorem.

One important element of the model is the message filter. It is a trusted system component that intercepts every message exchanged among objects in a transaction to prevent unsafe flows. The message filter relies on a concept called folder to check each message exchange.

Figure 12:
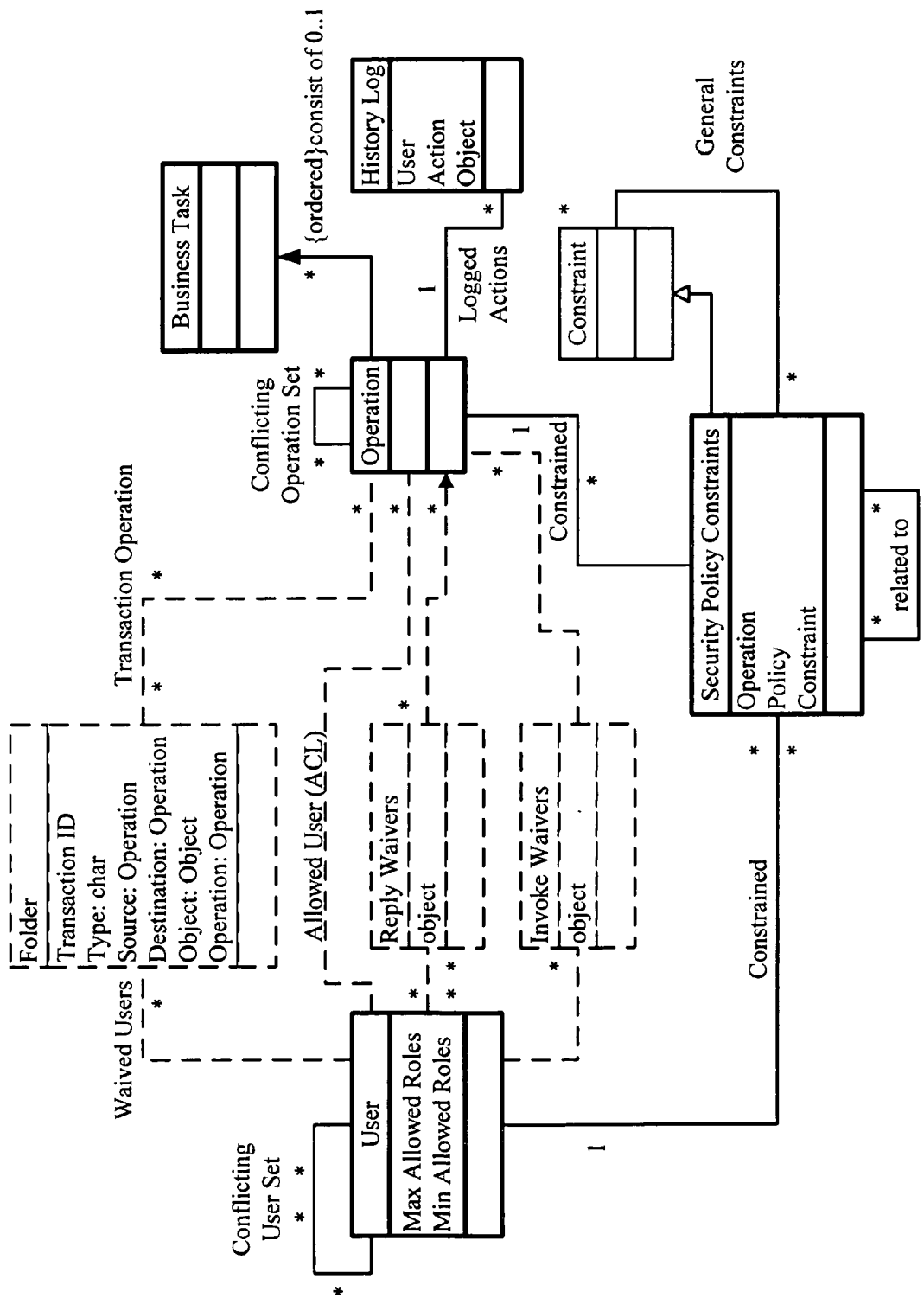
FIG. 12 shows a metamodel for a flexible information flow control model.

A many-to-many association between user and operation can represent ACLs. For example, each object's operation may have one or many users who are allowed to access it, and each user may be allowed to access one or more of the same object's operation, as shown in FIG. 12. Waivers are new elements attached to each object's operation in one end and to the User on the other end.

A folder is a set of records where each record holds the waivers applicable to the information flowing. To represent it in my model, I use the history log as a representation of the folder to store the required information. The history log in this model is associated at one end with operations because each folder's record should be related to one operation at one end (i.e., the first execution of the transaction) and to the user at the other end (i.e., the allowed users of each folder). The folder records consist of a transaction id, the type of folder (backward or forward), the execution source (i.e., an operation), the execution destination (i.e., an operation), the object's identification, and the object's operation, and each record is associated with a set of allowed users. The message filter intercepts each message to prevent unsafe flows by checking the ACL, the reply-waivers and the invoke-waivers, or to construct folders.

Representing Distributed Authorization Model. In this section, it is disclosed how the new metamodel can be used to model a new proposal of a Web service's authorization by Kraft. Web services provide an easy development, deployment, maintainability and accessibility through the Internet. However, security must be imposed on Web services to succeed. There are security standards and proposals to achieve better security on Web services and one of them is a Kraft proposal on the Web service's authorization. Kraft introduces a distributed authorization processor architecture that incorporates basic Web service objects, plus aggregation, composition, operations and specialization on Web services. The model designed as a SOAP (Simple Object Access Protocol) filter gateway that operates as an authorization service for Web services. The distributed authorization processor is based on two components: a gatekeeper and an authorization processor. Authorization Processor is a web services that makes authorization decisions for a Web services component, whereas, a gatekeeper is an authorization processor that has to make the final decision on granting or denying requests. Each Web service component may have one or more authorization processor while it may have at most one gatekeeper. Also, a gatekeeper has the function of authenticating principles of incoming requests. Another issue is that Web services may belong to a web services collection; therefore, in order to access a Web service that is a member of a collection, the gatekeeper needs to check the Web service's authorization processor and the collection's authorization processor to make the authorization decision.

Figure 13:
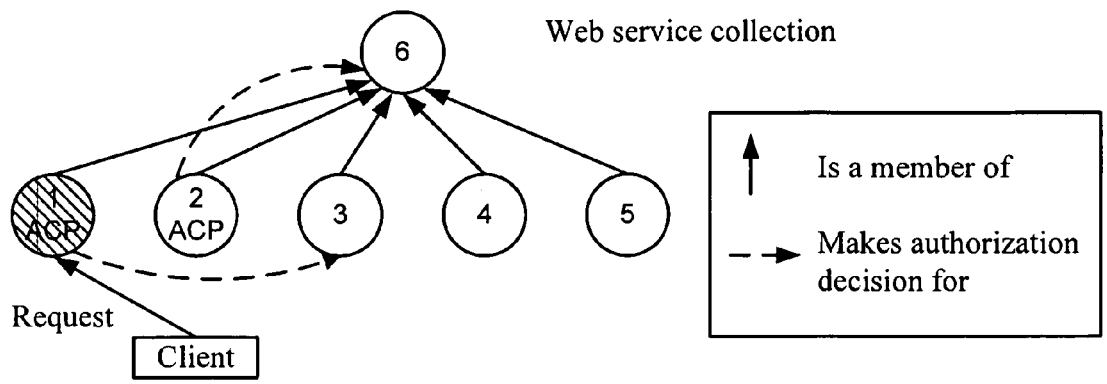
FIG. 13 shows a distributed access control processor architecture scenario.

A simple scenario is shown in FIG. 13. The scenario starts when a client request a Web service object 3, then the gatekeeper (#1) of the requested Web service (#3) intercepts the request to determine if the client is allowed to access the required Web service or not. Thus, first, the gatekeeper authenticates the client (I will ignore authenticating clients to focus on access control only). Second, the gatekeeper checks every access control processor that is related to the requested Web service (#3, #6) to find out whether the client is allowed. Because the Web service object 3 is a member of the Web service object 6, the gatekeeper must also check the access control policy (ACP) (#2) that controls the access to the Web service object 6. If all access control processors accepted the request, the gatekeeper routes the request to the requested Web service otherwise, it rejects the request.

The representing the Kraft model is straightforward using the new metamodel. Before showing how to model it, it is assumed that, when a client accesses a Web service, he/she is invoking an operation on that Web service. The authorization processor is a set of authorization constraints that are related to a specific Web service's operation. Therefore, the authorization processor is modeled as an SPC. Furthermore, because gatekeeper is an authorization processor, the gatekeeper is also modeled as an SPC. The SPC is flexible to accommodate any constraints that belong either to the authorization processor or the gatekeeper.

Kraft introduces the Web service collection, which contains a number of Web services. The access rights of any member are based on the union of both the Web service's access rights and the collection root's access rights for the Web service. Therefore, there should be some sort of representation of the relation between a member and its root. The new metamodel provide this representation by the association "related to" that associate Web service's SPC to its root's SPC.

Section Conclusions. Security needs to be integrated into the software development life cycle, and propagated throughout its various phases. Therefore, it is beneficial to have secure development integrated with industry standard methodologies and notations such as Rational Unified Process (RUP), Concurrent Object Modeling and Architectural Design with the UML (COMET) and the UML.

The UML metamodel is extended to specify and enforce access and flow control policies. Then SPC, business tasks and a history log is added. Then it was shown how security requirements could be specified and enforced by using new extensions. These requirements are in the access control, flow control and workflow specifications. Based on an implementation of the SPC as a reference monitor, it was shown how to enforce security requirements specified at the requirements specification stage of the life cycle.

Extending the Use Case Model

In this section, it is shown how to extend the use case model in a three ways: 1) access control schemas are presented that unify the specification of the access control policies in the use case, 2) An access control table is presented that visualizes the access control policies and helps in applying inconsistency and conflict resolution for small scale software systems, 3) the use case diagram is extended to show accurate access control policies.

Introduction. In the UML, requirements are specified with use cases at the beginning of the life cycle. Use cases specify actors and their intended usage of the envisioned system. Such usage—usually, but not always—is specified in terms of the interactions between the actors and the system, thereby specifying the behavioral requirements of the proposed software. A use case is a set of scenarios tied together by a common user goal. Use cases are written in an informal natural language. Thus, different people may write varying degrees of details for the same use case. Currently, a use case is a textual description with: 1) actors and/or their roles; 2) preconditions and post conditions, 3) normal scenarios with sequence of actions by the actors and/or the system; 4) abnormal or exceptional scenarios. In contrast, a use case diagram visualizes actors and their relationships with scenarios. As will be demonstrated during the course of this section, use cases are not sufficient to model the details of access control policies. Consequently, the use cases model is enhanced by adding something analogous to (soon to be discussed) operation schemas.

Operation schemas, introduced by Sendall and Strohmeier (see S. Sendall, A. Strohmeier: From Use Cases to System Operation Spec-ifications. *In the conference of the Unified Modeling Language conference,* 2000) enrich use cases by introducing conceptual operations and specifying their properties using OCL syntax. The operation schema can be directly mapped to collaboration diagrams that are used later in the analysis and design phases.

Although operation schemas are precise, they do not specify system security. Therefore, the operation schemas may be extended to cover access control (hereafter referred to as the access control schema). Introducing an access control schema as a separate syntactic entity has several advantages. First, it isolates access control policies from other functional requirements that are usually elaborated in operation schemas. Second, this separation facilitates several access control policies to one use case, thereby modularizing the design.

There is a need for negative authorization as there is a need for positive authorization. In particular, with the presence of subject hierarchy, the need for explicit negative authorization is greater because subjects do not have explicit authorizations only, but also may have implicit authorizations from the inheritance of the junior subject's permissions. Therefore, negative authorizations are used to block some positive authorizations that have been granted to subject. With the introduction of a negative authorization, there is also a need to manage any conflict between authorizations (positive and negative).

Sometimes use cases over-specify or under-specify authorizations, leading to inconsistency and incompleteness, respectively. In order to avoid both extremes, security literatures use conflict resolution and decision meta-policies. These two policies may be applied to the use cases. In addition, adhering to the visual specification tradition of the UML, access control tables may be attached to visualize the process of applying meta-policies in conflict resolution.

Based on resolved complete and consistent policies, refined use case diagrams is refined that illustrate access control policies visually. A methodology with the following steps may be applied: 1) writing the access control policy schema, 2) developing an access control table and applying propagation, conflict resolution, and decision policies on all use cases, 3) propagating authorizations to operations, 4) resolving conflicts in the access control table for operations; and 5) drawing the refined use case diagram.

This section does not show how to model or implement the access control policies, but it rather addresses the representation and management of access control policies at the early phases of the software development life cycle— thereby focusing on how to represent and produce conflict-free and complete authorizations. The output of this work can be used later to feed other access control mechanisms such as FAF, Author-X or PERMIS.

The remainder of this section is organized as follows. First, an example will be explained that will be used throughout the section. Next, there will be a description of the steps for specifying the access control policies with the use case.

Figure 14:
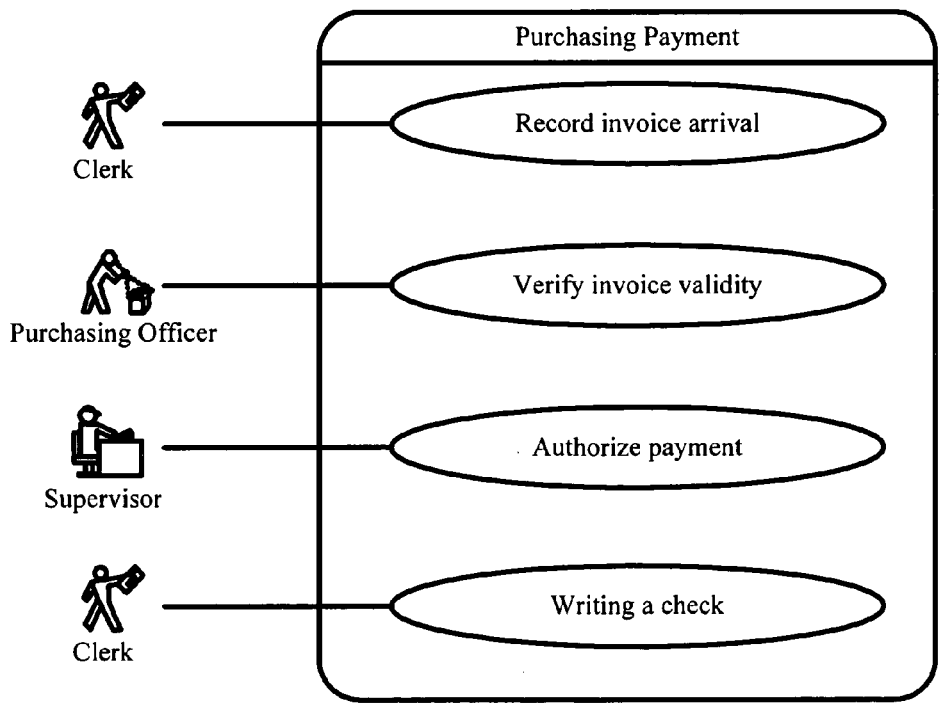
FIG. 14 shows a use case diagram.

Running Example. The running example describes a purchasing process where a set of tasks assigned to authorized roles as shown in FIG. 14. Role-Based Access Control (RBAC) is the access control model for this example. The set of access control policies applicable to this example are as follows: First, use cases such as record invoice arrival, verify invoice validity, authorize payment and write a check are to be applied in the specified order. Second, each use case should be executed by an actor playing an authorized role(s) as shown in FIG. 14. For example, the write a check use case should be invoked by (authorized to) clerk role. In addition, the role hierarchy implicitly authorizes a specialized role to inherit permissions. For example, according to FIG. 15, the supervisor role inherits the purchasing officer's permissions and the purchasing officer inherits the clerk's permissions. Third, Supervisor cannot execute the write a check use case. Fourth, no user should perform more than one use case on each object. This is a one type of Dynamic Separation of Duty (DSOD) policy. For example, a user should not record and verify the same invoice. This policy is claimed to prevent fraud and errors. FIfith, if the invoice's total amount exceeds one million, then two different supervisors must authorize the invoice.

Formal Steps for Specifying Access Control Policies: Writing Access Control Schema. Operation schemas do not cover access control policies. Therefore, the access control schema is introduced to specify them.

FIG. 16 and FIG. 17 show a standard format and an example of the access control schema, respectively. As shown in FIG. 16, an access control schema has: 1) Use case name, 2) Object, 3) Description, 4) Declarations, 5) Users and roles that are either authorized or denied to invoke a use case, and 6) Pre and post conditions of the schema. FIG. 17 refers to the authorize a payment use case of FIG. 14. The pre-condition of the schema in FIG. 17, has four constraints: 1) the invoice is already verified; 2) if the invoice's total amount is less or equal to one million, then the invoice must not be authorized yet, 3) if the invoice's total amount exceeds one million, then either the invoice is not yet partially authorized or partially, but not fully, authorized, and 4) the current user did not participate in any prerequisite operation on the same invoice. Conversely, the postcondition ensures the correctness of operations with respect to the access control constraints.

Figure 18:
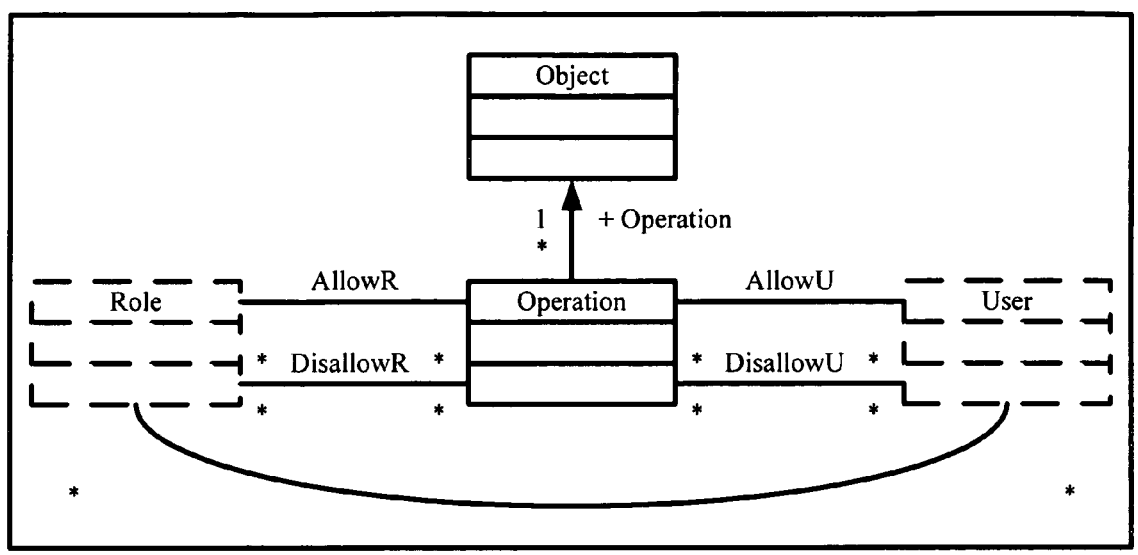
FIG. 18 shows an access control model.

Constraints. Authorizations in the form of authorized or denied clauses in the access control schema do not capture all access control constraints. Therefore, there is a need to properly express application constraints such as dynamic separation of duty. Next, some access control constraints will be provided in commercial systems, and several known versions of separation of duty (SOD) policies will be considered. It is shown how to write SOD policies as an OCL constraint in the integrity constraint clause of the access control schema. FIG. 18 illustrates the relationship between objects that are used to specify integrity constraints.

Static Separation of Duty Principles. Static SOD principles prevent subjects (role or user) from gaining permissions to execute conflicting operations. There are many kinds of static SOD policies and they are listed below:

Mutually exclusive roles: A user shall not assume two conflicting roles. For example, a user must not assume both the Purchasing Officer and the Accounts Payable Manager roles. This policy can be ensured if no user is enrolled in two mutually exclusive roles, say RoleA and RoleB and can be specified in OCL as follows:

(Role→select(name="$Role_A$")).user→ intersection(Role→select(name="$Role_B$").user)
→size=0

Business Task: A user must not execute a specified business task that comprises a set of operations. For example, user U must not be authorized to perform the Record, Verify and Authorize use cases on the same object and this can be specified as follows:

User.Allow$_U$→ select(Operation=$Operation_1$ OR
Operation=$Operation_n$)→size<$n$

Where n is the number of operations to perform a critical task.

Mutually exclusive operations: Mutually exclusive operations must not be included in one role, i.e., writing and signing a check must not be allowed to the Manager role.

Operation$A$.Allow$R$→intersection(Operation$B$.Allow$R$)→size=0

Dynamic Separation of Duty Principles. Dynamic separation of duty (DSOD) allows user to assume two conflicting roles, but not to use permissions assigned to both roles on the same object. There are several types of this policy. One DSOD constraint is to restrict the user from performing the Record, Verify and Authorize use cases on the same object. In order to specify this policy, a history of already granted authorizations must exist. For this purpose, a formal syntactic object History_Log may be added to maintain a Table of (user, role, operation, object and time).

Dynamic Separation of Duty: This version says that a user cannot perform more than n operation on the same object, stated as a precondition of an operation:

History_Log→select (User= CurrentUser AND (Operation=$Operation_1$ OR Operation=$Operation_2$
OR Operation=$Operation_{n-1}$) AND Object= CurrentObject)→size<$n$–1

Other Access Control Constraints. Role prerequisites: A user must be enrolled in a particular role before assuming another role. This can be stated as a postcondition of the role assignment where RoleB is the prerequisite role as follows:

User.Role→includes($Role_A$) implies
User.Role→includes($Role_B$)

Permission Prerequisites: A role must be authorized to execute a particular operation before granting that role with another operation. This constraint can be specified as a postcondition of permission assignment where OperationB is the prerequisite permission. For example, the Supervisor role cannot assume the authorizes a payment role unless this role already has a permission to read the invoice's data.

Role.Operation→includes($Operation_A$) implies
Role.Operation→includes($Operation_B$)

Cardinality Constraints This constraint specifies a maximum and/or a minimum number of operations that can be executed by a user or a role. This policy may be applied to the number of users for each role or to the number of permissions for a specific role. For example, the Supervisor role must have at most one user. This constraint can be specified as follows:

(Role→select(name=RoleName)).User→size <sign> n where <sign> is one of the following (<, >, <=, >=, <>, =) and n is the limit.

(Role→select (name=RoleName)).Operation→size <sign> n where <sign> is one of the following (<, >, <=, >=, <>, =) and n is the limit.

Developing an Access Control Table and Applying Propagation, Conflict Resolution and Decision Policies on All Use Cases. Use cases and their access control schemas may over or under specify authorizations, thereby resulting in inconsistency or incompleteness. To analyze access control policies in the early phases of small-scale software systems, the following steps are presented. First, present the access control of the use cases using the access control table. Second, apply the propagation policy. Third, apply the conflict resolution policy. Fourth, apply the decision metapolicy on the access control tables in order to resolve inconsistencies and incompleteness.

Access control tables show static access control policies rather than dynamic access control policies because the dynamic policies can be validated only during the execution time; thus, all that I can do during the analysis phases regarding the dynamic policies is to write the policies in unified constraints.

The access control table is a matrix where the $(i,j)^{th}$ entry in the Table is (✓)/(x) symbolizing if role i is permitted/prohibited in invoking use cases j. Table 2 shows the access control table for the use case of the running example.

TABLE 2

Access Control Table of The Running Example.

| Role\Use case | Record Invoice Arrival | Verify Invoice Validity | Authorize Payment | Write a Check |
|---|---|---|---|---|
| Clerk | ✓ | | | ✓ |
| Purchasing Officer | ✓ | ✓ | | |
| Supervisor | | | ✓ | x |

Next, it will be shown how propagation, conflict resolution decision policies can be applied to make an access control table complete.

Propagation Policies. Most systems use some kind of hierarchy, e.g., roles, subjects or objects. Hierarchies induce inheritance and, if the intended application has some form of applicable inheritance principles, they can be used to complete the access control table. These inheritance principles are referred to as propagation principles in the access control literature. Several examples of propagation policies are as follows: First, No propagation: Permission shall not propagate throughout the hierarchy. Second, No overriding: Permissions propagate through the hierarchy and other contradicting authorizations. Therefore, if an entity's authorization is positive and its ancestor's authorization is negative, then both authorizations apply to the entity. Third, Most specific overrides: If an entity has an explicitly granted permission, then that overrides any inherited permission. However, if the entity does not have an explicitly authorization, then its immediate ancestor's authorization will apply to the entity. Fourth, Path overrides: An entity's authorization overrides any inherited conflicting permissions for that node and for all unauthorized sub-nodes on the same path only.

It is up to the requirement engineer to choose the policy. Examples of how each policy is applied may be found in S. Jajodia, P. Samarati, M. Sapino, V. S. Subrahmanian, Flexible support for multiple access control policies, *ACM Trans. on Database Systems*, Vol. 26, No. 2, June 2001, pages 214-260 (hereafter JSSS01). Table 3 shows the access control table of the running example after applying the most specific overrides policy where ✓✓ and xx denotes derived positive and negative permissions, respectively. For example, because the Purchasing Officer is a specialized role of Clerk, all permissions of the Clerk role should be propagated to the Purchasing Officer, such as the permission to write a check. However, if there is an opposite explicit permission for the role that the authorization will propagate to—such as, the Supervisor role for the write a check use case—then the propagation policy enforces the most specific permission.

TABLE 3

Access Control Table After Applying Propagation and Decision Policies.

| Role\Use case | Record Invoice Arrival | Verify Invoice Validity | Authorize Payment | Write a Check |
|---|---|---|---|---|
| Clerk | ✓ | | | ✓ |
| Purchasing Officer | ✓ | ✓ | ✓ | ✓✓ |
| Supervisor | ✓✓ | ✓✓ | ✓ | x |

Conflict Resolution Policies. Propagation may generate access control conflicts. Thus, conflict resolution policy resolves conflicting permissions, of which some variants as follows: Denials take precedence: When positive and negative permissions are granted, negatives override positives; Permissions take precedence: When positive and negative permissions are granted, positives override the negatives; and Nothing takes precedence: When positive and negative authorizations apply for an object, neither positive nor negative apply, leaving the specification incomplete.

TABLE 4

Access Control Table After Applying Propagation and Decision Policies.

| Role\Use case | Record Invoice Arrival | Verify Invoice Validity | Authorize Payment | Write a Check |
|---|---|---|---|---|
| Clerk | ✓ | xxx | xxx | ✓ |
| Purchasing Officer | ✓ | ✓ | xxx | ✓✓ |
| Supervisor | ✓✓ | ✓✓ | ✓ | x |

Decision Policies. Decision policies complete incomplete authorization. For example, the authorize a payment use case in Table 3 does not have an authorization (positive or negative) for the Clerk role. Does this mean that the Clerk can or cannot execute the use case? The following are some decision policies that can be used to answer this question: Closed Policy: Every access is denied, unless there is a positive permission; and Open Policy: Every access is granted, unless there is a negative permission. The result of applying the closed policies for the running example is shown in Table 4 where all undecided permission is marked xxx indicating prohibitions.

Propagating Authorizations to Operations. Previous sections showed how complete and consistent permissions could be assigned for actors to invoke use cases. This section shows how they can be propagated to abstract operations used in the access control schemas. Thus, permission (for subject, operation) needs to be derived from those assigned to (actor, use case) pairs. One of the issues is that an abstract operation may be part of more than one use case and, therefore, could inherit multiple permissions per user. Therefore, although incompleteness does not arise, inconsistency may arise due to multiple inheritances of permissions. I illustrate this issue with the running example. Table 5 shows the operations of each use case.

Based on identified operations, the access control table specified for actors to use cases can be used to derive permissions for abstract operations. This Table is referred to as the access control table for operations. Thus, the access control table for operations consists of permissions of each operation for every actor. Table 6, shows the access control table of all operations of the use cases in the running example. Inconsistency may happen in this stage where an operation may belong to two use cases and an actor may have inconsistent authorization for the same operation due to authorization inheritance. For example, the Read operations authorization for the Supervisor role inherits positive permissions from the Authorize payment use case, and negative permissions from the Write a check use case. Thus, the Supervisor role has an inconsistent authorization for that operation.

TABLE 5

Identified Operations.

| Use case | Record Invoice Arrival | Verify Invoice Validity | Authorize Payment | Write a Check |
|---|---|---|---|---|
| Operations | Invoice::Read Invoice::Record | Invoice::Read Agreement::Read Invoice::Write prices Invoice::Verify | Invoice:: Read Invoice:: Authorize | Invoice:: Read Check:: Write |

TABLE 6

Access Control Table for Operations.

| Role/Operation | Read:: Invoice | Re-cord:: Invoice | Read:: Agreement | Write-Price:: Invoice | Verify:: Invoice | Authorize:: Invoice | Write:: Check |
|---|---|---|---|---|---|---|---|
| Clerk | ✓ | ✓ | xxx | xxx | xxx | xxx | ✓ |
| Purchasing Officer | ✓ | ✓✓ | ✓ | ✓ | ✓ | xxx | ✓✓ |
| Supervisor | ✓/x | ✓✓ | ✓✓ | ✓✓ | ✓✓ | ✓ | x |

Resolving Operations Authorization Conflicts. Conflict resolution in the access control table for the operations has to consider two issues: First, Invalidating Use Case level permissions: Any resolution may result in invalidating an entry in a complete and consistent access control table for Use cases. For example, the Supervisor role in the running example has both positive and negative authorization for the Read operation on the Invoice objects. If the conflict resolution policy enforces negative authorizations over the positive ones, the system ends up preventing the Supervisor role from executing the Authorize payment use case because one of the required operations is denied. Second Violating access control constraints: Although, the step in the previous section resolves conflicts, the end result may violate access control policy. For example, the write a check permission may be granted to the Supervisor role that has an explicit negative access control policy. As a result, required access control constraints are violated. The Access control schemas must be complete and consistent. Visually, all cells in the access control table should have one of {✓🗎x}. In addition, the following observations help in resolving conflicts at this level.

First of all, although some access control policies conceptually apply to several roles, in reality only a fewer roles may violate them (e.g., access control policies should be enforced on fewer roles). For example, suppose an access control policy states that no role can record, verify and authorize the same invoice. Only the supervisor role can perform all three use cases on the same invoice because the Supervisor is the only role with positive permissions to execute all three use cases. Thus, the integrity constraint only applies to the Supervisor role. This example shows how an access control policy that applies to all roles can result in one role violating it.

Second, flow constraints between use cases imply dependencies between conflict resolution strategies. For example, policy #4 in an earlier section states that a role cannot perform any two use cases on the same invoice. It is not efficient to enforce this integrity constraint on each use case. However, integrity constraints should be enforced before the execution of the second and third use case because, in sequential use cases only at those use cases, at least one use case would have been executed. Thus, the decisions about which use case can optimally enforce the integrity constraint of DSOD policies are not straightforward. The algorithm in FIG. 19 chooses the optimal use case among those that have dependencies enforced between them.

Applying a policy on one use case is trivial task. However, when applying a policy on a set of use cases, a decision on the details of enforcement is essential in reducing the overhead of validating such policies. A set of use cases may depend on each other where one cannot start until the previous one has completed.

Assume there is an access control policy that must be enforced on four use cases. The policy is to prevent a user from performing any three use cases on the same object. Three of the use cases are dependent on each other sequentially, while the fourth is independent of the rest. According to the new Algorithm in FIG. 19, this policy should be enforced as a prerequisite on the independent use case, while, for the three dependent use cases, the policy should be enforced on the second and third use cases because a user may invoke the first, then the independent, then the second use case on the same object that violates the policy. As an advantage, systems do not have to validate the policy on the first use case because the policy will not be violated and because, after performing this use case, two more use cases must executed due to the dependency on the first use case. The Algorithm in FIG. 19 can also apply to operations, instead of to the use case.

Drawing The Refined Use Case Diagram. Although use case diagrams visually represent the behavioral requirements of a proposed software system, they are not sufficient to represent existing access control policies. At best, the use case diagram shows some access control by stating the roles that actors are permitted to invoke.

Figure 20:
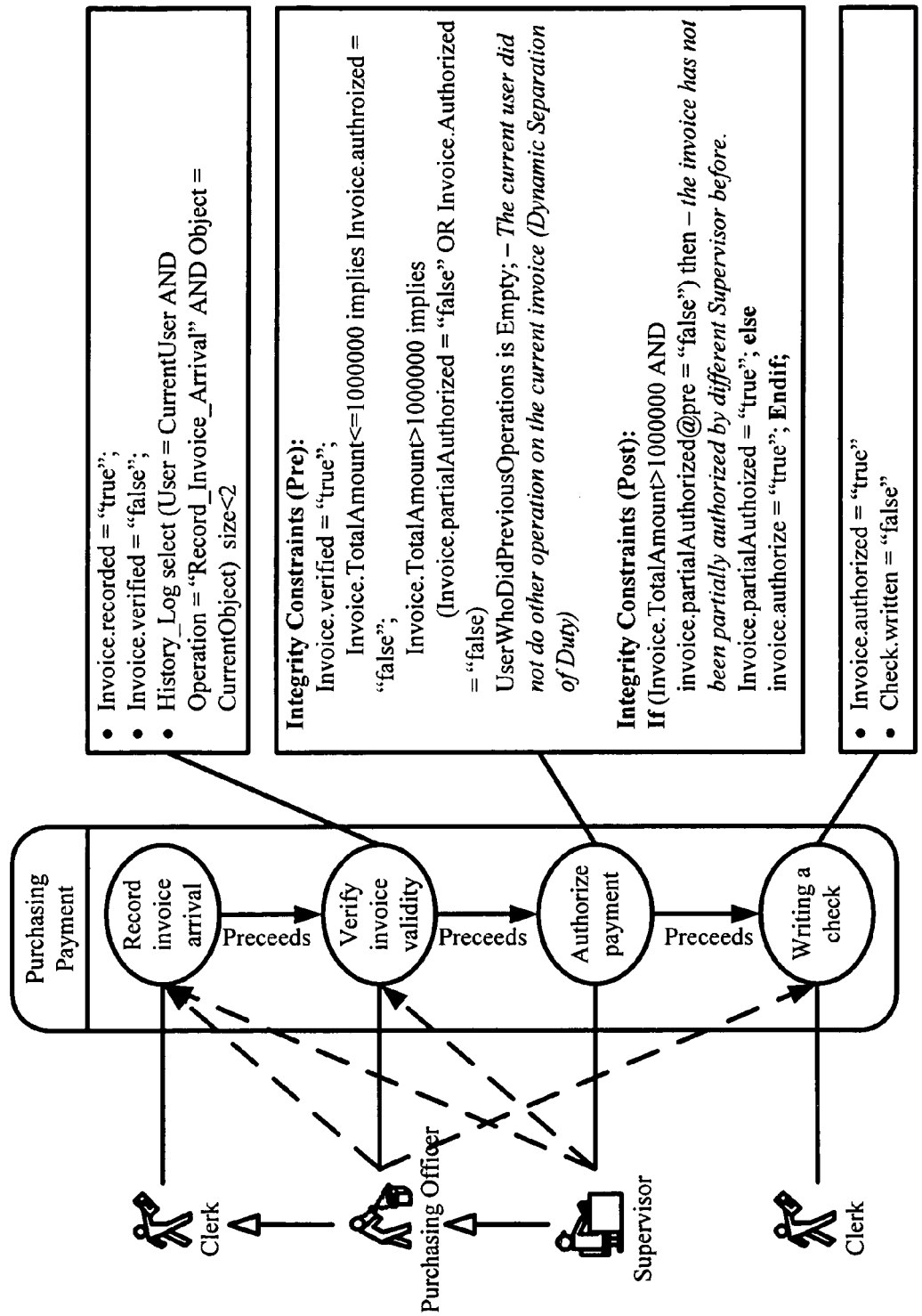
FIG. 20 shows a refined use case diagram.

Thus, having visual representations of access control policies is very much in accordance with the objectives of the UML. The use cases diagram have been refined for this purpose as in FIG. 20. The refined use case diagram represent all possible access control policies (positive, negative, explicit, implicit and integrity constraints), which provides clear visual access control policies. The refined the use case diagrams to have many desirable features as follows: First, actors may be explicitly associate with all use cases that they are authorized (explicitly or implicitly) to invoke. Thus, the absence of an association between an actor and a use case is read as a prohibition. Second, the new refined use case diagram adapts a relationship, which is introduced by the Open Modeling Language (OML), called Precedes. The relationship may be used to specify dependencies and order of invocation among use cases. Third, use case diagrams should be enhanced with access control schemas, in order to specify details of access control policies for both actors to invoke use cases and for subjects to invoke abstract operations. Access control schema is represented as attached constraints to each use case. Although, this may clutter the diagram, especially when integrity constraints are complex, it provides useful information about access control polices.

The access control policies in the running example may be represented in the refined diagram as follow: Policy #1 is represented by Precedes relationship to show the dependence and flow of use cases. Policy #2 and #3 are represented by showing all explicit and implicit authorizations between actors and use cases where the absence of link between actor and use case means a negative authorization. Note that the associations of the original use case diagram do not represent all possible positive authorizations. The absence of authorizations between actor and use case do not mean negative authorizations. Policy #4 and #5 are shown as constraint notes attached to use cases that are derived from the integrity constraint clause of the access control schema.

Section Conclusion. Disclosed are designed artifacts and a methodology to use them in specifying access control policies during the requirement specification and analysis phases. Case extension and enhancement specifies access control policies are used in a formal and precise manner, and is capable of deriving access permissions along hierarchies. In addition, meta-policies, algorithms and methodologies were presented to resolve conflicting permissions before proceeding to the design phase. The access control table was introduced as visual representation of access permissions and extend the use case diagram to completely specify them.

AUTHUML

The previous sections extended the use case model to specify access control policies. Also, it presented a methodology to analyze access control requirements for small scale software systems. In this section, AuthUML, a framework to formally verify the compliance of access control requirements with the access control policies during the specification phase of UML based software lifecycle is disclosed. AuthUML differentiates from the methodology in the previous sections by focusing on large-scale software systems. AuthUML concentrates more on the verifying rather than representation of access control policies. AuthUML is based on Prolog stratified logic programming rules. Thus, tools can be implemented to automate the verifications of requirements for large software systems.

AuthUML is based on FAF (see S. Jajodia, P. Samarati, M. Sapino, V. S. Subrahmanian, Flexible support for multiple access control policies, *ACM Trans. on Database Systems*, Vol. 26, No. 2, June 2001, pages 214-260.), and is an attempt to advance its application to the requirements specification phase of the software development life cycle. Therefore, AuthUML is a customized version of FAF that is to be used in requirements engineering. Therefore, AuthUML uses similar components of FAF with some modification in the language and the process to suit the Use Case model used in UML. Because FAF specifies authorization modules in computing systems, FAF is invoked per each authorization request. Contrastingly, AuthUML is to be used by requirements engineers to avoid conflicts and incompleteness of accesses. Therefore, while FAF is used frequently to process each access control request during execution, AuthUML may be used less frequently during the requirements engineering phase to analyze the access control requirements.

AuthUML may use Prolog style stratified logic programming rules to specify policies that ensure desirable properties of requirements. Because requirements are specified using actors invoking Use Cases, AuthUML uses predicates to specify which actors (subjects) are permitted or prohibited from invoking any given Use Case. Moreover, it uses rules to specify the policies that need to be enforced on the system.

The remainder of this section is organized as follows. First, a process of applying AuthUML is presented. Next, syntax and semantics of AuthUML are disclosed. Then, the first, second and third major phases of AuthUML are described respectively.

Figure 21:
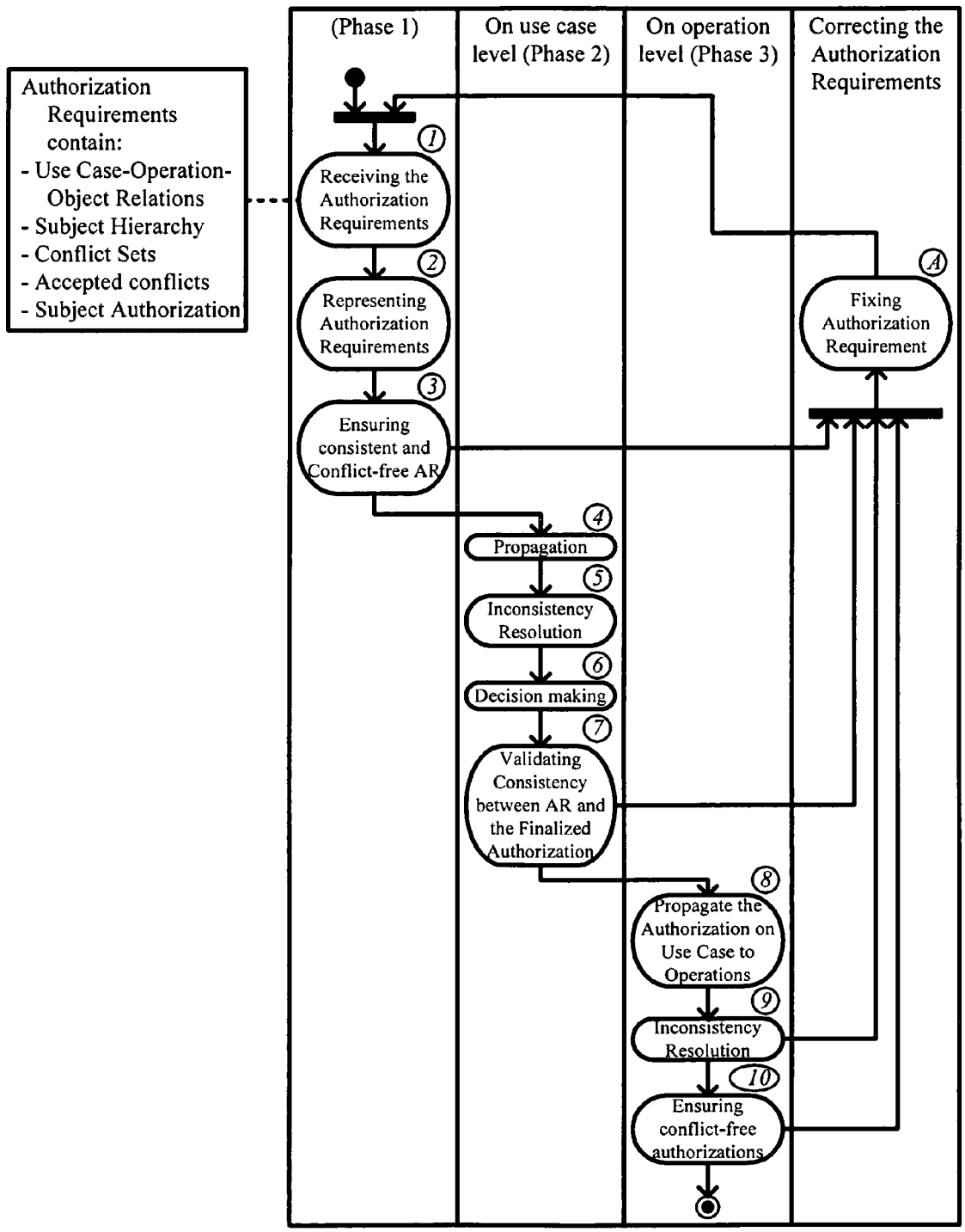
FIG. 21 shows an AuthUML architecture.

AuthUML Process. AuthUML consists of three main phases where each consists of several steps. As shown in FIG. 21, AuthUML takes authorizations from requirements specifications and then analyzes them to produce complete, consistent and conflict-free authorizations. The first phase starts with a set of access control requirements, where they are transformed into a unified representation in the form of access predicates. Also, the first phase ensures that all specified accesses are consistent and conflict-free. The second phase ensures that all accesses specified for Use Cases are consistent, complete and conflict-free, without considering the operations used to describe their functionality. During the third phase, AuthUML analyzes the access control requirements on operations. All three phases consists of rules that are customizable to reflect policies used by the security requirements engineers.

From the access control requirements that are provided in the form of AuthUML predicates, the second phase propagates accesses based on subject and/or object hierarchies. Any inconsistencies that may occur due to such propagated accesses are resolved using conflict resolution rules. After this, all accesses that are explicit (i.e., given directly in requirement) or implicit (derived) are consistent, but may not be complete, i.e., not all accesses for all subjects and Use Cases may be specified. Therefore, using predefined rules and policies (i.e., closed or open policies) in the next step (5 in FIG. 21) completes them. Therefore, accesses specified before step 6 are directly obtained from requirements, propagated due to hierarchy or consequences of applying decision policies. Thus, it is necessary to validate the consistency of the finalized accesses against the original requirements and to check for conflicts between them. If AuthUML finds any inconsistency or conflict among accesses at this step, it will notify the requirement engineer in order to fix it and run the analysis again.

The third phase of AuthUML applies the same process to operations used to describe Use Cases. This phase does not have a decision step, as in the second phase, because each Use Case propagates its accesses to all its operations. As a result, accesses specified during this phase are complete. In addition, access specifications of operations at the end of this phase are consistent because the inconsistency resolution step in the operation level will attempt and resolve all inconsistencies. However, if it cannot do so, the process will stop and notify the requirement engineer about the inconsistency to be fixed by manual intervention. Up to this step, accesses are consistent and complete, but may not be free of application specific conflict. Thus, the purpose of the last step of this phase is to detect those conflicts.

There is a difference between the access specifications fed into AuthUML and those that come out of it, i.e., finalized access specifications are consistent, complete and free of application specific conflicts. This outcome is the main advantage of my work. Thus, AuthUML focuses on access control requirements as early as possible to avoid any foreseeable problems before proceeding to other phases of the development life cycle. As the development process proceeds through its life cycle, changes of the access control requirement may occur. For example, the Use Cases may be changed to invoke different operations, or refined/new operations may be added. Consequently, already accepted accesses may need to be reanalyzed. Therefore, it is necessary to go back and run the AuthUML again to preserve the consistency, and to ensure complete and conflict-free accesses. Thus, my framework is flexible enough that it allows changes in the access control specifications.

The architecture of AuthUML differs from the architecture of FAF in two aspects. First, AuthUML analyzes accesses in two levels, Use Cases and operations in order to scrutinize accesses in course-grain and fine-grain levels, respectively. Second, steps 2, 6 and 9 are introduced in AuthUML to detect inconsistencies and conflicts between different levels of accesses that are absent in FAF. Moreover, AuthUML receives a bulk of access control requirements but not just one access request at a time. Thus, as I will show later, AuthUML produces accesses only if there are sufficient rules to resolve all application level conflicts.

AuthUML Syntax and Semantics.

Individuals and Terms of AuthUML. The individuals of AuthUML are the Use Cases, operations, objects and subjects. Use Cases specify actors and their intended usage of the envisioned system. Such usage—usually, but not always—is specified in terms of the interactions between the actors and the system, thereby specifying the behavioral requirements of the proposed software. Each Use Case consists of a set of operations that are used to describe the Use Case. Each operation operates on an object, and operations are the only way to query or manipulate objects. Subjects are permitted to invoke a set of Use Cases and thereby all operations describing that Use Cases. I use subjects as actors in UML or role in Role-based Access control (RBAC). UC, OP, OBJ, and S are denoted as set of Use Cases, operations, objects and subjects respectively. An access permission can be permitted or prohibited, that is, modeled as a positive or a negative action, respectively. AuthUML syntax is built from constants and variables that belong to four individual sorts. Namely, signed Use Cases, signed operations, (unsigned) objects and (unsigned) subjects. They are represented respectively as $\pm uc$, $\pm op$, $obj$, and $s$, where variables are represented as $\pm X_{uc}$, $\pm X_{op}$, $X_{obj}$, and $X_s$.

Predicates of AuthUML. FAF predicates may be used with some customizations and some new predicates to model requirements as follows:

The following predicates may be used to model structural relationships and called rel-predicates. One, a binary predicate UC_OP(Xuc,Xop) means operation Xop is invoked in Use Case Xuc. Two, a binary predicate OP_OBJ(Xop,Xobj) means operation Xop belongs to object Xobj. Three, a binary predicate before(Xop,X'op) means that Xop must be invoked before X'op. Four, a ternary predicate in UCbefore (Xuc,Xop,X'op) means Use Case Xuc invokes Xop before X'op.

The following predicates are used to model hierarchies and called hie-predicates. One, a binary predicate in(Xs, X's), means Xs is below X's in the subject hierarchy. Two, a binary predicate dirin(Xs,X's) mean Xs is directly below X's in the subject hierarchy.

The following predicates are used to model conflicts and called con-predicates. One, a binary predicate conflictingSubject($X_s$,$X'_s$) means subject $X_s$ and $X'_s$ are in conflict with each other. Two, a binary predicate conflictingSubject$_{Content}$ ($X_s$,$X'_s$,Y) means that both subject $X_s$ and $X'_s$ must not invoke Y, where Y can be a use case or an operation. This predicates is more specific to stating the conflict for a particular content, e.g., the operations. Three, a binary predicate conflictingUC($X_{uc}$,$X'_{uc}$) means that Use Cases $X_{uc}$ and $X'_{uc}$ are in conflict with each other. Four, a binary predicate conflictingOP($X_{op}$,$X'_{op}$) means operations $X_{op}$ and $X'_{op}$ are in conflict with each other. Five, a ternary predicate ignore(X,Y,Y') represents an explicit instruction by the requirements engineer to ignore a conflict among X,Y and Y' where X, Y and Y' are either subjects, operations or Use Cases.

The following predicates are used in the first phase of AuthUML to authorize, detect assignment conflict or detect inconsistency in the access control requirements: One, opInConUC($X_{op}$,$X_{uc}$,$X'_{uc}$), means $X_{op}$ is an operation in two conflicting Use Cases $X_{uc}$ and $X'_{uc}$, and conOpInUC($X_{op}$, $X'_{op}$,$X_{uc}$) means that $X_{OP}$ and $X'_{OP}$ are two conflicting operations in Use Case $X_{uc}$, and flowConInUC($X_{UC}$,$X_{OP}$, $X'_{OP}$) means that $X_{OP}$ and $X'_{OP}$ are invoked in a way that violate execution order. Two, a binary predict cando$_{UC}$, where cando$_{UC}$ ($X_s$,$\pm X_{uc}$) means subject $X_s$ can or cannot invoke the Use Case $X_{uc}$ depending on the sign of $X_{uc}$, positive (+) or negative (−). Three, a binary predicate alertReq($X_s$,$X_{uc}$) to inform the requirements engineer that there is either an inconsistency (between access control requirements) or a conflict (between subjects or Use Cases) on the access of $X_s$ on $X_{uc}$.

Following predicates are used in the second phase of AuthUML to authorize, detect conflicts and inconsistencies at the Use Case level: One, a ternary predicate overUC($X_s$, $X'_s$,$\pm X_{uc}$) meaning $X_s$'s permission to invoke $\pm X_{uc}$ overrides that of $X'_s$. Two, a binary predicate dercando$_{UC}$ with the same argument as cando$_{UC}$. dercando$_{UC}$($X_s$,$\pm X_{uc}$) is a permission derived using modus ponens and stratified negation. Three, a binary predicate do$_{UC}$, where do$_{UC}$($X_s$,$\pm X_{uc}$) is the final permission/prohibition for subject $X_s$ to invoke Use Case $X_{uc}$ depending on if the sign of $X_{uc}$ is + or −. Four, a binary predicate alert$_{UC}$($X_s$,$X_{uc}$) to inform the requirements engineer that there is either an inconsistency (between the access control requirement and the final outcome of this phase) or conflict (between subjects or use cases) on the accesses that involve $X_s$ and $X_{uc}$.

Following predicates are used in the third phase of AuthUML to authorize, detect conflicts and inconsistencies at the operation level: One, a binary predicate dercando$_{OP}$ ($X_s$,$\pm X_{op}$) is similar to dercando$_{UC}$ except the second argument is an operation instead of a Use Cases. Two, a binary predicate do$_{OP}$($X_s$,$\pm X_{op}$) is similar to do$_{UC}$, but the second argument is an operation. Three, cannotReslove($X_s, X_{uc}, X'_{uc}, X_{op}$) is a 4-ary predicate representing an inconsistency that can not be resolved at the operation level with the given rules. Four, a binary predicate alert$_{OP}(X_s, X_{op})$ informs the requirements engineer that there is a conflict between subjects or operations on the authorization that involve $X_s$ and $X_{op}$.

Assumptions. One, the subject used refers to a role (as in RBAC) or an actor (in UML) and not to an end user of a software system. The role is a named set of permissions and users may assume a role in order to obtain all of its permissions. Two, every Use Case must have at least one operation (i.e., $\forall x \in UC \exists y \in OP \ UC\_OP(x,y)$) and every operation must belong to one and only one object (i.e., $\forall x \in OP \exists! y \in OBJ \ OP\_OBJ(x,y)$). Three, each positive access of a Use Case to a subject means that all operations of that use case are also positively authorized to the same subject. Conversely, a prohibited Use Case to a subject must have at least one prohibited operation to that subject.

As already stated, cando represents an access permission obtained from requirements and dercando represents an access derived using (to be described shortly) rules. Both cando and dercando do not represent a final decision, but only an intermediate result. For example, although cando$_{UC}$($X_s, +X_{uc}$) is obtained from requirements does not mean that subject Xs will be allowed to finally execute Use Case $X_{uc}$. The reason being that propagation, conflict resolution and decision policies may change the authorization expressed in cando$_{UC}$($X_s, +X_{uc}$). However, do$_{UC}$($X_s, +X_{uc}$) if derived represents the final authorization decision.

Rule of AuthUML. An AuthUML rule is of the form $L \leftarrow L_1, \ldots L_n$ where L is a positive literal and $L_1, \ldots L_n$ are literals satisfying the conditions stated in Table 7. An Example:

$$\text{cando}_{UC}(\text{supervisor}, +\text{``authorize payment''}) \leftarrow \qquad (1)$$

$$\text{dercando}_{UC}(X_s, +X_{uc}) \leftarrow \text{cando}_{UC}(X'_s, +X_{uc}), \text{in}(X_s, X'_s) \qquad (2)$$

$$\text{do}_{UC}(X_s, +X_{uc}) \leftarrow \text{cando}_{UC}(X_s, +X_{uc}), \text{cando}_{UC}(X_s, -X_{uc}) \qquad (3)$$

Rule 1 says that supervisor can access Use Case "authorize payment." Rule 2 specifies the inheritance of authorizations in the subject hierarchy. Rule 3 expresses the permissions take precedence policy of resolving conflicts.

TABLE 7

Rules Defining Predicate

| Phase | Stratum | Predicate | Rules defining the predicate |
|---|---|---|---|
| 1 | 0 | rel-predicates | base relations. |
| | | hie-predicates | base relations. |
| | | con-predicates | base relations. |
| | | ignore(X, Y, Y') | Explicit instructions to ignore the X, Y conflict. |
| 1 | 1 | opInConUC ($X_{op}, X_{UC}, X'_{UC}$) conOpInUC ($X_{op}, X'_{op}, X_{UC}$) flowConinUC ($X_{UC}, X_{op}, X'_{op}$) | body may contain hie, ignore, rel predicates. |
| 1 | 2 | cando$_{UC}$ ($X_s, \pm X_{UC}$) | body may contain hie-, con- and re-predicates. |
| 1 | 3 | alert$_{Req}$ ($X_s, X_{UC}$) | body may contain literal from strata 0 to 2 |
| 2 | 4 | over$_{UC}$ ($X_s, X'_s, \pm X_{uc}$) | body may contain literals from strata 0 to 3. |

TABLE 7-continued

Rules Defining Predicate

| Phase | Stratum | Predicate | Rules defining the predicate |
|---|---|---|---|
| 2 | 5 | dercando$_{UC}$ ($X_s, \pm X_{uc}$) | body may contain predicates from strata 0 to 4. Occurrences of dercando$_{UC}$ must be positive. |
| 2 | 6 | do$_{UC}$($X_s, +X_{uc}$) | body may contain predicates from strata 0 to 5. |
| 2 | 7 | do$_{UC}$($X_s, -X_{uc}$) | body contains one literal $-$do$_{UC}$($X_s, +X_{uc}$). |
| 2 | 8 | alertUC($X_s, X_{uc}$) | body may contain literal strata from 0 to 7. |
| 3 | 9 | dercando$_{OP}$ ($X_s, \pm X_{op}$) | body may contain predicates from strata 0 to 7. Occurrences of dercando$_{OP}$ must be positive. |
| 3 | 10 | do$_{OP}$($X_s, +X_{op}$) | body may contain predicates from strata 0 to 9. |
| 3 | 11 | do$_{OP}$($X_s, -X_{op}$) | body contains one literal $-$do$_{OP}$($X_s, +X_{op}$). |
| 3 | 12 | cannotResolve ($X_s, X_{uc}, X'_{uc}, X_{op}$) | body may contain literal from strata 0 to 11. |
| 3 | 13 | alertOP($X_s, X_{OP}$) | body may contain literal from strata 0 to 11. |

AuthUML Semantics. Table 7 shows the stratification of rules used in AuthUML. Rules constructed according to these specifications forms a local stratification. Accordingly, any such rule based form has unique stable model and that stable model is also a well-founded model. As done in FAF, AuthUML rules may also be materialized, thereby making the AuthUML inference engine efficient.

Phase I: Analyzing Information in Requirements Documents. This section goes though steps 1 and 2 of AuthUML and shows how the AuthUML processes the access control requirements.

Representing Authorizations. It may be assumed that requirement engineers already specify access control requirements and that it is not in the scope of this section to go further on that subject. Authorization requirements may include: one, permissions for the subject to invoke the Use Cases; two, the Subject hierarchy; three, structural relationships (Use Case-Operation-Object Relations); four, conflicting subjects, Use Cases and operations sets; and five, conflicts of interest.

All of the above must be written in this step in the form of AuthUML rules in order to be used during subsequent steps. They are represented as follow: One, at this step, access permissions are written in the form of cando$_{uc}$ rules representing explicit authorization obtained from the requirement specification. Rule 4 and 5 are examples:

$$\text{cando}_{UC}(\text{clerk}, +\text{recordInvoiceArrival}) \leftarrow \qquad (4)$$

$$\text{cando}_{UC}(\text{supervisor}, -\text{writeCheck}) \leftarrow \qquad (5)$$

Rule (4) permits the clerk to invoke the "recordInvoiceArrival" Use Case. Rule (5) prohibits the supervisor to invoke the "writeCheck" Use Case.

Two, subject hierarchy may be represented using the in predicate to indicate which subject inherits what. For example, in(purchasingOfficer,clerk) means that the purchasing officer is a specialized subject of clerk that inherits all its permissions. Three, structural relationships may represent the relations between use case and its operations, operations and its object, and the flow between operations in a use case. UC_OP($X_{uc}, X_{op}$) says that $X_{op}$ is an operations invoked in the Use Case $X_{uc}$. OP_OBJ($X_{op}$,$X_{obj}$) says that operation $X_{op}$, belongs to object $X_{obj}$. In addition, before ($X_{op}$,$X'_{op}$) means that $X_{op}$ must be executed before $X'_{op}$ is executed and inUCbefore($X_{uc}$,$X_{op}$,$X'_{op}$) means that Use Case $X_{uc}$ calls for executing $X_{op}$ before $X'_{op}$. Four, application definable conflicts occurring among subject, Use Case and operations are represented respectively by coflictingSubjects($X_s$,$X'_s$), conflicting$_{UC}$($X_{uc}$,$X'_{uc}$) and coflicting$_{OP}$($X_{op}$,$X'_{op}$). Five, requirement engineers may decide to accept some conflicts. AuthUML uses ignore(X,Y,Y') to accept a conflict between Y and Y'. The main goal of the ignore predicate is to only allow specified conflicts, but not others between access.

Ensuring Consistent And Conflict-Free Access Control Specifications. Access control requirements may specify inconsistencies where one requirement permits and another requirement denies the same permission. In addition, two conflicting subjects may be permitted to invoke the same Use Case or operation, or a subject may be permitted to invoke two conflicting Use Cases or operations. Latter kinds of permissions may violate the Separation of Duty principle.

In small systems, discovering conflicts can be easy, because of the small number of entities and engineers writing those requirements. However, detecting conflicts and inconsistencies between access control requirements in large system is more problematic. Therefore, AuthUML can specify rules that detect inconsistencies between the requirements that are specified by many security engineers. Detecting inconsistencies and conflicts at this stage prevent them from spreading to the following stages of the life cycle. This step of AuthUML takes access control requirements in the form of cando rules and automatically applies inconsistency and conflict detection rules to identify their existence, as follow:

$$\text{alert}_{Req}(X_s,X_{uc}) \leftarrow \text{cando}_{UC}(X_s,+X_{uc}), \text{cando}_{UC}(X_s,-X_{uc}) \quad (6)$$

$$\text{alert}_{UC}(X_s,X_{uc}) \leftarrow \text{cando}_{UC}(X_s,+X_{uc}), \text{cando}_{UC}(X_s,+X'_{uc}),$$
$$\text{conflicting}_{UC}(X_{uc},X'_{uc}), \neg\text{ignore}(X_s,X_{uc},X'_{uc}) \quad (7)$$

$$\text{alert}_{UC}(X_s,X_{uc}) \leftarrow \text{cando}_{UC}(X_s,+X_{uc}), \text{cando}_{UC}(X'_s,+X_{uc}),$$
$$\text{conflictingSubject}_{Content}(X_s,X'_s), \neg\text{ignore}(X_{uc},X_s,X'_s) \quad (8)$$

$$\text{opInConUC}(X_{op},X_{uc},X'_{uc}) \leftarrow \text{UC\_OP}(X_{uc},X_{op}), \text{UC\_OP}(X'_{uc},X'_{op}),$$
$$\text{conflicting}_{UC}(X_{uc},X'_{op}), \neg\text{ignore}(X_{op},X_{uc},X'_{uc}) \quad (9)$$

$$\text{conOpInUC}(X_{UC},X_{op},X'_{op}) \leftarrow \text{UC\_OP}(X_{uc},X_{op}), \text{UC\_OP}(X_{uc},X'_{op}),$$
$$\text{conflicting}_{OP}(X_{op},X'_{op}), \neg\text{ignore}(uc,X_{op},X'_{op}) \quad (10)$$

$$\text{flowConInUC}(X_{uc},X_{op},X'_{op}) \leftarrow \text{UC\_OP}(X_{uc},X_{op}), \text{UC\_OP}(X_{uc},X'_{op}),$$
$$\text{before}(X_{op},X'_{op}), X_{op} \neq X'_{op}, \neg\text{in}UC\text{before}(X_{uc},X_{op},X'_{op}) \quad (11)$$

Rule 6 says that, if there are two requirements where one grants and the other denies the invocation of the same Use Case to the same subject, an alert message will be raised to the security engineer that identifies those that lead to the inconsistency. Rule 7 says that, if a subject is permitted to invoke two conflicting Use Cases that are not explicitly allowed by the ignore predicate, an alert message is triggered in order to facilitate manual intervention. Rule 8 says that, if a Use Case is permitted to be invoked by two conflicting subjects, a manual intervention need to be sought. Rule 9 and 10 are related to the conflicting assignments of operations to Use Cases. Rule 9 detects having operations in two conflicting Use Cases and rule 10 detects having two conflicting operations in the same Use Case. Rule 11 says that, if two operations used in one Use Case violates the order in which they are to be called, the first two conflicts can be ignored if the requirement engineer explicitly uses the "ignore" predicate.

Notice that detectable conflicts that appear at this step are structural in nature. That is, they are conflicts or inconsistencies independent of the permissions or prohibitions assigned to execute them.

Phase II: Applying Policies to Use Cases. The previous phase analyzes statically given, access control requirements without using any policies and produces consistent and conflict-free accesses. This phase (steps 3, 4, 5 and 6) applies policies that are specified using AuthUML rules relevant to Use Cases. Such policies may add new permissions or change existing ones.

Propagation Policies. Most systems use some hierarchies to benefit from inheritance. This step may generate new permissions according to chosen propagation policies. All explicit or derived permissions are transformed to the form of dercando$_{OP}$ rules (derived authorizations). Some examples of propagation policies may be represented as AuthUML rules as shown in Table 8.

Inconsistency Resolution Policies. In complex systems with many Use Cases, permission propagation may introduce new permissions that in turn may result in new inconsistencies. Inconsistency resolution policies resolve such inconsistencies. Examples may be represented as AuthUML rules as shown in Table 9. The rules in Table 9 define inconsistency resolution policies. For example, for the denial take precedence with an open policy, if there is no denial, permission is granted for such subject. However, in the case of a closed policy, the previous definition is not enough because there must be a permission in the absence of a prohibition. The last rule completes the rule base prohibiting every access that is not permitted.

TABLE 8

Rules for Enforcing Propagation Policies on Subject Hierarchy.

| Propagation policy | Rules |
|---|---|
| No propagation | dercando$_{UC}$($X_s$, +$X_{uc}$)←cando$_{UC}$($X_s$, +$X_{uc}$) |
| | dercando$_{UC}$($X_s$, −$X_{uc}$)←cando$_{UC}$($X_s$, −$X_{uc}$) |
| No overriding | dercando$_{UC}$($X_s$, +$X_{uc}$)←cando$_{UC}$($X'_s$, +$X_{uc}$), in($X_s$, $X'_s$) |
| | dercando$_{UC}$($X_s$, −$X_{uc}$)←cando$_{UC}$($X'_s$, −$X_{uc}$), in($X_s$, $X'_s$) |
| Most specific overrides | dercando$_{UC}$($X_s$, +$X_{uc}$)←cando$_{UC}$($X'_s$, +$X_{uc}$), in($X_s$, $X'_s$), ¬×over$_{UC}$($X_s$, $X'_s$, +$X_{uc}$) |
| | dercando$_{UC}$($X_s$, −$X_{uc}$)←cando$_{UC}$($X'_s$, −$X_{uc}$), in($X_s$, $X'_s$), ¬×over$_{UC}$($X_s$, $X'_s$, −$X_{uc}$) |
| | over$_{UC}$($X_s$, $X'_s$, +$X_{uc}$)←cando$_{UC}$($X''_s$, −$X_{uc}$), in $X_s$, $X''_s$), in ($X''_s$, $X'_s$), s'' ≠ s' |
| | over$_{UC}$($X_s$, $X'_s$, −$X_{uc}$)←cando$_{UC}$($X''_s$, +$X_{uc}$), in $X_s$, $X''_s$), in ($X''_s$, $X'_s$), s'' ≠ s' |
| Path overrides | dercando$_{UC}$($X_s$, +$X_{uc}$)←cando$_{UC}$($X_s$, +$X_{uc}$) |
| | dercando$_{UC}$($X_s$, −$X_{uc}$)←cando$_{UC}$($X_s$, −$X_{uc}$) |
| | dercando$_{UC}$($X_s$, +$X_{uc}$)←cando$_{UC}$($X'_s$, +$X_{uc}$), ¬×cando$_{UC}$($X_s$, −$X_{uc}$), |

TABLE 8-continued

Rules for Enforcing Propagation Policies on Subject Hierarchy.

| Propagation policy | Rules |
|---|---|
| | $dirin(X_s, X'_s)$ <br> $dercando_{UC}(X_s, -X_{uc}) \leftarrow cando_{UC}(X'_s, -X_{uc}),$ <br> ▤ ✗$cando_{UC}(X_s, +X_{uc}),$ <br> $dirin(X_s, X'_s)$ |

TABLE 9

Rules for Enforcing Inconsistency Resolution and Decision Policies.

| Inconsistency | Decision | Rules |
|---|---|---|
| Denial take precedence | open | $do_{UC}(X_s, +X_{uc}) \leftarrow$ ▤ ✗$dercando_{UC}(X_s, -X_{uc})$ |
| Denial take precedence | closed | $do_{UC}(X_s, +X_{uc}) \leftarrow dercando_{UC}(X_s, +X_{uc}),$ <br> ▤ ✗$dercando_{UC}(X_s, -X_{uc})$ |
| permission take precedence | open | $do_{UC}(X_s, +X_{uc}) \leftarrow dercando_{UC}(X_s, +X_{uc}),$ <br> $do_{UC}(X_s, +X_{uc}) \leftarrow$ ▤ ✗$dercando_{UC}(X_s, -X_{uc})$ |
| permission take precedence | closed | $do_{UC}(X_s, +X_{uc}) \leftarrow dercando_{UC}(X_s, +X_{uc}),$ |
| Nothing take precedence | open | $do_{UC}(X_s, +X_{uc}) \leftarrow \oplus dercando_{UC}(X_s, -X_{uc})$ |
| Nothing take precedence | closed | $do_{UC}(X_s, +X_{uc}) \leftarrow dercando_{UC}(X_s, +X_{uc})$ <br> ▤ ✗$dercando_{UC}(X_s, -X_{uc})$ |
| Additional closure rule | | $do_{UC}(X_s, -X_{uc}) \leftarrow$ ▤ ✗$do_{UC}(X_s, +X_{uc})$ |

Decision Policies. Decision policies complete authorizations so that every subject must have either a permission or a prohibition to execute each Use Case and operation. Following are some decision policies that have been suggested: Closed Policy: Accesses without permissions are prohibited. Open Policy: Accesses without prohibitions are permitted. This is the last step that finalizes all accesses of Use Cases to subjects that are consistent with each other and complete. They are written in the form of $do_{UC}$ rules. AuthUML like FAF ensure the completeness of access control decision by enforcing the following.

$$do_{UC}(X_s, -X_{uc}) \leftarrow \overline{\phantom{do}}do_{UC}(X_s, +X_{uc}) \quad (12)$$

Alerting the Requirements Engineer of Changes to Use Case Accesses. As stated, final accesses of the last step are consistent with each other, but it may have changed the original requirements. Also, there may not be sufficient rules to resolve application specific conflicts. This step uses the $alert_{uc}$ predicate to inform the requirements engineer of such changes or problems.

$$alert_{UC}(X_s, X_{uc}) \leftarrow cando_{UC}(X_s, +X_{uc}), do_{UC}(X_s, -X_{uc}) \quad (13)$$

$$alert_{UC}(X_s, X_{uc}) \leftarrow cando_{UC}(X_s, -X_{uc}), do_{UC}(X_s, +X_{uc})$$

Rule 13 says that an alert message will be raised if there is an access control requirement and a contradicting final authorization for the same subject on the same Use Case. Once informed by AuthUML the requirements, the engineer can revisit potential problems and, hopefully, resolve them before proceeding to apply fine-grain policies that specify operation level accesses.

Phase III: Applying Policies to Operations. The previous phase produces consistent and conflict-free Use Cases. This phase (step 7, 8 and 9) analyzes operations to ensure consistent, conflict-free and complete permissions to invoke operations.

Propagating Permissions to Operations. This phase applies fine-grain access control policies to operations. Recall that Use Cases are described using operations and some execution order among them. Because any Use Case contains one or more operations, permission to invoke a Use Case propagates to its operations. Following rules specify such propagation policies.

$$dercando_{OP}(X_s, -X_{op}) \leftarrow UC\_OP(X_{uc}, X_{op}), do_{UC}(X_s, -X_{uc})$$

$$dercando_{OP}(X_s, +X_{op}) \leftarrow UC\_OP(X_{uc}, X_{op}), do_{UC}(X_s, +X_{uc}) \quad (14)$$

Rule (14) says that, if an operation is part of a Use Case, the permission of the Use Case propagates to that operation.

Inconsistency Resolution for Operations. Because an operation can be called on behalf of more than one Use Case and, thus, can inherit permissions from more than one Use Case, applying rules such as (14) may introduce conflicts. Therefore, conflict resolution must be applied to operations. As stated before, it may be assumed that each positive permission of a Use Case is inherited by all its operations. Conversely, a prohibited Use Case must have at least one prohibited operation.

An operation may be called in two Use Cases with contradicting permissions for the same subject, with the result that the subject will have been granted a permission and a prohibition to execute the same operation. One policy that can resolve this contradictory situation is to retain the permission to execute the operation for the subject only if another operation belonging to the prohibited Use Case already has a prohibition for the same subject. In doing so, one may preserve the assumption that, as long as there is at least one prohibition on operation for a subject in a Use Case, that Use Case has a prohibition for the same subject. Rule 15 specifies this conflict resolution policy as an AuthUML rule:

$$do_{OP}(X_s, +X_{op}) \leftarrow dercando_{OP}(X_s, +X_{op}), dercando_{OP}(X_s, -X_{op}),$$

$$UC\_OP(X_{uc}, X_{op}), do_{UC}(X_s, -X_{uc}), UC\_OP(X_{uc}, X'_{op})$$

$$dercando_{OP}(X_s, -X'_{op}), X'_{op} \neq X_{op}$$

Completing Accesses for Operations. Therefore, after the application of rule 15, AuthUML ensures the following: one, there is no operation with contradictory authorizations for the same subject; Two, for every subject, all operations of a Use Case are permitted if the Use Case is permitted.

The next two rules ensure that all permission of a subjects to invoke operations will be represented as do predicates and, therefore, either granted or denied, but not both. These rules were used in FAF also.

$$do_{OP}(X_s, +X_{op}) \leftarrow dercando_{OP}(X_s, +X_{op}), \overline{\phantom{d}}dercando_{OP}(X_s, -X_{op}) \quad (16)$$

$$do_{OP}(X_s, -X_{op}) \leftarrow \overline{\phantom{do}}do_{OP}(X_s, +X_{op}) \quad (17)$$

Alerting the Requirements Engineer of Irreconcilable Conflicts. Continuing with the example, if there is no $X'_{op}$ prohibiting $X_s$, rule 15 cannot resolve the inconsistency. Hence, AuthUML will raise a conflict message to the requirements engineer informing its inability to resolve the contradiction, as stated in rule 18.

$$cannotReslove(X_s, X_{uc}, X'_{uc}, X_{op}) \leftarrow dercando_{OP}(X_s, +X_{op}),$$

$$dercando_{OP}(X_s, -X_{op}), \overline{\phantom{d}}do_{op}(X_s, +X_{op}), X_{uc} \neq X'_{uc}$$

$$UC\_Op(X_{uc}, X_{op}), UC\_OP(X'_{uc}, X_{op}) \quad (18)$$

$$alert_{OP}(X_s, X_{op}) \leftarrow do_{OP}(X_s, +X_{op}), do_{OP}(X_s, +X'_{op}),$$

$$\text{conflictingOP}(X_{op}, X'_{op}), \neg \text{ignore}(X_{op}, X_s, X'_s) \quad (19)$$

$$\text{alert}_{OP}(X_{op}, X_s) \leftarrow \text{do}_{OP}(X_s, +X_{op}), \text{do}_{OP}(X'_s, +X_{op})$$

$$\text{conflictingsubject}_{Content}(X_s, X'_s, X_{op}), \neg \text{ignore}(X_{op}, X_s, X'_s) \quad (20)$$

Rule 19 triggers an alert message if it finds a subject Xs that has an authorization to invoke two operations that conflict with each other. Rule 20 triggers an alert message if it finds two conflicting subjects that have authorizations to invoke the same operation. Both rules will not hold if the requirement engineer explicitly allows that conflict by using the ignore predicate. At the end of phase 3, from the finalized authorization one can generate an access control list (ACL) of all positive and negative permissions of all subject to all operations.

Section Conclusions. AuthUML diverges form others work in this area by focusing on analyzing access control requirements at the requirement specification stage rather than modeling them with extra syntactic enrichments to UML. AuthUML, is a framework that analyze access control requirements to ensure that the access control requirements are consistent, complete and conflict-free. The framework propagates access permissions on subject hierarchies and solves inconsistencies between authorizations by enforcing predefined policies that are written using the logical language of AuthUML. To assure fine-grain analysis of access control requirements, AuthUML considers access control requirements for both Use Case and its operations. This work aims toward bridging the gap between Logic programming and formal security engineering.

FLOWUML

The previous section introduced AuthUML that analyze access control requirement. This section introduces FlowUML that analyzes information flow control requirements.

Introduction. The information flow control policy is an important aspect of security that restricts information flowing between objects. In order to formally analyze information flow policies during the requirements and design stages of the software life cycle, I developed FlowUML. It is a flexible framework using locally stratified logic programming rules to enforce user specifiable information flow policies on UML based designs. It utilizes the following steps: One, extracts information flows from the UML sequence diagram as predicates. Two, derives all inherited and indirect flows. Three, checks for compliances with specified policies.

FlowUML utilizes stated steps for pragmatic reasons. First, information exchanges between objects are drawn using sequence, activity or collaboration diagrams, at the early stage of development. Sequence diagrams were chosen for illustrative purposes, and the methodology applies to others as well. Second, at this stage, it is easier to re-draw and visualize direct and transitive information flows using these diagrams. Third, indirect flows and those that result from inheritance may not be visually obvious and, therefore, automated support in deriving their consequences could aid the visual design process. Fourth, FlowUML extracts information flow based on specified policies.

Policies in FlowUML are specified at two levels of granularity. At the coarser level, a flow is a directed arc going from its source to a sink. At the finer level, flow is qualified based on the semantics of methods, attributes passed between the caller and the callee, and the roles played by caller and callee objects in the design.

FlowUML does not assume any meta-policy, and it is flexible in using many of them. Although, there are many important contributions in flow control models and policies, FlowUML advances over others in applying a formal framework in the early phases of the software development life cycle.

The remainder of this section is organized as follows. First, information flow specifications are shown embedded in the UML sequence diagrams. Next, a running example is presented. Then, notations and assumptions are described. The FlowUML process is then explained. The syntax and semantics of FlowUML are presented. Then, the expressibility of FlowUML is shown by means of the running example. Finally, the larger scope of FlowUML is described.

Flow Specification in the UML. The Use Case, which is one of the UML diagram models requirements, specifies the usage scenario between the system and its intended users. These are followed by interaction diagrams specifying how objects in the use case interact with each other to achieve the end objective. Sequence diagrams are specific interaction diagrams that show such interactions as a sequence of messages exchanged between objects and ordered with respect to time. The sequence diagram shown in FIG. 22 consists of four objects and two actors, where Actor A initiates the first flow as a request to read information from Obj3 which then returns the requested information. Then, Actor A writes information to Obj4 and the control object, following which the flow to the control object triggers other flows.

Figure 22:
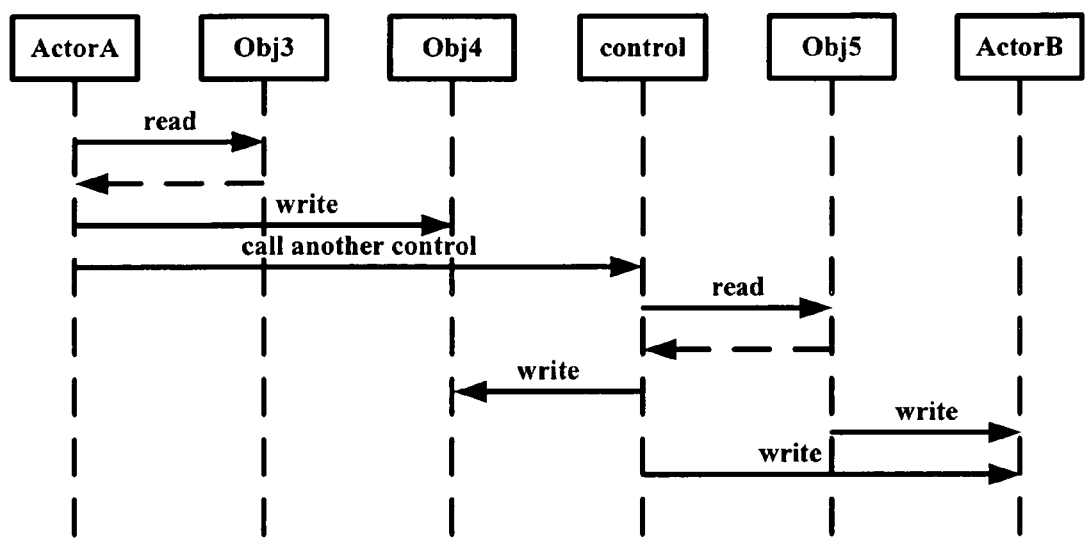
FIG. 22 shows a sequence diagram for use case2 with coarse grain.

As shown in FIG. 22, every use case starts with an event from an actor followed by a sequence of interactions between internal objects and possible actors. During these interactions, information flows among objects and actors. Because sequence diagrams capture information flow, FlowUML extracts these flows from them. Thus, one could write a parser to automate this process from the output of tools such as Rational Rose.

The Running Example. The example consists of two use cases. Use case 1 has a simple scenario shown in FIG. 23, and use case 2 has a more complex scenario shown in FIG. 24. The actor in use case 1 reads information from object Obj1 returned as an attribute att1 and then writes it to Obj2. The actor in use case 2 transfers information between two objects and then calls another object, leading to more information flow.

During the analysis stage of the software development, selected interactions are specified between objects. These interactions are further refined by specifying the message's attributes or parameters passed between objects. Therefore, the expressiveness and detail in a sequence diagram depends on the analysis stage. For example, the sequence diagram of use case 2 can be categorized into two views: coarse grain view shown in FIG. 22 and the fine-grain view shown in FIG. 24.

Notations and Assumptions.

Sources, Sinks and Object Types. Objects in sequence diagrams belong to three categories: actors, entities and control objects. Actors initiate flows and send/receive information to/from the system as externals. Every use case has at least one actor. Entity objects live longer and store information. Control objects provide coordination and application logic. Generally, actors and entity objects can be sources or sinks of information flows. Control objects do not store information, but they may create new information without storing them.

Axiom 1: Sources and sinks of information flows are actors and entities.

Method Names and Information Flows. Information flows in sequence diagrams arise due to attributes passed in method calls such as read and write. For example, the method call read(att1) that reads specific information from obj3 exchanges information by sending att1. FlowUML uses any message as a flow of information, regardless of its name.

Axiom 2: Any message with value is considered an information flow.

Complex Message Constructs in the UML. Sequence diagrams construct complex messages from simple ones using four constructs: creation messages used to create new objects, iteration messages used to send data multiple times, and conditional messages. A creation message may be considered as an information flow if the caller passes a creation parameter value to the callee. An iterated message may be considered to constitute a single information flow. I conditional message may be considered to be an information flow, regardless of the truth-value of the condition. A simple message may be considered as a flow if it passes information.

Attribute Dependencies Across Objects. First, information flowing into an object may flow out unaltered; this is called exact attributeflow in FlowUML. Second, some attributes flowing out of an object may be different in name, but always have the same value as an attribute that flows into the same object. FlowUML requires this information to be in the similar attribute table. Third, some attributes flowing out of an object may depend upon others that flow into the same object. FlowUML requires this information to be in the derived attribute table. The reason for knowing these is that, during the requirements specification stage, exact method details may not be available—but, without such properties, it is not possible to derive the consequences of information flowed across objects. I formalize these in the following definition and axioms:

Definition 1: An exact attribute is one that flows through an object, but does not change its value. When an attribute flows out of an object that depends upon a set of attributes flowing in to the same object, I say that the second attribute is derived from the first set.

Axiom 3: Attribute names are unique over a system.

Axiom 4: For every attribute that flows into an object, another attribute flows out of that object with the same value, but with a different attribute name, and both attribute names are listed in the similar attribute table and this is considered an exact attribute flow.

For example, an input attribute named familyName flows out of object A as lastName. If their values are the same and listed in the similar attribute table, lastName is considered an exact flow of familyName. If an attribute dateOfBirth flows into an object, another attribute named age flows out of the same object and both are listed in the derived attribute table, age is considered a derived of dateOfbirth.

Figure 25:
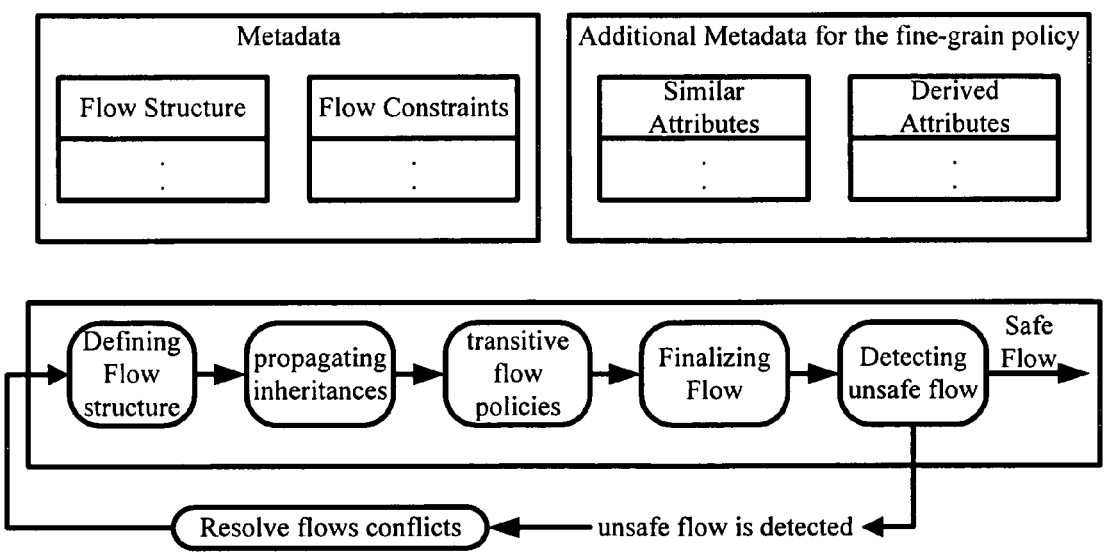
FIG. 25 shows FlowUML Steps.

Verification Process. FlowUML verifies flow policies using five sequenced steps and four metadata sources as shown in FIG. 25. They are defining basic structure, propagating flow information through inheritance hierarchies, inferring transitive flows, finalizing flows and detecting unsafe flows. These steps are the same for coarse grain and fine-grain policies. However, the details of information and the metadata sources are different when analyzing coarse- or fine-grain policies. Coarse-grain policies have less detail. Fine-grain policies incorporate attribute values and their dependencies.

Coarse-grain Policy Analysis. In coarse grain policy analysis, the available details of information about flow are the objects and how they interact with each other. The analysis starts with the first step, called defining flow structure. During this step, FlowUML extracts flow structure (objects, and their interaction) from sequence diagrams. This information is transformed into some basic FlowUML predicates. During the second step, basic predicates are propagated using the actor (or role) hierarchy. This step derives information flows implied due to inheritance. Although information flows can be transitive, the previous step does not derive those. Hence, the third step derives all transitive flows. The fourth step complements the third step by filtering results of the third step to those flows that satisfy properties of interests as specified in policies. For example, in FIG. 22 the third step derives a flow from Obj3 to Actor A directly, flow from Obj3 to Obj4 through Actor A, flow from Obj3 to control through Actor A etc. The fourth step, filters out unwanted flows according to predefined policies. For example, a policy may only filter in non-transitive flows between only entities and actors; thus, only flows from Obj3 to Actor A and the one from Actor A to Obj4, but not the flow from Obj3 to Obj4, may be of relevance. The last step detects flows that violate specified policies. At the moment, FlowUML does not attempt to resolve them automatically.

Fine-grain Policy Analysis. As stated earlier, fine-grain policies may require two kinds of additional information. The first, given in the similar attribute table, contains distinct attribute names that always contain the same data value. The second, given in the attribute derivation table, lists attribute dependencies. This information is useful in controlling the flow of sensitive information. For example, in FIG. 24, if there is a record in the attribute derivation table stating that att6 is derived from att3 in the control object, FlowUML concludes that there is a transitive flow from Actor A to Actor B.

Syntax and Semantics. FlowUML terms are either variables or constants belonging to five individual sorts: actors, objects, use cases, attributes and times. Constants belong to sets A, Obj, UC, Att, and T, and variables are represented as $X_a$, $X_{obj}$, $X_{uc}$, $X_{att}$ and $X_t$, respectively. FlowUML uses a set of predicates, as summarized in Tables 1 and 2 and categorized as follow:

Basic predicates for supporting the specification of flows, called FlowSup. One, a unary predicate isEntity($X_{obj}$) meaning $X_{obj}$ is an entity. Two, a unary predicate isActor($X_{obj}$) meaning $X_{obj}$ is an actor. Three, a binary predicate specializedActor($X_a$, $X'_a$) meaning $X'_a$ is a specialized actor of $X_a$. Four, a binary predicate precedes($X_{uc}$, $X'_{uc}$) meaning use cases $X_{uc}$ and $X'_{uc}$ are executed in that order. Five, a binary predicate sameAtt($X_{att}$, $X'_{att}$) meaning attributes $X_{att}$ and $X'_{att}$ have the same value. Six, a ternary predicate derAtt($X_{att}$, $X'_{att}$, $X_{obj}$) meaning that the flowing-out attribute $X'_{att}$ is derived from the flowing-in attribute $X_{att}$, an that derivation is occurring at object $X_{obj}$. Seven, a ternary predicate ignoreFlow($X_a$, $X_{obj}$, $X'_{obj}$) meaning to exclude the flow from object $X_{obj}$ to object $X'_{obj}$ from being considered as a violation of flow control policies. Eight, a 6-ary predicate ignoreFlows($X_{a1}$, $X_{obj1}$, $X'_{obj1}$, $X_{a2}$, $X_{obj2}$, $X'_{obj2}$) to exclude the flow from $X_{obj1}$ to $X'_{obj}$ and the flow from $X_{obj2}$ to $X'_{obj2}$ from being considered as a violation of flow control policies. Two similar predicates ignoreFlows$_{att}$($X_{a1}$, $X_{att}$, $X_{obj1}$, $X'_{obj1}$, $X_{a2}$, $X_{ob2}$, $X'_{obj2}$) and ignoreFlow$_{att}$($X_a$, $X_{att}$, $X_{obj}$, $X'_{obj}$) are used in fine-grain policies.

Predicates for specifying flow constraints, called ConstSup. One, a binary predicate dominates($X_{obj}$, $X'_{obj}$) meaning that the security label of object $X'_{obj}$ dominates or equals the security label of object $X_{obj}$. It is used in multi-level security policies. Two, a binary predicate $ACL(X_{obj}, X'_{obj}, X_{AT})$ meaning that object $X_{obj}$ is in the access control list of object $X'_{obj}$. It is used in discretionary access control policies. $X_{AT}$ is an operation such as read or write. Three, a binary predicate conflictingActors($X_{obj}$, $X'_{obj}$) meaning that actors $X_{obj}$ and $X'_{obj}$ are in conflict with each other for a specific reason. For example, both actors cannot flow information to the same object or there must not be a flow of information between them. Four, a binary predicate conflictingEntities ($X_{obj}$, $X'_{obj}$) meaning both entities $X_{obj}$ and $X'_{obj}$ are in conflict with each other for specific reason. For example, each entity belongs to different competitive company and information must not flow in between.

Predicates for coarse-grain policies. First, a 6-ary predicate $Flow(X_a, X_{obj}, X'_{obj}, X_t, X_{uc}, X_{op})$ meaning there is a simple flow initiated by actor $X_a$ from object $X_{obj}$ to object $X'_{obj}$ at time $X_t$ in use case $X_{uc}$ and operation $X_{op}$. Two, a 5-ary predicate $mayFlow(X_a, X_{obj}, X'_{obj}, X_t, X_{uc})$ is the transitive closure of the previous predicate. Three, $mayFlow_{interUC}(X_a, X_{obj}, X'_{obj}, X_t, X_{uc})$ is similar to mayFlow but the scope of $mayflow_{interUC}$ is between use cases instead of focusing in one use case. Note that I want to know the beginning and ending operations rather than the beginning and ending use cases. Four, a 4-ary predicate $finalFlow(X_a, X_{obj}, X'_{obj}, X_t)$ meaning a finalized flow. Five, $finalFlow_{interUC}(X_a, X_{obj}, X'_{obj}, X_t)$ is similar to finalFlow, but it covers flows between use cases. Six, a ternary predicate $unsafeFlow(X_a, X_{obj}, X'_{obj})$ meaning there is an unsafe flow from $X_{obj}$ to $X'_{obj}$ initiated by actor $X_a$. Seven, a 6-ary predicate $unsafeFlows(X_{a1}, X_{obj1}, X'_{obj1}, X_{a2}, X_{obj2}, X'_{obj2})$ meaning there are two unsafe flow. The first, initiated by actor $X_{a1}$ flows from $X_{obj1}$ to $X'_{obj1}$. The second, initiated by actor $X_{a2}$ flows from object $X_{obj2}$ to object $X'_{obj2}$. They are unsafe because together they violate a flow constraint. Eight, a ternary predicate $safeFlow(X_a, X_{obj}, X'_{obj})$ meaning that the flow initiated by actor $X_a$ from object $X_{obj}$ to object $X'_{obj}$ is safe.

Predicates for fine-grain policies. The predicates used to specify fine-grain access control policies are similar to the ones for coarse grain policy, but include $X_{att}$ as an attribute flowing between objects. They are as follows:

$Flow_{att}(X_a, X_{att}, X_{obj}, X'_{obj}, X_t, X_{uc}, X_{op})$,
$mayFlow_{att}(X_a, X_{att}, X_{obj}, X'_{obj}, X_t, X_{uc})$,
$mayFlow_{interUC\_att}(X_a, X_{att}, X_{obj}, X'_{obj}, X_t, X_{uc})$,
$finalFlow_{att}(X_a, X_{att}, X_{obj}, X'_{obj}, X_t)$,
$finalFlow_{interUC\_att}(X_a, X_{att}, X_{obj}, X'_{obj}, X_t)$,
$unsafeFlow_{att}(X_a, X_{att}, X_{obj}, X'_{obj})$,
$unsafeFlows_{att}(X_{a1}, X_{att1}, X_{obj1}, X'_{obj1}, X_{a2}, X_{att2}, X_{obj2}, X'_{obj2})$,
$safeFlow_{att}(X_a, X_{att1}, X_{obj}, X'_{obj})$.

Semantics of FlowUML. A FlowUML rule is of the form $L \leftarrow L_1, \ldots L_n$ where $L, L_1, \ldots L_n$ are literals satisfying the conditions stated in Table 10 and Table 11. Rules constructed according to these specifications form a locally stratified logic program and, therefore, has a unique stable model and that stable model is also a well-founded model.

TABLE 10

FlowUML's Strata for Coarse-grain Policies

| Phase | Stratum | Predicate | Rules defining the predicate |
|---|---|---|---|
| | 0 | FlowSup predicates | base relations. |
| | | ConstSup predicates | base relations. |
| Coarse-grain | 1 | $Flow(X_a, X_{obj}, X'_{obj}, X_t, X_{uc}, X_{op})$ | body may contain FlowSup predicates. |
| Coarse-grain | 2 | $mayFlow(X_a, X_{obj}, X'_{obj}, X_t, X_{uc})$ | body may contain literal from strata 0 to 2 |
| Coarse-grain | 3 | $mayFlow_{interUC}(X_a, X_{obj}, X'_{obj}, X_t, X_{uc})$ | body may contain literal from strata 0, 1 and 3 |
| Coarse-grain | 4 | $finalFlow(X_a, X_{obj}, X'_{obj}, X_t)$ $finalFlow_{interUC}(X_a, X_{obj}, X'_{obj}, X_t)$ | body may contain literal from strata 0 to 3 |
| Coarse-grain | 5 | $unsafeFlow(X_a, X_{obj}, X'_{obj})$ $unsafeFlows(X_a, X_{obj1}, X'_{obj1}, X_{a2}, X_{obj2}, X'_{obj2})$ | body may contain literal from strata 0 to 4 |
| Coarse-grain | 6 | $safeFlow(X_a, X_{obj}, X'_{obj})$ | body may contain literal from strata 0 to 5 |

TABLE 11

FlowUML's Strata for Fine-grain Policies

| Phase | Stratum | Predicate | Rules defining the predicate |
|---|---|---|---|
| | 0 | FlowSup predicates | base relations. |
| | | ConstSup predicates | base relations. |
| Fine-grain | 1 | $Flow_{att}(X_a, X_{att}, X_{obj}, X'_{obj}, X_t, X_{uc}, X_{op})$ | body may contain FlowSup predicates. |
| Fine-grain | 2 | $mayFlow_{att}(X_a, X_{att}, X_{obj}, X'_{obj}, X_t, X_{uc})$ | body may contain literal from strata 0, 1 and 2 |
| Fine-grain | 3 | $mayFlow_{interUC\_att}(X_a, X_{att}, X_{obj}, X'_{obj}, X_t, X_{uc})$ | body may contain literal from strata 0, 1 and 3 |
| Fine-grain | 4 | $finalFlow_{att}(X_a, X_{att}, X_{obj}, X'_{obj}, X_t)$ $finalFlow_{interUC\_att}(X_a, X_{att}, X_{obj}, X'_{obj}, X_t)$ | body may contain literal from strata 0 to 3 |
| Fine-grain | 5 | $unsafeFlow_{att}(X_a, X_{att}, X_{obj}, X'_{obj})$ $unsafeFlows_{att}(X_{a1}, X_{att1}, X_{obj1}, X'_{obj1}, X_{a2}, X_{att2}, X_{obj2}, X'_{obj2})$ | body may contain literal from strata 0 to 4 |
| Fine-grain | 6 | $safeFlow_{att}(X_a, X_{att}, X_{obj}, X'_{obj})$ | body may contain literal from strata 0 to 5 |

Applying FlowUML. This section shows how some samples of FlowUML policies and how they can be used to detect unsafe flows.

Figure 23:
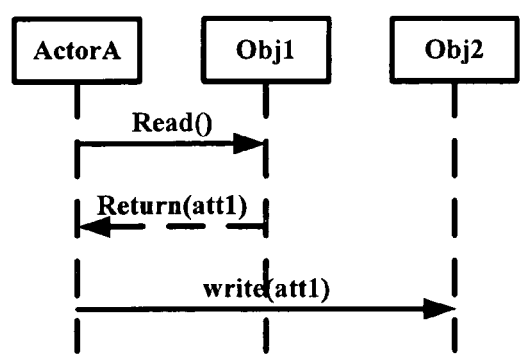
FIG. 23 shows a sequence diagram for use case1.
Figure 24:
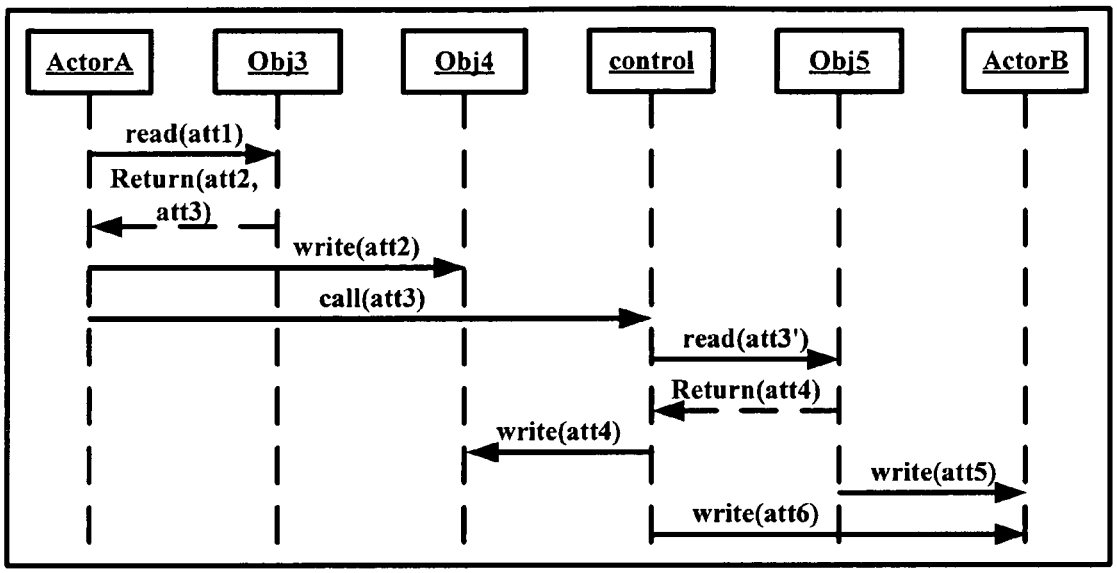
FIG. 24 shows a sequence diagram for use case2 with fine grain.

Basic Flow Predicates. Examples of flow information available in FIG. 23 are given in rules (1). The rules (2) to (6) are instances of FlowSup predicates valid in FIGS. 2 and 3.

$$Flow_{att}(ActorA, att1, Obj1, ActorA, 1, uc1, op1) \leftarrow \quad (1)$$

$$Flow_{att}(ActorA, att1, ActorA, Obj2, 2, uc1, op2) \leftarrow$$

$$isEntity(obj1) \leftarrow \quad (2)$$

$$isActor(actorA) \leftarrow \quad (3)$$

$$\text{precedes}(uc1, uc2) \leftarrow \tag{4}$$

$$\text{sameAtt}(att3, att3') \leftarrow \tag{5}$$

$$\text{derAtt}(att3, att6, control) \leftarrow \tag{6}$$

Propagation Policies. The second step applies a policy that propagates flows along actor hierarchies. In the example, if there is a specialized actor say Actor C of Actor B then Actor C receives att5 and att6. Policies stating acceptable inheritances can be stated in example rules such as (7) to (9).

$$\text{Flow}(X'_a, X_{obj}, X'_{obj}, X_t, X_{uc}, X_{op}) \leftarrow \text{Flow}(X_a, X_{obj}, X'_{obj}, X_t, X_{uc}, X_{op}),$$

$$\text{specializedRole}(X_a, X'_a) \tag{7}$$

$$\text{Flow}(X_a, X''_{obj}, X'_{obj}, X_t, X_{uc}, X_{op}) \leftarrow \text{Flow}(X_a, X_{obj}, X'_{obj}, X_t, X_{uc}, X_{op}),$$

$$\text{isActor}(X_{obj}), \text{specializedActor}(X_{obj}, X''_{obj}) \tag{8}$$

$$\text{Flow}(X_a, X_{obj}, X''_{obj}, X_t, X_{uc}, X_{op}) \leftarrow \text{Flow}(X_a, X_{obj}, X'_{obj}, X_t, X_{uc}, X_{op}),$$

$$\text{isActor}(X'_{obj}), \text{specializedActor}(X'_{obj}, X''_{obj}) \tag{9}$$

Rule 7 says that every actor that plays a specialized role of an actor that initiates a flow also initiates an inherited flow. In rules 8 and 9, for every flow from or to an actor, respectively, rules 8 and 9 add new information flow for every specialized actor of the actor who sends or receives the information, respectively.

Transitive Flow Policies. Policies written for the third step recursively construct transitive flows from basic ones. This step is sufficiently flexible to accommodate various options discussed earlier. Due to space constraints some examples in rules 10 through 13 were shown. Rule 10 declares a basic flow to be a transitive flow and rules 11 specifies all possible information flows between any types of objects and rules 12 specifies possible flows that goes through an intermediate object that is not an actor or an entity. The flow between Obj5 and Obj4 are examples of such flows. Rule 13 specifies all flows that respect the precedent order between their use cases. The flow between Obj1 and Obj3 is such an example.

$$\text{mayFlow}(X_a, X_{obj}, X'_{obj}, X_t, X_{uc}) \leftarrow \text{Flow}(X_a, X_{obj}, X'_{obj}, X_t, X_{uc}, X_{op}) \tag{10}$$

$$\text{mayFlow}(X_a, X_{obj}, X'_{obj}, X_t, X_{uc}) \leftarrow \text{Flow}(X_a, X_{obj}, X'_{obj}, X_t, X_{uc}, X_{op})$$

$$\text{mayFlow}(X_a, X_{obj}, X'_{obj}, X_t, X_{uc}) \leftarrow \text{Flow}(X_a, X_{obj}, X_{BTWobj}, X_t, X_{uc}, X_{op})$$

$$\text{mayFlow}(X_a, X_{BTWobj}, X'_{obj}, X'_t, X_{uc}), X_t < X'_t \tag{11}$$

$$\text{mayFlow}(X_a, X_{obj}, X'_{obj}, X_t, X_{uc}) \leftarrow \text{Flow}(X_a, X_{obj}, X'_{obj}, X_t, X_{uc}, X_{op})$$

$$\text{mayFlow}(X_a, X_{obj}, X'_{obj}, X_t, X_{uc}) \leftarrow \text{Flow}(X_a, X_{obj}, X_{BTWobj}, X_t, X_{uc}, X_{op}),$$

$$\text{mayFlow}(X_a, X_{BTWobj}, X'_{obj}, X'_t, X_{uc}),$$

$$X_t < X'_t, \neg(\text{isActor}(X_{BTWobj}); \text{isEntity}(X_{BTWobj})) \tag{12}$$

$$\text{mayFlow}_{interUC}(X_a, X_{obj}, X'_{obj}, X_t, X_{uc}) \leftarrow \text{Flow}(X_a, X_{obj}, X'_{obj}, X_t, X_{uc}, X_{op})$$

$$\text{mayFlow}_{interUC}(X_a, X_{obj}, X'_{obj}, X_t, X_{uc}) \leftarrow$$

$$\text{Flow}(X_a, X_{obj}, X_{BTWobj}, X_t, X_{uc}, X_{op}),$$

$$\text{mayFlow}_{interUC}(X_a, X_{BTWobj}, X'_{obj}, X'_t, X'_{uc}),$$

$$((X_t < X'_t, X_{uc} = X'_{uc}); \text{precedes}(X_{uc}, X'_{uc})) \tag{13}$$

Previous examples show coarse-grain flow policies. I now show some fine-grain flow polices. The first example permits flows using different attribute names to contain the same value from the similar attribute table. Rule 14 states that if att3 and att3' in FIG. 24 have the same value then the flow of att3 from actor A to Obj5 is permitted.

$$\text{mayFlow}(X_a, X_{att}, X_{obj}, X'_{obj}, X_t, X_{uc}) \leftarrow$$

$$\text{Flow}(X_a, X_{att}, X_{obj}, X'_{obj}, X_t, X_{uc}, X_{op})$$

$$\text{mayFlow}(X_a, X_{att}, X_{obj}, X'_{obj}, X_t, X_{uc}) \leftarrow$$

$$\text{Flow}(X_a, X_{att}, X_{obj}, X_{BTWobj}, X_t, X_{uc}, X_{op})$$

$$\text{mayFlow}(X_a, X'_{att}, X_{BTWobj}, X'_{obj}, X'_t, X_{uc}),$$

$$X_t < X'_t, (\text{sameAtt}(X_{att}, X'_{att}); X_{att} = X'_{att}) \tag{14}$$

Rule 15 specifies that all transitive flows are accepted provided that attribute derivation is confined to intermediate objects. For example, if FIG. 23 had an entry in the derived attribute table stating that att6 is derived from att3 in the control object, the flow from actor A to actor B is permitted.

$$\text{mayFlow}(X_a, X_{att}, X_{obj}, X'_{obj}, X_t, X_{uc}) \leftarrow$$

$$\text{Flow}(X_a, X_{att}, X_{obj}, X'_{obj}, X_t, X_{uc}, X_{op})$$

$$\text{mayFlow}(X_a, X_{att}, X_{obj}, X'_{obj}, X_t, X_{uc}) \leftarrow$$

$$\text{Flow}(X_a, X_{att}, X_{obj}, X_{BTWobj}, X_t, X_{uc}, X_{op})$$

$$\text{mayFlow}(X_a, X'_{att}, X_{BTWobj}, X'_{obj}, X'_t, X_{uc}),$$

$$X_t < X'_t, (\text{sameAtt}(X_{att}, X'_{att});$$

$$X_{att} = X'_{att}, \text{derAtt}(X_{att}, X'_{att}, X_{BTWobj})) \tag{15}$$

Finalizing Flows. After propagating flows along inheritance hierarchies and extending them to become transitive by using recursive rules, the fourth step provides filtering policies to choose desired flows. An example is rule 16 that chooses all possible information flow that starts and ends in actors, entities or both inside a single use case. Rule 17 does the same, but across use cases.

$$\text{finalFlow}(X_a, X_{obj}, X'_{obj}, X_t) \leftarrow \text{mayFlow}(X_a, X_{obj}, X'_{obj}, X_t, X_{uc}),$$

$$(\text{isActor}(X_{obj}); \text{isEntity}(X_{obj})), (\text{isActor}(X'_{obj}); \text{isEntity}(X'_{obj})) \tag{16}$$

$$\text{finalFlow}_{interUC}(X_a, X_{obj}, X'_{obj}, X_t) \leftarrow$$

$$\text{mayFlow}_{interUC}(X_a, X_{obj}, X'_{obj}, X_t, X_{uc}),$$

$$(\text{isActor}(X_{obj}); \text{isEntity}(X_{obj})),$$

$$(\text{isActor}(X'_{obj}); \text{isEntity}(X'_{obj})) \tag{17}$$

Detecting Unsafe Flows with Respect to Policies. This section shows FlowUML specification of known flow control policies, and how to detect unsafe information flows with respect to them.

Mandatory Access Control (MAC) restricts subjects in accessing objects that are classified higher than them. In order to do so, all objects are labeled with sensitivity levels and all users have clearance levels. Rule 18 ensures that, if information flows from Obj1 to Obj2 and the Obj2 does not dominate or equals the security label of Obj1, this is considered unsafe.

$$\text{unsafeFlow}(X_a, X_{obj1}, X_{obj2}) \leftarrow \text{finalFlow}(X_a, X_{obj1}, X_{obj2}, X_t),$$

$$\neg \text{dominates}(X_{obj1}, X_{obj2}) \quad (18)$$

Discretionary access control (DAC) allows subjects to access objects solely based on the subject's identity and authorization. Object owners have the discretion to allow other subjects to access their objects using access control lists (ACL). Rule 19 specifies unauthorized information flows from an actor to an object and rule 20 specifies unauthorized flows from an object to an actor.

$$\text{unsafeFlow}_{att}(X_a, X_{att1}, X_{obj1}, X_{obj2}) \leftarrow$$

$$\text{finalFlow}(X_a, X_{att1}, X_{obj1}, X_{obj2}, X_t), \neg \text{ACL}(X_{obj1}, X_{obj2}, w) \quad (19)$$

$$\text{unsafeFlow}_{att}(X_a, X_{att1}, X_{obj2}, X_{obj1}) \leftarrow$$

$$\text{finalFlow}(X_a, X_{att1}, X_{obj2}, X_{obj1}, X_t), \neg \text{ACL}(X_{obj1}), X_{obj2}, r) \quad (20)$$

Static separation of duty (SsoD) prevents actors that have conflicts, e.g., the account payable manager and the purchasing manager accessing the same object. Policies can restrict a particular information flow between two conflicting actors such as is specified in rule 21.

$$\text{unsafeFlow}(X_a, X_{obj1}, X_{obj3}) \leftarrow \text{finalFlow}(X_a, X_{obj1}, X_{obj2}, X_t),$$

$$\text{finalFlow}(X_a, X_{obj2}, X_{obj3}, X'_t), \text{conflictingActors}(X_{obj1}, X_{obj3})$$

$$\text{isActor}(X_{obj1}), \text{isActor}(X_{obj3}), Xt < X't \quad (21)$$

Another example policy restricts passing two attributes by the same actor, as stated in rule 22. A third example in rule 23 prevents two conflicting actors from passing the same attribute to the same object.

$$\text{unsafeFlows}_{att}(X_a, X_{att1}, X_{obj1}, X_{obj2}, X'_a, X_{att2}, X_{obj3}, X_{obj2}) \leftarrow$$

$$\text{finalFlow}(X_a, X_{att1}, X_{obj1}, X_{obj2}, X_t),$$

$$\text{finalFlow}(X'_a, X_{att2}, X_{obj3}, X_{obj2}, X'_t),$$

$$\text{isActor}(X_{obj1}), \text{isActor}(X_{obj3}), X_{obj1} = X_{obj3}, X_{att1} \neq X_{att2} \quad (22)$$

$$\text{unsafeFlows}_{att}(X_a, X_{att1}, X_{obj1}, X_{obj2}, X'_a, X_{att1}, X_{obj3}, X_{obj2}) \leftarrow$$

$$\text{finalFlow}(X_a, X_{att1}, X_{obj1}, X_{obj2}, X_t),$$

$$\text{finalFlow}(X'_a, X_{att1}, X_{obj3}, X_{obj2}, X'_t),$$

$$\text{conflictingActors}(X_{obj1}, X_{obj3}),$$

$$\text{isActor}(X_{obj1}), \text{isActor}(X_{obj3}) \quad (23)$$

In detecting unsafe information flows, FlowUML raises an alert to the analyst to resolve it and run FlowUML again. However, the analyst can tolerate particular violations, as shown in rule 24 that modifies rule 18. Rule 24 states that, if an information flows from Obj1 to Obj2 and Obj2 does not dominate or equals the security label of Obj1 and the security analyst has not tolerated it before, it is an unsafe flow. I allow this option because some specification methods tolerate known inconsistencies.

$$\text{unsafeFlow}(X_a, X_{obj1}, X_{obj2}) \leftarrow \text{finalFlow}(X_a, X_{obj1}, X_{obj2}, X_t),$$

$$\neg \text{dominates}(X_{obj1}, X_{obj2}), \neg \text{ignoreFlow}(X_a, X_{obj}, X'_{obj}) \quad (24)$$

Rules 25, 26 and 27 declare any flow that includes an unsafe flow fragment to be unsafe. Rules 28 and 29 are related to unsafeFlows predicate that detects two flows to be unsafe, the rules mark every single flow in that predicate as a single unsafe flow.

$$\text{unsafeFlow}(X_a, X_{obj1}, X_{obj3}) \leftarrow \text{mayFlow}(X_a, X_{obj1}, X_{obj3}, X_t),$$

$$\text{unsafeFlow}(X_a, X_{obj2}, X_{obj3}),$$

$$\text{mayFlow}(X_a, X_{obj1}, X_{obj2}, X_t) \quad (25)$$

$$\text{unsafeFlow}(X_a, X_{obj2}, X_{obj4}) \leftarrow \text{mayFlow}(X_a, X_{obj2}, X_{obj4}, X_t),$$

$$\text{unsafeFlow}(X_a, X_{obj2}, X_{obj3}),$$

$$\text{mayFlow}(X_a, X_{obj3}, X_{obj4}, X_t) \quad (26)$$

$$\text{unsafeFlow}(X_a, X_{obj1}, X_{obj4}) \leftarrow \text{mayFlow}(X_a, X_{obj1}, X_{obj4}, X_t),$$

$$\text{unsafeFlow}(X_a, X_{obj2}, X_{obj3}),$$

$$\text{mayFlow}(X_a, X_{obj1}, X_{obj2}, X_t),$$

$$\text{mayFlow}(X_a, X_{obj3}, X_{obj4}, X_t) \quad (27)$$

$$\text{unsafeFlow}_{att}(X_a, X_{att1}, X_{obj1}, X_{obj2}) \leftarrow$$

$$\text{unsafeFlows}_{att}(X_a, X_{att1}, X_{obj1}, X_{obj2}, X'_a, X_{att2}, X_{obj3}, X_{obj2}) \quad (28)$$

$$\text{unsafeFlow}_{att}(X_a, X_{att2}, X_{obj3}, X_{obj2}) \leftarrow$$

$$\text{unsafeFlows}_{att}(X_a, X_{att1}, X_{obj1}, X_{obj2}, X'_a, X_{att2}, X_{obj3}, X_{obj2}) \quad (29)$$

The last step is a completion rule specifying that every flow is safe provided that it cannot be derived to be unsafe, as shown in rule 30.

$$\text{safeFlow}(X_a, X_{obj}, X'_{obj}) \leftarrow \neg \text{unsafeFlow}(X_a, X_{obj}, X'_{obj}) \quad (30)$$

Figure 26:
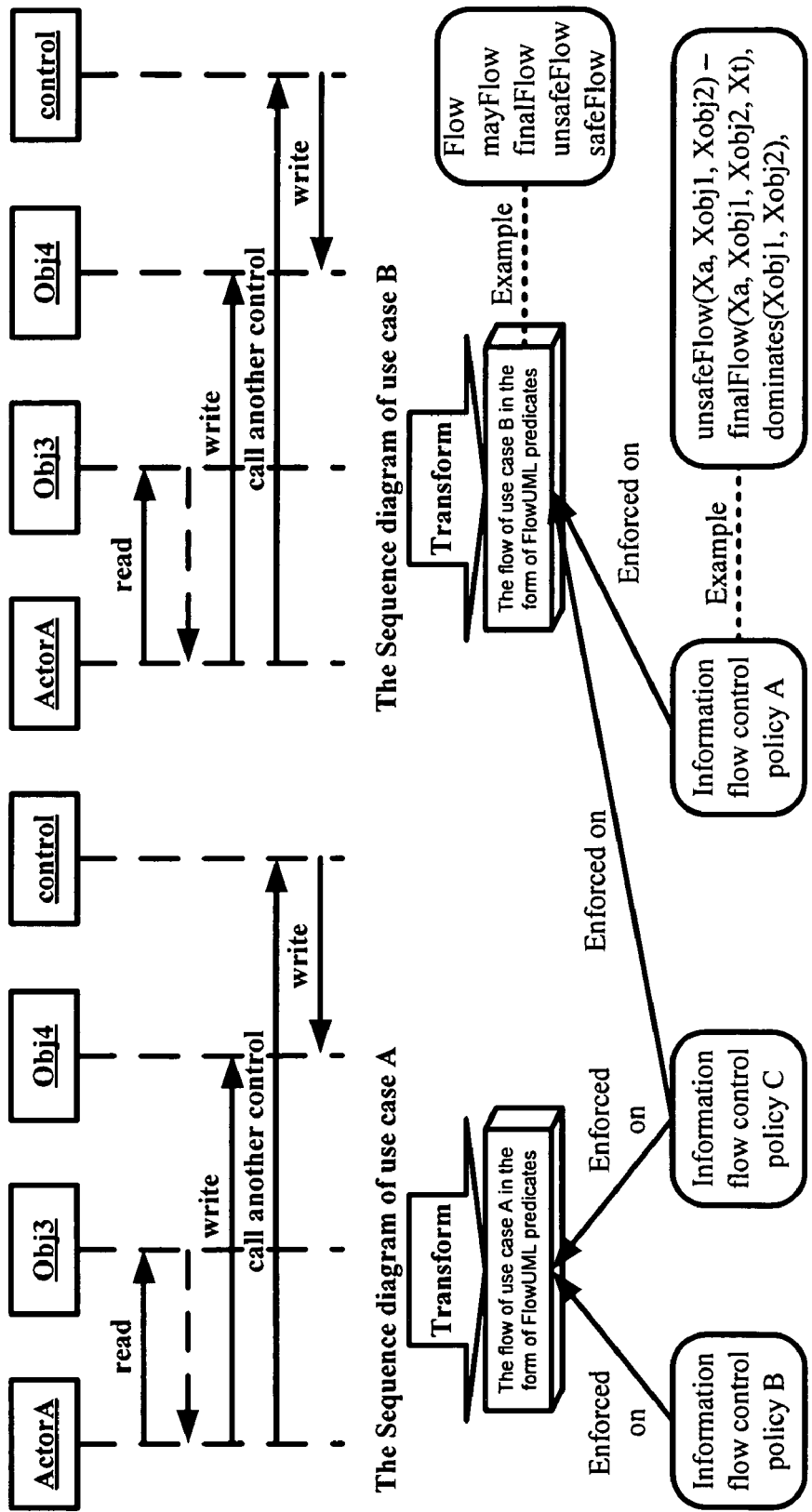
FIG. 26 shows FlowUML's Scope.

The larger scope of FlowUML. This section describes the larger scope and applicability of FlowUML in incorporating security models to the software development life cycle. First, as shown in FIG. 26 FlowUML transforms the geometric information in the UML views to a set of predicates that can be used as basic predicates in flow control policies written as Horn clauses. It was shown how such policies can be used to derive compliance of sequence diagrams to flow control policies. Because the UML pictorial sequence diagrams are saved as text files (such as mdl files of Rational Rose with an appropriate translator, I can now automate policy compliance checking of flow control policies by using appropriate logic programming engines, such as Prolog.

Second, other than the basic predicates used to capture the geometric information given in the UML sequence diagrams, other Horn clauses of FlowUML constitute policies that are applicable at the early stages of the software design cycle. Thus, this division of predicate layers shows the clear separation of the basic geometry of the design from policy. As shown in the right hand side of FIG. 26, the latter constituting of recursive rules are applied to a design constituting instances of basic predicates. Therefore, FlowUML can be considered an example framework to write policies applicable to the UML.

This separation of policy from the application has many consequences. The first is that it facilitates applying any policy to any design. As shown in FIG. 26, policies B and C can be separately applied to the sequence diagram of use case A. Similarly, as shown, policies A and B can be separately applied to the sequence diagram of use case B. This shows that more than one policy applies to one design diagram and that one policy applies to more than one diagram.

Third, the same process can be used to check the consistency of two design diagrams with respect to a given security policy. That is, if two design diagrams are compliant with a given policy, as far as that policy is concerned, they are indistinguishable. This concept is developed further in designing a notion of policy based equivalence of design diagrams in the UML.

Fourth, if the UML policies can be separated from designs as shown here, a policy composition framework for the UML policy compositions may be developed.

Last, by capturing more rules related to geometry of sequence diagrams, one may be able to capture deficiencies in the diagrams. If successful, this may lead to a policy-based, reverse engineering, framework for the UML diagrams.

Sectional Conclusions. FlowUML is a logic programming based framework to specify and verify the compliance of information flow requirements with the information flow control policies in the UML based designs at the early phases of the software development life cycle. I have demonstrated the flexibility and the expressiveness by showing how existing information flow control policies can be verified with FlowUML specifications.

Integrating the Analysis of Access and Flow Control Policies

The previous two sections addressed both policies separately. However, because both policies have a tight relationship between them, integrating the analysis of both policies will improve the validation and enforcement of access and flow control policies during the software development life cycle. In this section both AuthUML and FlowUML are integrated. A collaboration framework and how to transform one framework output to other framework is shown. Also, the flexibility and scalability behind the new integrated framework of AuthUML and FlowUML is shown.

The integration is desired because both access and flow control policies are tightly coupled to each other at the design stage, they both overlap, and each one relies and/or provides useful information to the other. The reminder of the section is organized as follows. Forst, a running example to be used during the section is presented. Next, the integration of between AuthUML and FlowUML is described. Finally, the flexibility and scalability of the two frameworks is described.

Figure 27:
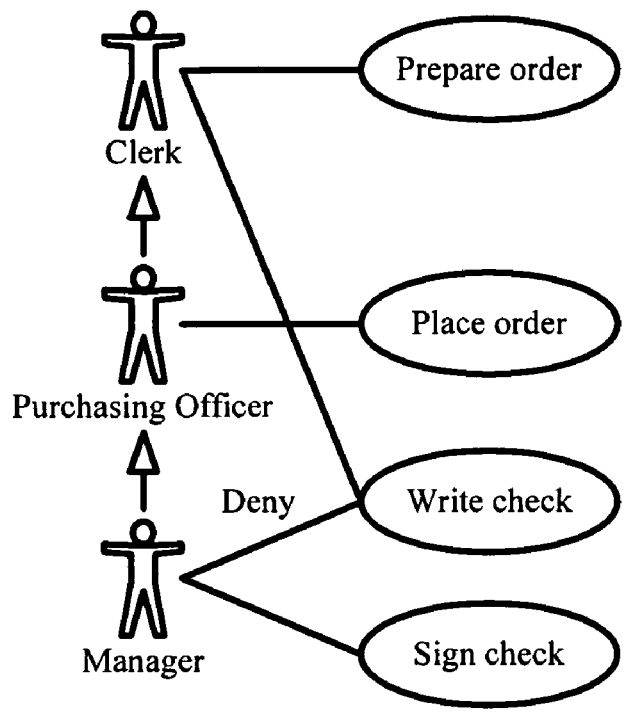
FIG. 27 shows an example of an abstract use case.
Figure 28:
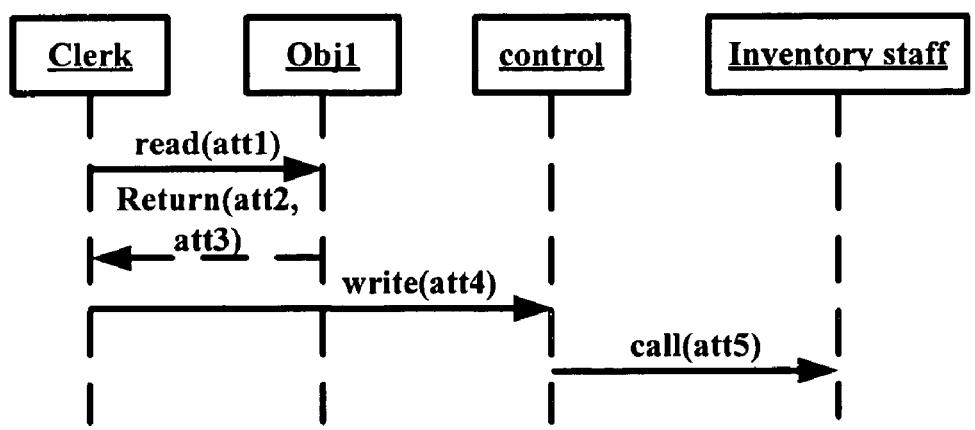
FIG. 28 shows the sequence diagram of the Prepare order use case.

Running Example. In this section, an example to be used during the rest of the section is presented. FIG. 27 shows an example of an abstract use case. It shows the different use cases and the actors who are allowed or not allowed to invoke them. The example represents a purchasing process where a Clerk prepares an order, and then a Purchasing Officer places the order. Later, the Clerk writes a check for the order and the Manager signs it. The actors (roles) are ordered in a hierarchy where every actor inherits the permissions of its higher actors. For example, the Purchasing Officer inherits the authorizations of the Clerk and, thus, the Purchasing Officer is allowed to prepare orders and write checks implicitly. The links between actors and use cases is considered as permission while the link with Deny is considered a denial execution. Each use case consists of one or more operations to achieve the objective of the use case. Sometimes an operation can be part of two use cases. FIG. 28 shows the sequence diagram of the Prepare order use case.

The following is the result of extracting the information flow from the sequence diagram in FIG. 28 that shows an example of a sequence diagram corresponding to the Prepare order use case.

$$\text{Flow}_{att}(\text{Clerk}, \text{att}_1, \text{Clerk}, \text{Obj}_1, 1, \text{"Prepare order"}, \text{read}) \leftarrow$$

$$\text{Flow}_{att}(\text{Clerk}, \text{att}_2, \text{Obj}_1, \text{Clerk}, 2, \text{"Prepare order"}, \text{read}) \leftarrow$$

$$\text{Flow}_{att}(\text{Clerk}, \text{att}_3, \text{Obj}_1, \text{Clerk}, 2, \text{"Prepare order"}, \text{read}) \leftarrow$$

$$\text{Flow}_{att}(\text{Clerk}, \text{att}_4, \text{Clerk}, \text{control}, 3, \text{"Prepare order"}, \text{write}) \leftarrow$$

$$\text{Flow}_{att}(\text{Clerk}, \text{att}_5, \text{control}, \text{Inventory staff}, 4, \text{"Prepare order"}, \text{call}) \leftarrow \qquad (6)$$

AuthUML and FlowUML Collaboration. AuthUML analyzes the access control, but does not analyze the control of information flow. For example, Actor A has an authorization to access operation op1, but the invocation of op1 will result in sending information to actor B who may not be allowed to see that information. Conversely, FlowUML provides deeper analysis of authorization because it goes deep in to the attribute level of operations and considers implicit operations that are not directly called by actors that occur as consequences of initiated operations. Thus, FlowUML provides new useful information to AuthUML that will not be available otherwise. Therefore, FlowUML complements AuthUML by providing it with information that was unavailable otherwise.

FlowUML is applied between phase 2 and 3 of AuthUML for several reasons. First, FlowUML lists all operations of a use case that are taken from the sequence diagram. Second, it reduces redundancy by extracting operations of use cases and improves analysis efficiency by ensuring the proper flow of information before analyzing the authorizations operation level. Third, FlowUML provides new valuable data to AuthUML that in turn well validate more access control policies.

Figure 29:
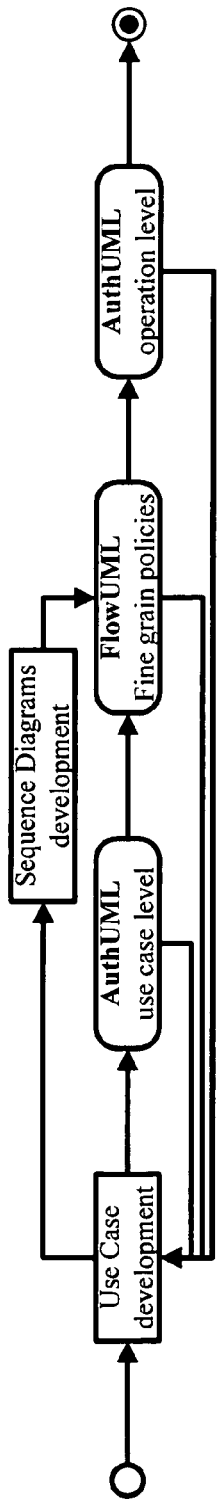
FIG. 29 shows AuthUML and FlowUML Collaboration.
Figure 30:
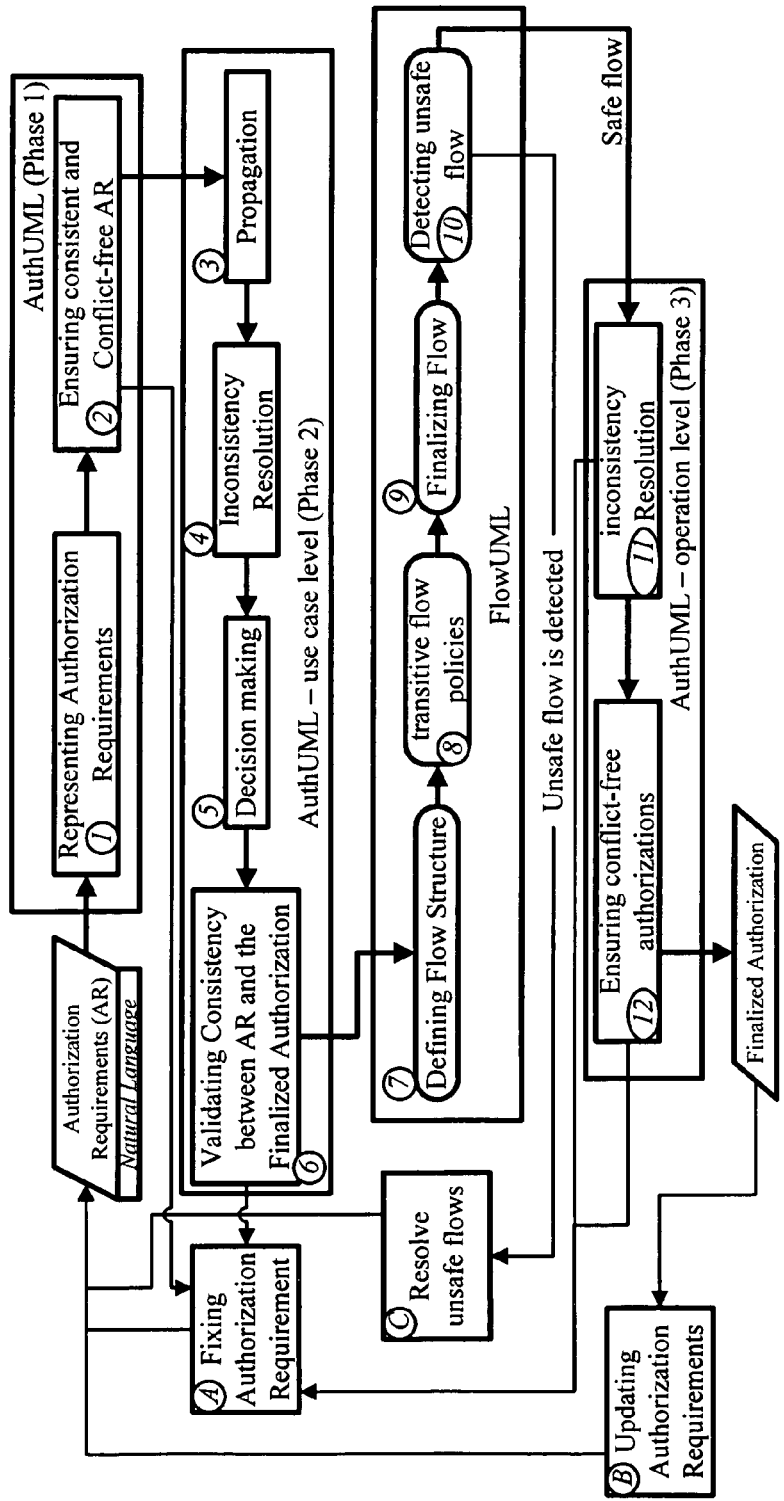
FIG. 30 shows a comprehensive AuthUML and FlowUML Collaboration.

Collaboration Process. The collaboration between AuthUML and FlowUML is shown in FIG. 29 and in more detail in FIG. 30. Because the new collaboration process requires inserting FlowUML between phases two and three of AuthUML, the combined process consists of five stages.

The Collaboration of Predicates. AuthUML and FlowUML are integrated well with each other to improve the analysis of both access and flow control policies. Both frameworks' predicates collaborate seamlessly with each other where one predicate is built on top of the other one. FIG. 31 shows how the predicates of both frameworks are merged into one strata to provide the needed collaboration.

The Collaboration Process in Detail.

Use Case Development. Before any analysis, one may assume that the use cases are already developed for the system that will be analyzed, but at this level the use case can be in an abstract form where only the use case objective and the authorized actors are defined. FIG. 27 shows an example of a use case in such an abstract view.

Applying AuthUML at the Use Case Level. Because only the abstract use cases are developed at this time, only the first and second phases of AuthUML are applied. This stage analyzes the authorization requirement of the use case and ensures that they are consistent, complete and free of application-specified conflicts. The finalized authorizations produced by this stage are in the form of $do_{UC}(X_s, \pm X_{uc})$. This outcome will be used in the FlowUML to validate the correctness of the sequence diagram from the point of view of authorization of information flow.

Sequence Diagram Development. After the use cases are developed at the abstract level, the next step is to develop the details of each use case by identifying the operations and the information flow between them. Such details are represented by one of the interaction diagrams type. One may choose sequence diagrams. FIG. 28 shows an example of a sequence diagram of a Prepare order use case. Every use case in FIG. 27 is represented in a sequence diagram that shows all operations of a use case and how they interact with objects.

Applying FlowUML. FlowUML extracts the information flow between objects within a use case and between use cases to validate the enforcement of information flow control policies and to ensure that every flow is safe. Also, FlowUML identifies all operations that are part of a use case. Note that at this stage both coarse and fine-grain policies apply. However, because the third phase of AuthUML addresses the operation level access content, I choose to demonstrate only the analysis of fine-grain policies of FlowUML.

After extracting the information flow from the sequence diagram, the original FlowUML needs to detect all derived (implicit) authorizations of all actors from the actor hierarchy. However, because AuthUML has already derived those authorizations at the second stage, I can derive the inherited authorized information flow by using the finalized authorization predicates produced by AuthUML. The following rules show how to derive inherited information flow using AuthUML predicates.

$$Flow_{att}(X_s, X_{att}, X_{obj}, X'_{obj}, X_t, X_{uc}, X_{op}) \leftarrow do_{UC}(X_s, +X_{uc}),$$

$$Flow_{att}(X'_s, X_{att}, X_{obj}, X'_{obj}, X_t, X_{uc}, X_{op}) \quad (7)$$

$$Flow_{att}(X_s, X_{att}, X_s, X'_{obj}, X_t, X_{uc}, X_{op}) \leftarrow do_{UC}(X_s, +X_{uc}),$$
$$in(X_s, X''_s)$$

$$Flow_{att}(X'_s, X_{att}, X''_s, X'_{obj}, X_t, X_{uc}, X_{op}) \quad (8)$$

$$Flow_{att}(X_s, X_{att}, X_{obj}, X_s, X_t, X_{uc}, X_{op}) \leftarrow do_{UC}(X_s, +X_{uc}),$$
$$in(Xs, X''_s)$$

$$Flow_{att}(X'_s, X_{att}, X_{obj}, X''_s, X_t, X_{uc}, X_{op}) \quad (9)$$

Note that the inherited authorization was first derived during the first phase of AuthUML then finalized in the form of $do_{UC}(X_s, +X_{uc})$ at the end of that phase. The previous rule states that, if there is an actor who is authorized to invoke a use case and there is a flow of an operation that is part of the same use case and it is initiated by any actor (not necessary the same actor of the use case), there will be a new flow predicate that states that the authorized actor of the use case will be authorized to initiate the same flow of that operation. For example, the Prepare order use case in FIG. 27 has several operations as shown in FIG. 28. The operation read(att1) is extracted as:

$$Flow_{att}(\text{Clerk, att}_1, \text{Clerk, Obj}_1, 1, \text{"Prepare order"}, \text{read}) \quad (10)$$

Given that the Purchasing officer has an implicit authorization to invoke the Prepare order because s/he is a specialized actor of Clerk, AuthUML authorization is written as:

$$do_{UC}(\text{"Purchasing officer"}, +\text{"Prepare order"}) \quad (11)$$

Thus, by combining predicates 10 and 11, the Purchasing officer will also be authorized to initiate the read operation that is written as:

$$Flow_{att}(\text{"Purchasing officer"}, \text{att}_1, \text{"Purchasing officer"}, \text{Obj}_1, 1, \text{"Prepare order"}, \text{read}) \quad (12)$$

From the collaboration prospective, FlowUML identifies all operations of the use case and presents it as an instance of the $Flow_{att}(X_s, X_{att}, X_{obj}, X'_{obj}, X_t, X_{uc}, X_{op})$. FlowUML provides data to AuthUML that allows the validation of more access control policies, that were not available without FlowUML. Some examples follow:

Access Control List (ACL) of each operation: It enumerates all allowed actors who can access a particular operation.

$$ACL(X_a, X_{op}) \leftarrow Flow_{att}(X_a, X_{att}, X_{obj}, X'_{obj}, X_t, X_{op})$$

$$ACL(X_a, X_{op}) \leftarrow Flow_{att}(X_a, X_{att}, X_{obj}, X'_{obj}, X_t, X_{op}),$$
$$isActor(X_{obj}) \quad (13)$$

All information received by an actor: It lists all attributes that may flow to a particular actor. For example, it states whether an actor may receive the trade secret attribute.

$$recList(X_a, X_{att}) \leftarrow finalFlow_{att}(X_a, X_{att}, X_{obj}, X'_{obj}, X_t),$$
$$isActor(X'_{obj}) \quad (14)$$

All information sent by an actor: It lists all attributes that an actor may send. For example, it states whether an actor may write/modify the salary.

$$sentList(Xa, XattXobj) \leftarrow finalFlowatt(Xa, Xatt, Xobj, X'obj, Xt),$$

$$isActor(Xobj) \quad (15)$$

Applying AuthUML at the Operation Level. At this stage, AuthUML is applied again, but at the operation level. Although, the flow between objects is safe after applying FlowUML, the derived information may violate the operation level authorizations. Thus, AuthUML is applied at the last phase to ensure consistent, complete and conflict-free authorizations at the operations level. Because transformation from FlowUML to AuthUML (phase 3) provides all the operations of use cases, the transformation eliminates the first step in phase 3 of the original AuthUML that derives authorizations of all operations of a use cases. This transformation follows rule 16.

$$dercando_{OP}(X_a, +X_{op}) \leftarrow Flow_{att}(X_a, X_{att}, X_{obj}, X'_{obj}, X_t, X_{uc}, X_{op}) \quad (16)$$

The previous rule says that, if there is a flow that is a part of an operation op and it is initiated by an actor A, there is a positive authorization of actor A to invoke op. For example, consider the Prepare order use case which was shown in FIG. 28 and written in FlowUML in the form of $Flow_{att}(X_a, X_{att}, X_{obj}, X'_{obj}, X_t, X_{uc}, X_{op})$ predicate as in 6. Note that the $Flow_{att}$ predicate specifies the use case and the operations that are affected by the flow. Thus, from that attribute of $Flow_{att}$, I can deduce the operations of use cases. The following are the results of applying rule 16 based on the predicates in 6.

$$dercando_{OP}(\text{Clerk, read}) \leftarrow Flow_{att}(\text{Clerk, att}_1, \text{Clerk,} \\ \text{Obj}_1, 1, \text{"Prepare order"}, \text{read})$$

dercando$_{OP}$(Clerk, write)←Flow$_{att}$(Clerk, att$_4$, Clerk, control, 3, "Prepare order", write)

dercando$_{OP}$(Clerk, call)←Flow$_{att}$(Clerk, att$_5$, control, Inventory staff, 4, "Prepare order", call) (17)

In addition, rule 16 will be applied to any derived information flow. In the following rule, the body is already derived from rules 7, 8 and 9:

dercando$_{OP}$(Purchasing officer, read)←Flow$_{att}$(Purchasing officer, att$_1$, Clerk, Obj$_1$, 1, "Prepare order", read) (18)

AuthUML considers positive and negative authorization, while FlowUML considers only positive flows. The previous rule transforms only the positive authorization. However, a workaround is possible to derive negative authorization to operations, as shown in rule 19. The rule says that for every flow that is part of an operation and where that operation is part of a use case and there is an actor who has a negative authorization to that use case, I can deduce that there is a negative authorization for the same actor to invoke the operation. In another words, I refer to the flow predicate merely to know which operation is part of the use case that has a negative authorization for that actor. For example, in the running example in FIG. 27, there is a negative authorization for Manager to invoke use case Write check. This negative authorization is written as do$_{UC}$(Manager,–"Write check"). Suppose there is a flow inside that use case written as Flow$_{att}$(Clerk, att$_1$, Obj$_1$, Obj$_2$, 1, "Write check", issue). Thus, I can deduce from the two available predicates that the Manager cannot invoke operation issue.

dercando$_{OP}$(X'$_a$,–X$_{op}$)←Flow$_{att}$(X$_a$, X$_{att}$, X$_{obj}$, X'$_{obj}$, X$_p$, X$_{uc}$, X$_{op}$)

do$_{UC}$(X'$_a$,–X$_{uc}$) (19)

The Flexibility of AuthUML and FlowUML. Both AuthUML and FlowUML analyze the requirement specification and ensure the proper compliance with both access and flow control policies. However, this is not the total advantage of both frameworks because they are also designed with flexibility in mind. The flexibility is achieved in three ways. First, by transforming UML geometries (use case and sequence diagram) into a set of logic-based predicates, the predicates provide flexibility because they are potentially amenable to automated reasoning that is useful in analysis. Second, by transforming the policies from text-based to a set of Prolog-style rules, this allows the enforcement of policies and the validation of requirements against policies to be applicable and less complicated. Third, flexibility is achieved by isolating the requirement specifications—that are written in predicates—from the policies—that is written in rules. The isolation is the core flexibility of the frameworks that allows the application of different polices for each portion of the requirements.

Figure 32:
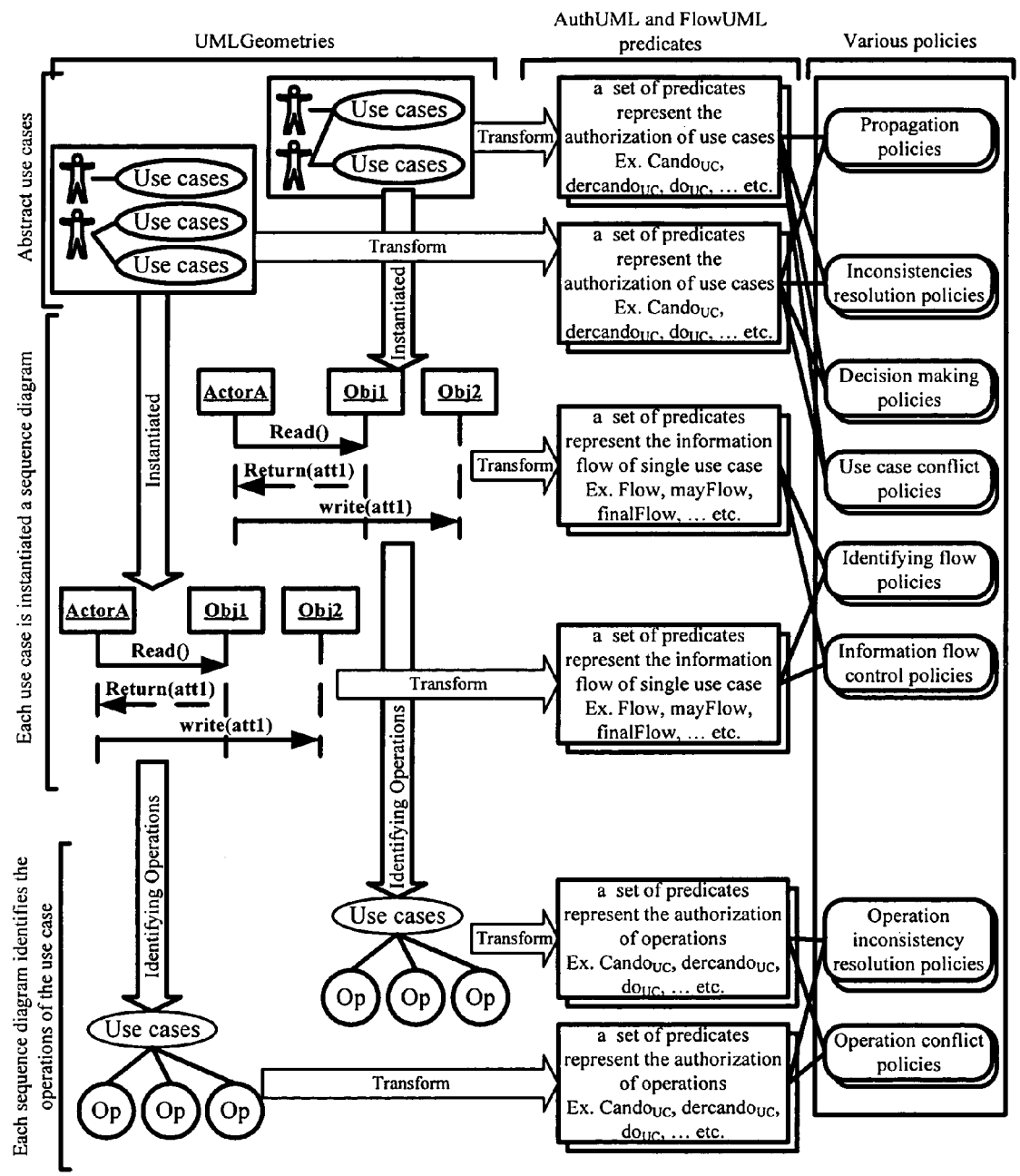
FIG. 32 shows a comprehensive scope of applying AuthUML and FlowUML

FIG. 32. Illustration of the isolations and flexibly of the frameworks. The figure consists of three columns. The first column represents the geometry of UML that is used in my frameworks (the use case and the sequence diagram). First, each abstract use case is instantiated by a sequence diagram to illustrate the information flow of the use case. Second, the sequence diagram can be used to identify the required operations of each use case.

In the second column, it transforms the requirements expressed in UML into predicates. First, it transforms the authorization of each use case or group of use cases into AuthUML predicates. Such transformed authorization can be separated into groups or combined together; groups are desired to apply different policies or to validate different policies to each group. For example, one can apply strict policies on sensitive use cases, while applying less restrictive policies on public-use use cases. Second, the sequence diagram of each use case is transformed into FlowUML predicates. The same applies here concerning whether to separate each use case flow or to combine all them together to create a broader analysis. Third, the authorization of operations is transformed to AuthUML predicates. Also, the decision of combining predicates can be made here.

The third column of FIG. 32, shows the various policies that are written in Prolog-style rules. As shown in the figure, a policy can be applied to any portion of the requirements that are specified in predicates in the second column. Also, each portion of the requirements can be enforced or validated by different policies. For example, one can apply the negative takes precedence policy in case an inconsistency occurs in just one portion, while applying another policy for other requirements. Note that the policies in the third column consist of two types. The first type will be used to validate the compliance of requirements, e.g., Mandatory Access Control (MAC) or Discretionary Access Control (DAC) policies. The second type is enforced in the analysis process, e.g., whether to apply the permission take precedence or the negative takes precedence.

This separation of policy from the application has many consequences. The first consequence is that it facilitates applying any policy to any design. The second consequence is that the same process can be used to check the consistency of two design diagrams with respect to a given security policy. That is, if two design diagrams are compliant with a given policy, as far as that policy is concerned, they are indistinguishable. This concept was developed further in designing a notion of policy-based equivalence of design diagrams in UML. The third consequence is that, if UML policies can be separated from designs as shown here, a policy composition framework for UML can be developed. The last consequence is that, by capturing more rules related to geometry of sequence diagrams, one may be able to capture deficiencies in the diagrams. If successful, this may lead to a policybased, reverse engineering framework for UML diagrams.

Sectional Conclusion. In this section, it was shown how access and flow control policies can be verified during the software development process. It was shown how to improve the analysis of both policies by combing two existing frameworks (AuthUML and FlowUML). Such collaboration provides a more accurate analysis of access and flow control policies. FlowUML provides rich information about the authorizations details that are provided to AuthUML and were unavailable without FlowUML. Also, AuthUML analyzed abstract authorizations before analyzing the information flow, and analyzed the details of authorizations after the information flow is analyzed by FlowUML. The process of collaborating both AuthUML and FlowUML and the necessary rules to transform the output of each framework to the other was defined. Also shown was how those two frameworks can provide the flexibility and scalability to enforce security policies.

Conclusion. Security features must be considered with other software requirements during the software development process to improve the security of the software and to reduce the cost of patching vulnerabilities. This dissertation focused on integrating both access and flow control policies during the requirements specification analysis and design phases of the software development process. The two main themes of this invention are, first, to provide unified representation and specification of both access and flow control policies and, second, to provide frameworks to verify the compliance of access and flow control requirements with the access and flow control policies.

To provide a unified representation of access and flow control policies, the de facto standard language of modeling was extended, the UML. The advantage to extend the UML is to ease the adoption of the extension by the software developers. The extension provides the necessary elements and a methodology to verify and design both access and flow control policies correctly. The extension focuses on static and dynamic access and flow control policies, where other work focuses on static policies only. The extension encourages the software analyzer to integrate access and flow control policies with other functional requirements. It was shown how the new extension specifies and models existing access and flow control models, such as Role-based Access Control (RBAC), Information Flow Control for Object-Oriented Systems, and Distributed Authorization Processor.

To provide formal verification and detection of improper access and flow control requirements, two frameworks were developed that are based on logic programming. The first framework, AuthUML, verifies that the access control requirements are consistent, complete, and conflict-free. AuthUML allows the analyzer to work at two different levels of detail, the Use Case level and the operation level, each where it is useful for the analyzer. The second framework developed, FlowUML, verifies the proper enforcement of information flow control policies at the requirements specification phase of UML-based designs. Also, FlowUML provides the same flexibility as AuthUML by providing two levels of analysis. Also shown was how the two frameworks can be used to verify existing access and flow control policies, such as Separation of Duty principle, Mandatory Access Control (MAC), and RBAC.

The final aspect of the present invention was the integration of AuthUML and FlowUML to form one framework. The integration combines the strengths of both frameworks to improve analysis and detection violations of access and flow control policies.

The usage of the frameworks will improve the enforcement of access and flow control policies because such frameworks detect violations of policies at the early phases of the software development process and limit them from propagating to other phases, where the cost of detecting and solving them is amplified.

The need to integrate security into software development is a large-scope goal. It requires the integration of different features of security such as access control policies, flow control, privacy, encryption, and availability. Also, it requires the integration of those features in all phases of the software life cycle such as the requirements specification, analysis, design, implementation, and testing.

The present invention meets the goal of integrating two security features: access and flow control policies. Also, it meets the goal of integrating those policies at the first two phases of the software life cycle: requirements specification and analysis.

In general, there is a room for future research, for example integrating other security features during all phases of the software life cycle, or integrating access and flow control policies with different phases.

Other UML diagrams, such as the state chart and deployment diagram, have not been studied in this dissertation. Also, detailed analysis and representation of the separation of duty principle with regards to software development is another research area, because most research in the separation of duty principle has focused on the system point of view rather than the software point.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A computer-readable medium encoded with an access and information flow control framework computer program, wherein execution of said "computer program" by one or more processors causes said "one or more processors" to perform the steps of:

a) performing a series of first phase steps, said "series of first phase steps" including:
      i) receiving at least one raw authorization requirement;
      ii) creating at least one authorization requirement representation from at least one of said "at least one raw authorization requirement" using a language; and
      iii) analyzing at least one of said "at least one authorization requirement representation" for at least one of the following:
         (1) ensuring that at least one of said "at least one authorization requirement representation" is consistent"; and
         (2) ensuring that at least one of said "at least one authorization requirement representation" is conflict-free";
   b) performing a series of second phase steps, said "series of second phase steps" including:
      i) creating at least one use case authorization from at least one of said "at least one authorization requirement representation" by:
         (1) propagating at least one of said "at least one authorization requirement representation" to a subject hierarchy;
         (2) enumerating at least one implicit authorization, said "at least one implicit authorization" derived from at least one of said "at least one authorization requirement representation";
         (3) resolving inconsistencies in at least one of said "at least one use case authorization"; and
         (4) completing incomplete said "at least one use case authorization";
      ii) validating consistency between at least one of said "at least one authorization requirement representation" and at least one of said "at least one use case authorization";
   c) performing a series of third phase steps for information flow control including:
      i) receiving at least one raw information flow requirement;
      ii) creating at least one information flow requirement representation from at least one of said "at least one raw information flow requirement" using a language;
      iii) creating at least one propagated information flow requirement by propagating at least one of said "at least one information flow requirement representation" to a subject hierarchy;

iv) creating at least one enumerated information flow requirement by enumerating at least one possible direct and indirect information flow requirement derived from said "at least one information flow requirement representation" and at least one of said "at least one propagated information flow requirement";

v) generate at least one filtered enumerated information flow requirement by filtering at least one of said "at least one enumerated information flow requirement"; and vi) ensure that at least one of said at least one filtered enumerated information flow requirement" is consistent with an information flow policy;

d) performing a series of fourth phase steps, said "series of fourth phase steps including:
   i) creating at least one operation authorization;
   ii) resolving inconsistencies in at least one of said at least one operation authorization"; and
   iii) ensuring that at least one of said "at least one operation authorization" is conflict-free"; and e) handling errors in at least one of the following:
   i) said "series of first phase steps";
   ii) said "series of second phase steps";
   iii) said "series of third phase steps"; and
   iv) said "series of fourth phase steps".

2. A computer-readable medium according to claim 1, wherein said raw information flow requirements include non-functional requirements.

3. A computer-readable medium according to claim 1, wherein at least one of said at least one raw authorization requirement is a non-functional requirement.

4. A computer-readable medium encoded with an access and information flow control framework computer program, wherein execution of said "computer program" by one or more processors causes said "one or more processors" to perform the steps of:

a) performing a series of first phase steps, said "series of first phase steps" including:
   i) receiving raw authorization requirements;
   ii) creating an authorization requirement representations from said raw authorization requirements using a language; and
   iii) analyzing said "authorization requirement representations" for at least one of the following:
      (1) ensuring that said "authorization requirement representations are consistent"; and
      (2) ensuring that said "authorization requirement representations" are conflict-free";

b) performing a series of second phase steps, said "series of second phase steps" including:
   i) creating a use case authorization from said "authorization requirement representations" by:
      (1) propagating said "authorization requirement representations" to a subject hierarchy;
      (2) enumerating implicit authorizations, said "implicit authorizations" derived from at least one of said "authorization requirement representations";
      (3) resolving inconsistencies in said "use case authorization"; and
      (4) completing incomplete said "use case authorization"; and
   ii) validating consistency between said "authorization requirement representations" and said "use case authorization";

c) performing a series of third phase steps, said series of third phase steps" including:
   i) creating an operation authorization by:
      (1) propagating said "use case authorization" to "operation authorization"; and
      (2) resolve inconsistencies in said "operation authorization"; and
   ii) ensuring that said "operation authorization" is conflict-free; and d) handling errors in at least one of the following:
   i) said "series of first phase steps";
   ii) said "series of second phase steps"; and
   iii) said "series of third phase steps".

* * * * *